United States Patent [19]
Kaieda et al.

[11] Patent Number: 5,359,056
[45] Date of Patent: Oct. 25, 1994

[54] PHTHALOCYANINE COMPOUNDS, PRODUCTION METHOD THEREOF, AND NEAR INFRARED RAY ABSORPTION MATERIALS CONTAINING THE SAME

[75] Inventors: Osamu Kaieda; Takashi Yodoshi, both of Tsukuba; Hideki Itoh, Toride; Miho Onozaki, Tsukuba, all of Japan

[73] Assignee: Nippon Shokubai Co., Ltd., Osaka, Japan

[21] Appl. No.: 913,028

[22] Filed: Jul. 14, 1992

[30] Foreign Application Priority Data

| Jul. 15, 1991 | [JP] | Japan | 3-174019 |
| Feb. 28, 1992 | [JP] | Japan | 4-042586 |
| Apr. 14, 1992 | [JP] | Japan | 4-094522 |

[51] Int. Cl.$^5$ .................. C07D 487/22; C09B 47/10
[52] U.S. Cl. ..................... 540/137; 540/133; 540/135; 540/130
[58] Field of Search ............... 540/130, 133, 135, 136, 540/137; 430/78

[56] References Cited

U.S. PATENT DOCUMENTS

| 3,414,583 | 12/1968 | Wotton | 540/137 |
| 5,166,025 | 11/1992 | Kaieda et al. | 430/78 |

FOREIGN PATENT DOCUMENTS

| 155780 | 9/1985 | European Pat. Off. | 540/130 |
| 282181 | 9/1988 | European Pat. Off. | 540/130 |
| 282182 | 9/1988 | European Pat. Off. | 540/130 |
| 950705 | 10/1949 | France . | |
| 1570578 | 6/1969 | France . | |
| 2300788 | 9/1976 | France . | |
| 1-52107 | 3/1989 | Japan | 540/136 |
| 162361 | 3/1989 | Japan | 540/136 |
| 42283 | 2/1990 | Japan | 540/136 |
| 62361 | 2/1991 | Japan | 540/136 |

OTHER PUBLICATIONS

Cooper, Spectroscopic Techniques for Organic Chemists, (New York, J. Wiley and Sons, 1980) p. 3.

Ichimura et al., Chemical Abstracts, vol. 106, 1987. Abstract 106:121398b.
Kurdiwa et al. Chemical Abstracts, vol. 106, 1987 Abstract 20000k.
Kashima et al., Chemical Abstracts, vol. 112, 1990 Abstract 108637h.
Chechulina et al., Chemical Abstracts, vol. 113, 1990 Abstract 243523d.

Primary Examiner—Mukund J. Shah
Assistant Examiner—P. K. Sripada
Attorney, Agent, or Firm—Wegner, Cantor, Mueller & Player

[57] ABSTRACT

A novel fluorine-containing phthalocyanine compound represented by the following formula (I):

wherein Y is (Abstract continued on next page.)

-continued

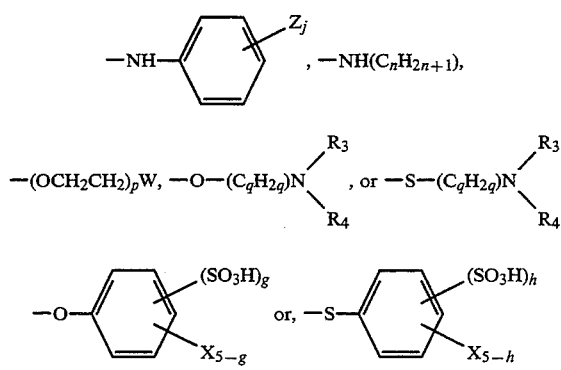

wherein $R_1$ and $R_2$ are independently a hydrogen atom or a C1–C8 alkyl group; $R_3$ and $R_4$ are independently a C1–C8 alkyl group; X is a hydrogen atom, a C1–C4 alkyl group, a C1–C4 alkoxyl group or a halogen atom; Z is a hydrogen atom, a C1–C4 alkyl group, a C1–C4 alkoxyl group, a C1–C4 alkoxycarbonyl group or a halogen atom; W is a C1–C4 alkoxyl group; e, f, g, h and j are independently an integer of 1 or 2; n is an integer of 1 to 8; and p and q are independently an integer of 1 to 6; a to d are an integer of 0 to 2 with the proviso that the sum of a to d is 1 to 8; and M is a non-metal, a metal, a metal oxide, a metal carbonyl or a metal halide, and further, a method of producing a fluorine-containing phthalocyanine compound represented by the above formula (I).

7 Claims, 31 Drawing Sheets

PHTHALOCYANINE COMPOUNDS, PRODUCTION METHOD THEREOF, AND NEAR INFRARED RAY ABSORPTION MATERIALS CONTAINING THE SAME

BACKGROUND OF THE INVENTION

1. Field of the Invention

This invention relates to novel phthalocyanine compounds, a method of producing the compounds, and near infrared ray (IR) absorption materials having a high solubility in solvents. The novel phthalocyanine compounds according to the present invention have an absorption in a near IR band of 600 to 1,000 nm, have an excellent solubility, and have an excellent light-fastness which is inherent to phthalocyanines. Therefore, the novel phthalocyanine compounds of the present invention provide an excellent effect when used for near IR absorption pigments for writing and reading signals in optical recording media using a semiconductor laser, liquid crystal display devices, optical character readers, etc.; near IR sensitizers; light-heat conversion agents in heat-sensitive transfer, heat-sensitive paper, heat-sensitive mimeographic plate, etc.; near IR absorption filters; asthenopic inhibitors; and photo-conductor materials. Furthermore, these phthalocyanine compounds exhibit excellent effects when used for photosensitive pigments for curing tumors, having a high texture transmissibility and a high absorption of rays of light in a long wavelength band, or for heat ray shielding materials for automobiles and building materials.

Furthermore, the novel phthalocyanine compounds of the present invention exhibit excellent effects as visible ray absorbing materials such as color separation filters for use in imaging tubes, liquid crystal devices, pigments for selective absorption filters of color cathode-ray tube (CRTs), color toners, inks for ink jet, bar code inks for preventing fake, and so forth.

2. Description of the Related Art

Recently, semiconductor lasers have been used as a light source for writing and reading signals in optical recording media such as compact disks, laser disks, optical memory devices, optical cards, etc., liquid crystal display devices, optical character readers, and so forth. Therefore, demands are increasing for materials absorbing near infrared rays (IR), or "near IR absorption pigments", which are used for photoconductor materials, near IR absorption filters, asthenopic inhibitors, light-heat conversion agents in heat-sensitive transfer, heat-sensitive paper, heat-sensitive mimeographic plate, etc., near IR sensitizers, photo-sensitive pigments for curing tumors, having a high texture transmissibility and a high absorption of rays of light in a longwave band, or heat ray shielding materials for automobiles and building materials. Among them, intensive studies have been made on phthalocyanine type compounds which are stable to light, heat, temperature, etc., and have a high fastness, to control their absorption wavelengths in accordance with intended applications, or to dissolve them in solvents in accordance with the intended applications.

As devices have become diversified in recent years, pigments having various absorption characteristics in accordance with applications have been desired. Nevertheless, it has been difficult to control the absorption wavelengths of the phthalocyanine type compounds. The pigments must be converted to a thin film without complicated steps such as vacuum evaporation or dispersion in a solvent, and in this case, a solvent which does not corrode substrates used for the devices must be used. Furthermore, the pigments must be dissolved in the resins used therewith. For these reasons, pigments capable of being dissolved in high concentrations in a variety of solvents in accordance with the applications have been required, but most of the phthalocyanine type compounds are insoluble in solvents.

Phthalocyanine compounds having solubility, which may be advantageous from the aspect of practical application, are disclosed recently. For example, 3,6-octaalkoxyphthalocyanine is known from Japanese Unexamined Patent Publication (KOKAI) No. 61-223056, but this compound involves problems such that control of the absorption wavelength is limited to a low wavelength side, and that an economical phthalocyanine cannot be obtained because the production process is complicated.

Japanese Unexamined Patent Publication (KOKAI) Nos. 60-209583, 61-152685, 63-308073 and 64-62361 disclose those compounds which improve solubility, and at the same time, expand the absorption wavelength to a longer wave length side by introducing a large number of thioether groups into the phthalocyanine skeletal structure for substitution. Among them, Japanese Unexamined Patent Publication (KOKAI) Nos. 60-209583 and 61-152685 disclose synthesis examples wherein the thioether groups are introduced into the phthalocyanine skeletal structure, particularly into the 3,6-positions. This method obtains the phthalocyanine compound having the thioether group at the 3,6-positions by heating a phthalocyanine compound having chlorine atoms at the 3,6-positions of the phthalocyanine skeletal structure and an organic thiol compound in a quinoline solvent in the presence of KOH. Since the yield is as low as about 20% to about 30%, however, this method has a problem of a poor production efficiency. Moreover, the solubility is still insufficient and the range of the absorption wavelength is limited.

Japanese Unexamined Patent Publication (KOKAI) Nos. 60-209583, 61-152685 and 64-62361 disclose Synthesis Examples wherein eight to sixteen thioether groups are introduced into the phthalocyanine skeletal structure.

This method obtains phthalocyanine having eight to sixteen thioether groups at the benzene ring of the phthalocyanine skeletal structure by heating a phthalocyanine compound having eight to sixteen chlorine and/or bromine atoms at the benzene ring of the phthalocyanine skeletal structure with an organic thiol compound in a quinoline solvent in the presence of KOH. The yield, however, is from about 20% to about 30% and the problem of a poor production efficiency remains unsolved, in the same way as described above.

Namely, since the substitution efficiency of the chlorine or bromine atoms to the thioether groups is low, the production yield becomes low, as well. Accordingly, an unreacted phthalocyanine in which the thioether groups have not been substituted with the chlorine atoms, or an unreacted phthalocyanine in which the thioether groups have been partially substituted with chlorine atoms, is generated. It is practically difficult to separate these unreacted phthalocyanine compounds from an intended phthalocyanine compound. For this reason, substantially only phthalocyanine mixtures having various compositions can be obtained.

Further, Japanese Unexamined Patent Publication (KOKAI) No. 64-62361 describes compounds as "polythiol substitution, mixed, condensed type phthalocyanine composition" even after separation using a silica gel, and admits that unreacted compounds remain. If a part of the chlorine atoms are left, solubility drops remarkably, and this leads to the drawback that the pigment cannot be easily dissolved and converted to a thin film as an IR absorption pigment, or other uses such as visible light absorption filter.

The method described in Japanese Unexamined Patent Publication (KOKAI) No. 63-308073 obtains a phthalocyanine compound at a yield of 42% by heating monobromotetradecachlorophthalocyanine and an organic thiol mixture comprising 2-aminothiophenol and 4-methylphenylthiol in a DMF solvent in the presence of KOH. Since in this method different organic thiol mixtures are simultaneously added and reacted, however, a resulting phthalocyanine mixture comprises phthalocyanines having different combinations of substituents, and therefore homogeneous product cannot be obtained. Accordingly, the application of the reaction product to those applications requiring the control of the absorption wavelength, such as the use as ink for cyan color ink jet, or as a near IR absorption pigment, is limited, for example. Although the reaction product has a solubility, its solubility is not yet sufficient for thin film formation or for dissolution in a resin.

Japanese Unexamined Patent Publication (KOKAI) Nos. 64-42283 and 3-62878 propose near IR absorption pigments having alkoxyl groups and alkylthio groups introduced into the phthalocyanine nucleus. Nevertheless, since most of these products are derived from starting materials having the substituent groups at the 3,6-positions, which have low practical utility, they involve the problem of practical applicability. The solubility of the product remains at a low level, and there is a limit to the derivation of phthalocyanines having controlled absorption wavelengths. To introduce the substituent groups into the 4,5-positions, the reference methods derive phthalocyanines from the starting materials in which the 4,5-positions are chlorinated. Accordingly, due to this low substitutivity, chlorine atoms, as a factor lowering the solubility, remain in the product.

Further, phthalocyanines soluble in alcohols are described in Japanese Unexamined Patent Publication (KOKAI) No. 63-295578. According to this reference, substituted thiocopper phthalocyanine mixtures obtained by reacting monobromo-tetradecachlorocopper phthalocyanine with an organic thiol mixture consisting of 2-aminothiophenol and 4-methylphenylthiol, such as hepta(4-methylphenylthio)-tetra(1-amino-2-thiophenyl-1,2-ylen)-copper phthalocyanine, is sulfonated by fuming sulfuric acid to obtain a phthalocyanine having ten sulfonic acid groups on an average, and the reaction product is then treated with a basic material such as tetrabutylammonium salt to convert them to sulfonamide groups, etc., and thus phthalocyanines having solubility in alcoholic solvents are obtained.

This method, however, involves the following problems.

The chlorine atoms are likely to partially remain, and if they remain, the solubility of the compounds drops remarkably.

Phthalocyanines are obtained as a mixture, and when the mixture is used as the near IR absorption pigment, the uniform characteristics cannot be obtained. Therefore, its application is limited.

The production process is extremely complicated, and the yield at each production step is low.

Since the sulfonation reaction is carried out in an aqueous system and then, the reaction product is purified by dialysis, this method involves the problems yet to be solved as an industrial production method.

To solve these problems, in Japanese Patent Application Nos. 1-209599, 2-125518 and 2-144292, the inventors of the present invention attempted to extend the absorption to a longer absorption wavelength and to improve solubility in solvents by selectively replacing fluorine atoms of octadecafluoropphthalocyanine with alkylthio groups or arylthio groups, and obtained certain effects. However, compounds having higher solubility are desired and an absorption wavelength, too, is desired to be extended to a longer wavelength.

SUMMARY OF THE INVENTION

The present invention relates to novel phthalocyanine compounds having an absorption wavelength which can be controlled within an absorption wavelength band of 600 to 1,000 nm in accordance with an object, and which exhibit an excellent solubility in solvents in accordance with applications, such as hydrophilic solvents, such as water, alcoholic solvents; or lipophilic solvents, such as ketones, aromatic hydrocarbon solvents.

A further object of the present invention is to provide a method of efficiently producing the phthalocyanine compounds at a high purity.

The present invention provides novel fluorine-containing compounds represented by the following formula (I):

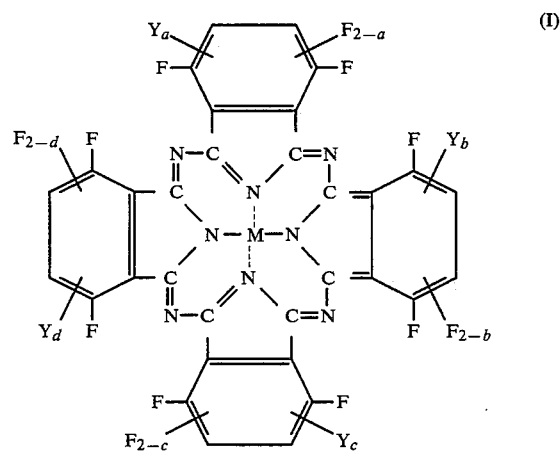

wherein Y is

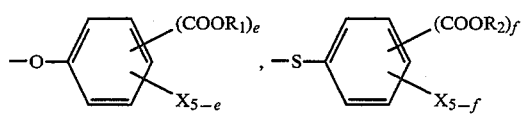

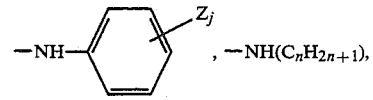

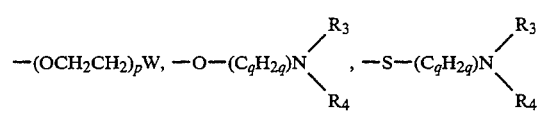

-continued

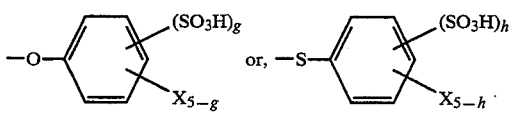

wherein $R_1$ and $R_2$ are independently a hydrogen atom or a $C_1$–$C_8$ alkyl group; $R_3$ and $R_4$ are independently $C_1$–$C_8$ alkyl group; X is a hydrogen atom, a $C_1$–$C_4$ alkyl group, a $C_1$–$C_4$ alkoxyl group or a halogen atom; Z is a hydrogen atom, a $C_1$–$C_4$ alkyl group, a $C_1$–$C_4$ alkoxyl group, a $C_1$–$C_4$ alkoxycarbonyl group or a halogen atom; W is a $C_1$–$C_4$ alkoxyl group; e, f, g, h and j are independently integer of 1 or 2; n is an integer of 1 to 8; and p and q are independently integer of 1 to 6; a to d are integer of 0 to 2 with the proviso that the sum of a to d is 1 to 8; and M is a non-metal, a metal, a metal oxide, a metal carbonyl or a metal halide.

The present invention also provides a method of producing a fluorine-containing phthalocyanine compound represented by the following formula (I):

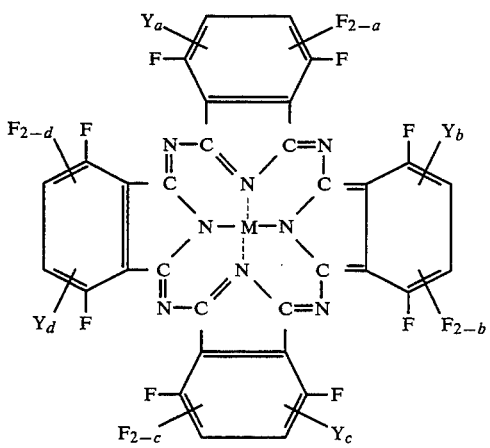

wherein Y is

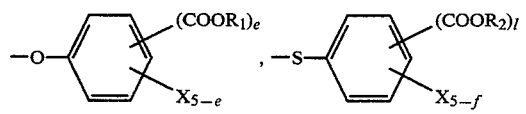

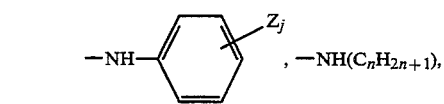

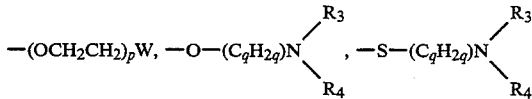

wherein $R_1$ and $R_2$ are independently a hydrogen atom or a $C_1$–$C_8$ alkyl group; $R_3$ and $R_4$ are independently a $C_1$–$C_8$ alkyl group; X is a hydrogen atom, a $C_1$–$C_4$ alkyl group, a $C_1$–$C_4$ alkoxyl group or a halogen atom; Z is a hydrogen atom, a $C_1$–$C_4$ alkyl group, a $C_1$–$C_4$ alkoxyl group, a $C_1$–$C_4$ alkoxycarbonyl group or a halogen atom; W is a $C_1$–$C_4$ alkoxyl group; e, f and j are independently integer of 1 or 2; n is an integer of 1 to 8; and p and q are independently integer of 1 or 2; n is an integer of 1 to 8; and p and q are independently integer of 1 to 6; a to d are integer of 0 to 2 with the proviso that the sum of a to d is 4 or 8; and M is a non-metal, a metal, a metal oxide, a metal carbonyl or a metal halide;

which comprises reacting a phthalonitrile compound represented by the following formula (II):

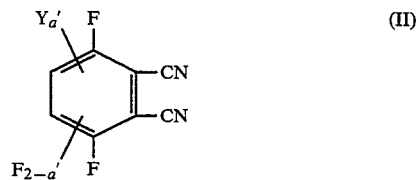

wherein Y is

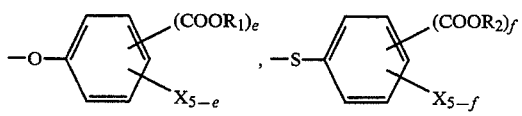

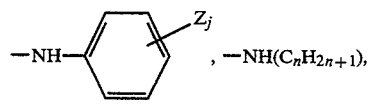

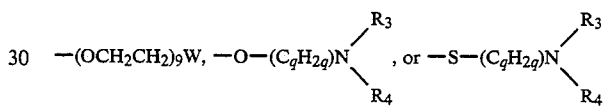

wherein each of $R_1$, $R_2$, $R_3$, $R_4$, X, Z, W, e, f, j, n, p and q has the same meaning as defined above, and a' is an integer of 1 or 2, with a metal oxide, a metal carbonyl, a metal halide or a metal salt of an organic acid, represented by the formula (III):

$$M'_rQ_s \qquad (III)$$

wherein M' is a metal, Q is an oxygen atom, a carbonyl, a halogen or an organic acid group, and each of r and s is an integer of 1 to 5.

The present invention further provides a method of producing a fluorine-containing phthalocyanine compound represented by the following formula (I):

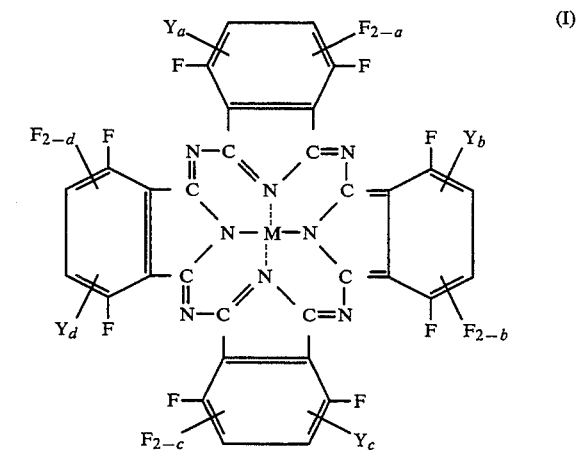

wherein Y is

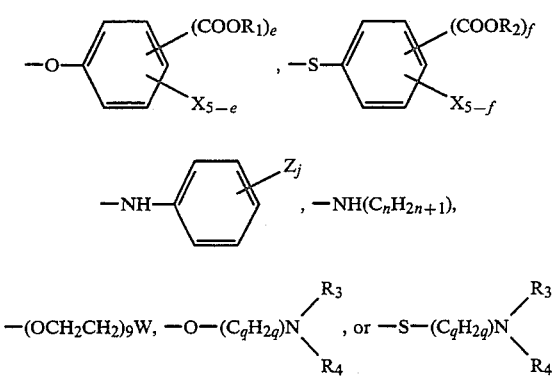

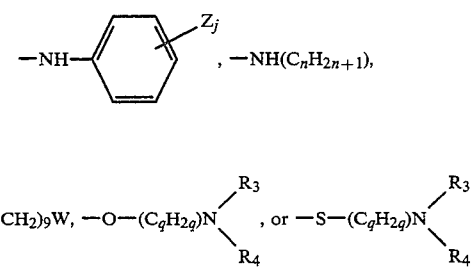

wherein $R_1$ and $R_2$ are independently a hydrogen atom or a $C_1$-$C_8$ alkyl group; $R_3$ and $R_4$ are independently $C_1$-$C_8$ alkyl group; X is a hydrogen atom, a $C_1$-$C_4$ alkyl group, a $C_1$-$C_4$ alkoxyl group or a halogen atom; Z is a hydrogen atom, a $C_1$-$C_4$ alkyl group, a $C_1$-$C_4$ alkoxyl group, a $C_1$-$C_4$ alkoxycarbonyl group or a halogen atom; W is a $C_1$-$C_4$ alkoxyl group; e, f and j are independently integer of 1 or 2; n is an integer of 1 to 8; and p and q are independently integer of 1 to 6; a to d are integer of 0 to 2 with the proviso that the sum of a to d is 1 to 8; and M is a non-metal, a metal, a metal oxide, a metal carbonyl or a metal halide;

which comprises reacting in an organic solvent a phthalocyanine compound represented by the following formula (IV):

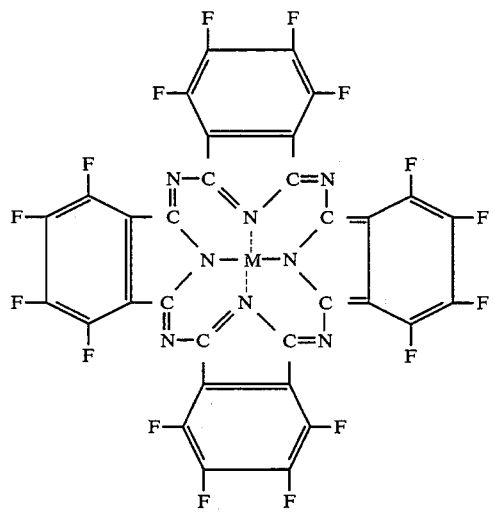

(IV)

wherein M has the same meaning as defined above; with a compound represented by the following formula (V):

YH  (V)

wherein Y is

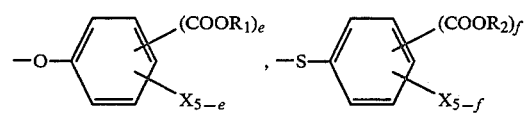

where each of $R_1$, $R_2$, $R_3$, $R_4$, X, Z, W, e, f, j, n, p and q has the same meaning as defined already.

The present invention still more provides a method of producing a fluorine-containing phthalocyanine compound represented by the following formula (VI):

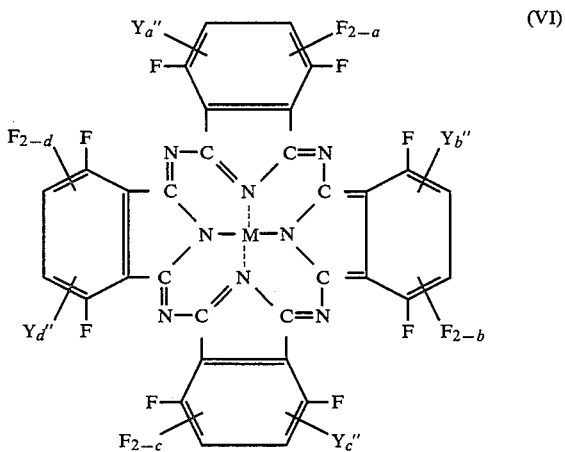

(VI)

wherein Y" is

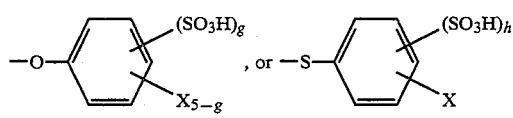

wherein X is a hydrogen atom, a $C_1$-$C_4$ alkyl group, a $C_1$-$C_4$ alkoxyl group or a halogen atom; g and h are independently integer of 1 to 2; a to d are integer of 0 to 2 with the proviso that the sum of a to d is 1 to 8; and M is a non-metal, a metal, a metal oxide, a metal carbonyl or a metal halide;

which comprises sulfonating a phthalocyanine derivative represented by the following formula (VII):

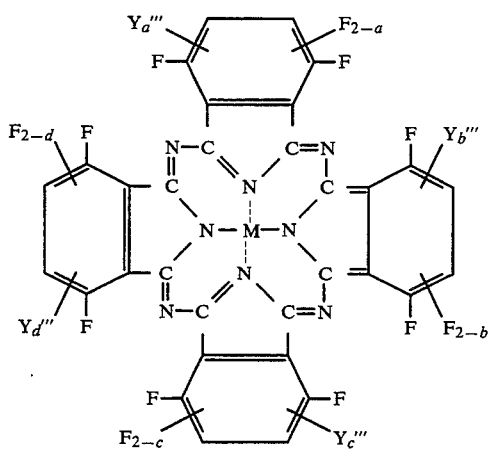

(VII)

wherein Y''' is

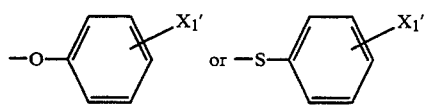

wherein X' is a C1–C4 alkyl group, a C1–C4 alkoxyl group or a halogen atom, and i is an integer of 0 to 2; and a to d are an integer of 0 to 2 with proviso that the sum of a to d is 1 to 8; and M is a non-metal, a metal, a metal oxide, a metal carbonyl or a metal halide, using a sulfonating agent in an organic solvent.

The present invention also provides a near infrared absorption material containing said novel fluorine-containing phthalocyanine compound of claim 1 having an absorption within the range of 600 to 1,000 nm.

PREFERRED EMBODIMENT

Figure 1:
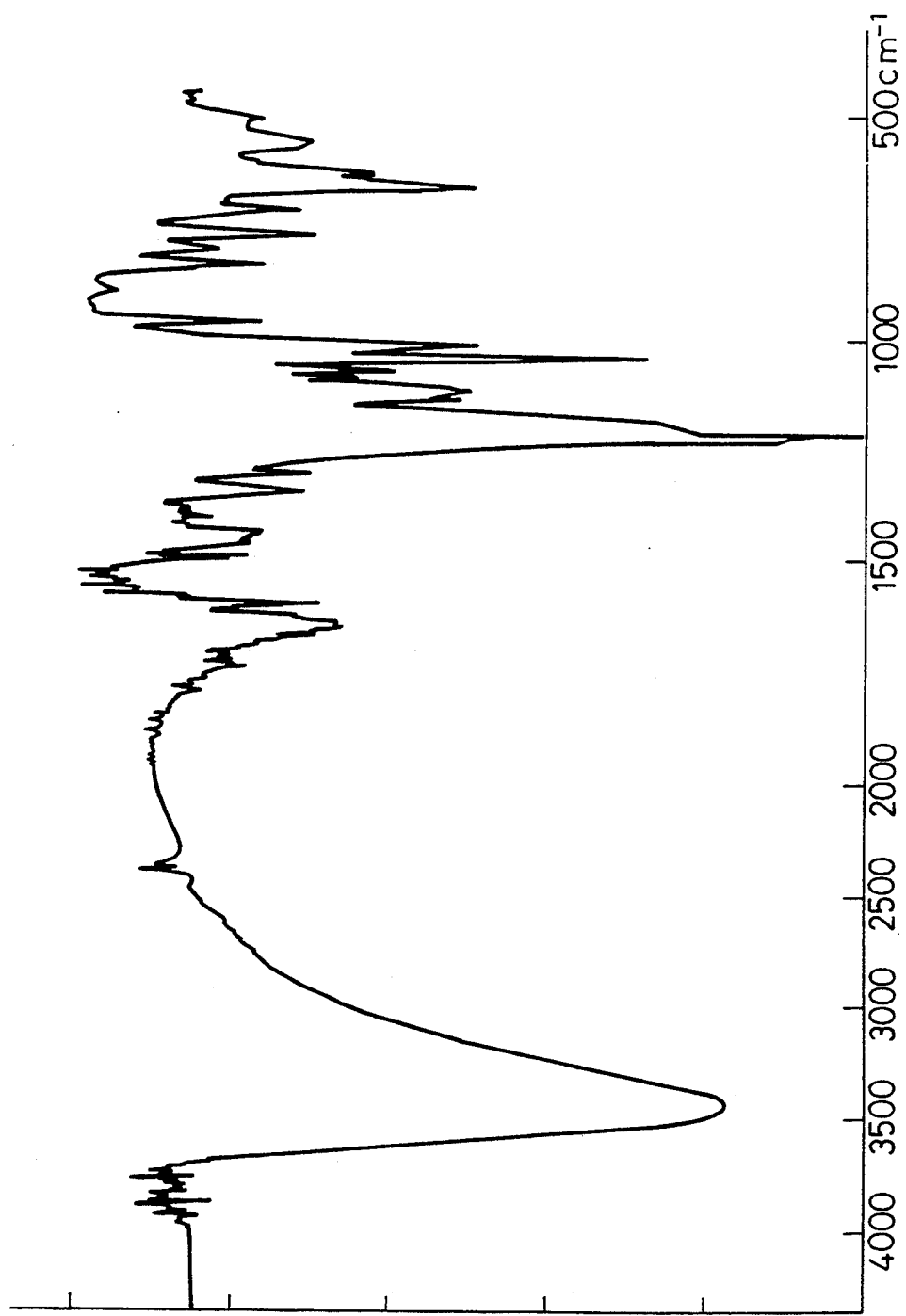
FIG. 1 shows an infrared (IR) absorption spectrum of the compound obtained in Example 1.

In the present invention, the term "C1–C4 alkyl group" represents a methyl group, an ethyl group, an n-propyl group, an isopropyl group, an n-butyl group, an isobutyl group and a tert-butyl group. The term "C1–C8 alkyl group" represents a straight chain or branched chain pentyl group, a straight chain or branched chain hexyl group, a straight chain or branched chain heptyl group, and a straight chain or branched chain octyl group, in addition to the C1–C4 alkyl group described above.

The C1–C4 alkoxyl group includes a methoxyl group, an ethoxyl group, an n-propxyl group, an isopropoxyl group, an n-butoxyl group, an isobutoxyl group and a tert-butoxyl group. The C1–C4 alkoxycarbonyl group includes a methoxycarbonyl group, an ethoxycarbonyl group, an n-propxycarbonyl group, an isopropoxycarbonayl group, an n-butoxycarbonyl group, an isobutoxycarbonyl group and a tert-butoxycarbonyl group.

Examples of the metal include copper, zinc, cobalt, vanadium, aluminium, titanium, tin, indium, nickel and iron. Examples of the metal halides include fluorides, chlorides and bromides. The term "M is metal-free" means that M represents atoms other than the metal atoms, such as two hydrogen atoms.

The substituent groups used in the present invention and represented by symbol Y are classified into the following groups (A) to (E).

(A) type:

Y is a phenoxy group or phenylthio group partially substituted with C1–C8 (preferably, C1–C4) alkoxycarbonyl group(s), and/or carboxy group(s), and optionally further substituted with C1–C4 alkoxy group(s), C1–C4 alkoxy group(s) and/or halogen atmo(s) (preferably, fluorine atom(s)).

The number of the substituent groups Y is 1 or 2 in the phthalonitrile nucleus, and is at least 1, preferably 1 to 4 or 8 in the phthalocyanine nucleus.

Definite examples of Y are as follows:
o-methoxycarbonylphenoxy, p-methoxycarbonylphenoxy,
m-methoxycarbonylphenoxy, o-ethoxycarbonylphenoxy,
p-ethoxycarbonylphenoxy, m-ethoxycarbonylphenoxy,
o-butoxycarbonylphenoxy, p-butoxycarbonylphenoxy,
m-butoxycarbonylphenoxy,
o-methyl-p-methoxycarbonylphenoxy,
o-methoxy-p-methoxycarbonylphenoxy,
o-fluoro-p-methoxycarbonylphenoxy,
2,3,5,6-tetrafluoro-p-ethoxycarbonylphenoxy,
o-ethoxycarbonyl-p-methylphenoxy,
o-butoxycarbonyl-p-methylphenoxy,
o-butoxycarbonyl-p-fluorophenoxy,
p-methyl-m-butoxycarbonylphenoxy,
o-methoxycarbonylphenylthio,
p-methoxycarbonylphenythio,
m-methoxycarbonylphenylthio,
o-ethoxycarbonylphenylthio,
p-ethoxycarbonylphenylthio,
m-ethoxycarbonylphenylthio,
o-butoxycarbonylphenylthio,
p-butoxycarbonylphenylthio,
m-butoxycarbonylphenylthio,
o-methyl-p-methoxycarbonyl-phenylthio,
o-methoxy-p-methoxycarbonylphenylthio,
o-fluoro-p-methoxycarbonylphenylthio,
tetraluoro-p-ethoxycarbonylphenylthio,
o-ethoxycarbonyl-p-methylphenylthio,
o-butoxycarbonyl-p-methylphenylthio,
o-butoxycarbonyl-p-fluorophenylthio,
p-methyl-m-butoxycarbonylphenylthio.

(B) type:

Y is an anilino group optionally substituted with C1–C4 alkyl group(s), C1–C4 alkoxy group(s), halogen atom(s) (preferably, fluorine atom(s)) and/or with C1–C4 alkoxycarbonyl group(s), or Y is a C1–C8 (preferably C1–C5) alkylamino group.

The number of the substituent groups Y is 1 or 2 in the phthalonitrile nucleus, and is at least 1, preferably 1 to 4 or 8 in the phthalocyanine nucleus.

Definite examples are as follows.
anilino, o-toluidino, p-toluidino, m-toluidino,
2,4-xylidino, 2,6-xylidino, o-methoxyanilino,
p-methoxyanilino, m-methoxyanilino, o-fluoroanilino,
p-fluoroanilino, tetrafluoroanilino,
p-ethoxycarbonylanilino, methylamino, ethylamino,
and buthylamino.

(C) type:

Y is a polyethlenedioxy group which is substituted with an alkoxy group on one side thereof, and in this case, the number of carbon atoms in the polyethylenedioxy chain is 1 to 6 (preferably, 1 to 4).

The number of carbon atoms of the alkoxy group is 1 to 4 (preferably, 1 to 2). The number of the ethylenedioxy chains is 1 to 6 (preferably, 1 to 4).

The number of the substituent groups Y is 1 or 2, preferably 1, in the phthalonitrile nucleus, and is at least 1, preferably 4 to 8, particularly more preferably 4, in the phthalocyanine nucleus.

Definite examples are as follows.
methoxyethoxy, 3',6'-oxaheptyloxy,
3',6',9'-oxadecyloxy, and
3',6',9',12'-oxatridecyloxy.

(D) type:

Y is a C1–C6 (preferably 1 to 4) alkoxy group or alkylthio group substituted with C1–C8 (preferably 1 to 4) alkylamino(s).

The number of the substitutent groups Y is 1 or 2 in the phthalonitrile nucleus, and is at least 1, preferably 4 or 8 in the phthalocyanine nucleus.

Definite examples are as follows.
dimethylaminoethoxy, diethylaminoethoxy,
diethylaminobutoxy, dimethylaminoethoxy,
diethylaminoethoxy, diethylaminobutoxy,
dimethylaminoethylthio, diethylaminoethylthio,
dibutylaminobutylthio.

(E) type:

Y is a phenoxy or phenyethio partially substituted with sulfonic acid group(s), and optionally, further substituted with C1–C4 alkyl group(s), C1–C4 alkoxy group(s) and/or halogen atom(s) (preferably fluorine atom(s)). The number of the sulfonic acid groups is at least one, preferably 1 to 16, more preferably 1 to 10 per a phthalocyanine molucule.

In the phthalocyanine compounds represented by the general formulas (I) and (IV), the center metal is preferably copper, zinc, cobalt, nickel, iron, vanadyl, titanyl, chloroindium, chloroaluminum, dichlorotin, cobalt carbonyl, and iron carbonyl.

Definite examples of the phthalocyanine skeletal structure of the general formula (I) are as follows.

(A) type:
3,5,6-dodecafluoro-4-tetraquis(o-methoxycarbonyl-phenoxy)phthalocyanine, symbol: PcF12 (o-mcPhO) 4
3,5,6-dodecafluoro-4-tetraquis(p-methoxycarbonyl-phenoxy)phthalocyanine, symbol: PcF12 (p-mcPhO) 4
3,5,6-dodecafluoro-4-tetraquis(m-methoxycarbonyl-phenoxy)phthalocyanine, symbol: PcF12 (m-mcPhO) 4
3,5,6-dodecafluoro-4-tetraquis(o-ethoxycarbonyl-phenoxy)phthalocyanine, symbol: PcF12 (o-ecPhO) 4

3,5,6-dodecafluoro-4-tetraquis(p-ethoxycarbonyl-phenoxy)phthalocyanine, symbol: PcF12 (p-ecPhO) 4

3,5,6-dodecafluoro-4-tetraquis(m-ethoxycarbonyl-phenoxy)phthalocyanine, symbol: PcF12 (m-ecPhO) 4

3,5,6-dodecafluoro-4-tetraquis(o-butoxycarbonyl-phenoxy)phthalocyanine, symbol: PcF12 (o-bcPhO) 4

3,5,6-dodecafluoro-4-tetraquis(p-butoxycarbonyl-phenoxy)phthalocyanine, symbol: PcF12 (p-bcPhO) 4

3,5,6-dodecafluoro-4-tetraquis(m-butoxycarbonyl-phenoxy)phthalocyanine, symbol: PcF12 (m-bcPhO) 4

3,5,6-dodecafluoro-4-tetraquis(o-methyl-p-methoxycarbonylphenoxy)phthalocyanine, symbol: PcF12(o-Me-p-mcPhO) 4

3,5,6-dodecafluoro-4-tetraquis(o-fluoro-p-methoxycarbonylphenoxy)phthalocyanine, symbol: PcF12(o-F-p-mcPhO) 4

3,5,6-dodecafluoro-4-tetraquis(o-methoxy-p-ethoxycarbonylphenoxy)phthalocyanine, symbol: PcF12(o-MeO-p-ecPhO) 4

3,5,6-dodecafluoro-4-tetraquis(tetrafluoro-p-ethoxycarbonylphenoxy)phthalocyanine, symbol: PcF12(F4-ecPhO) 4

3,5,6-dodecafluoro-4-tetraquis(p-methyl-o-ethoxycarbonylphenoxy)phthalocyanine, symbol: PcF12(p-Me-o-ecPhO) 4

3,5,6-dodecafluoro-4-tetraquis(p-carboxyphenoxy)phthalocyanine, symbol: PcF12(p-caPhO) 4

3,5,6-dodecafluoro-4-tetraquis(3,4-hiscarboxy-phenoxy)phthalocyanine, symbol: PcF12(3,4-caPhO) 4

3,6octafluoro-4,5-octaquis(o-methoxycarbonyl-phenoxy)phthalocyanine, symbol: PcF8(o-mcPhO) 8

3,6-octafluoro-4,5-octaquis(p-methoxycarbonyl-phenoxy)phthalocyanine, symbol: PcF8(p-mcPhO) 8

3,6-octafluoro-4,5-octaquis(m-methoxycarbonyl-phenoxy)phthalocyanine, symbol: PcF8(m-mcPhO) 8

3,6-octafluoro-4,5-octaquis(o-ethoxycarbonyl-phenoxy)phthalocyanine, symbol: PcF8(o-ecPhO) 8

3,6-octafluoro-4,5-octaquis(p-ethoxycarbonyl-phenoxy)phthalocyanine, symbol: PcF8(p-ecPhO) 8

3,6-octafluoro-4,5-octaquis(o-butoxycarbonyl-phenoxy)phthalocyanine, symbol: PcF8(o-bcPhO) 8

3,6-octafluoro-4,5-octaquis(p-butoxycarbonyl-phenoxy)phthalocyanine, symbol: PcF8(p-bcPhO) 8

3,6-octafluoro-4,5-octaquis(m-butoxycarbonyl-phenoxy)phthalocyanine, symbol: PcF8(m-bcPhO) 8

3,6-octafluoro-4,5-octaquis(o-methyl-p-methoxycarbonylphenoxy)phthalocyanine, symbol: PcF8(o-Me-p-mcPhO) 8

3,6-octafluoro-4,5-octaquis(o-fluoro-p-methoxycarbonylphenoxy)phthalocyanine, symbol: PcF8(o-F-p-mcPhO) 8

3,6-octafluoro-4,5-octaquis(o-methoxy-p-ethoxycarbonylphenoxy)phthalocyanine, symbol: PcF8(o-Me-p-ecPhO) 8

3,6-octafluoro-4,5-octaquis (p-methyl-o-ethoxycarbonylphenoxy)phthalocyanine, symbol: PcF8(p-Me-o-ecPhO) 8

3,6-octafluoro-4,5-octaquis (o-methoxy-p-ethoxycarbonylphenoxy)phthalocyanine, symbol: PcF8(o-Me-p-ecPhO) 8

3,6-octafluoro-4,5-octaquis(tetrafluoro-p-ethoxycarbonylphenoxy)phthalocyanine, symbol: PcF8(F4-p-ecPhO) 8

3,6-octafluoro-4,5-octaquis(p-carboxyphenoxy)phthalocyanine symbol: PcF8(p-caPhO) 8

3,6-octafluoro-4,5-octaquis(o-carboxyphenoxy)phthalocyanine symbol: PcF8(o-caPhO) 8 pentadecafluoro-4-monomethoxycarbonylphenoxyphthalocyanine, symbol: PcF15(mcPhO)

pentadecafluoro-4-monoethoxycarbonylphenoxyphthalocyanine, symbol: PcF15(ecPhO)

pentadecafluoro-4-monobutoxycarbonylphenoxyphthalocyanine, symbol: PcF15(bcPhO)

pentadecafluoromonocarboxyphenoxyphthalocyanine symbol: PcF15(caPhO)

pentafluoro-4-(tetrafluoro-p-ethoxycarbonylphenoxy)phthalocyanine, symbol: PcF8(F4-p-echPhO) 8

3,6-octafluoro-4,5-octaquis(o-methoxycarbonyl-phenylthio)phthalocyanine, symbol: PcF8(o-mcPhS) 8

3,6-octafluoro-4,5-octaquis(p-methoxycarbonyl-phenylthio)phthalocyanine, symbol: PcF8(p-mcPhS) 8

3,6-octafluoro-4,5-octaquis(m-methoxycarbonyl-phenylthio)phthalocyanine, symbol: PcF8(m-mcPhS) 8

3,6-octafluoro-4,5-octaquis(o-ethoxycarbonylphenyl-thio)phthalocyanine, symbol: PcF8(o-ecPhS) 8

3,6-octafluoro-4,5-octaquis(p-ethoxycarbonylphenyl-thio)phthalocyanine, symbol: PcF8(p-ecPhS) 8

3,6-octafluoro-4,5-octaquis(m-ethoxycarbonyl-phenylthio)phthalocyanine, symbol: PcF8(m-ecPhS) 8

3,6-octafluoro-4,5-octaquis(o-butoxycarbonylphenyl-thio)phthalocyanine, symbol: PcF8(o-bcPhS) 8

3,6-octafluoro-4,5-octaquis(p-butoxycarbonylphenyl-thio)phthalocyanine, symbol: PcF8(p-bcPhS) 8

3,6-octafluoro-4,5-octaquis(m-butoxycarbonyl-phenylthio)phthalocyanine, symbol: PcF8(m-bcPhS) 8

3,6-octafluoro-4,5-octaquis(o-methyl-p-methoxycarbonylphenylthio)phthalocyanine, symbol: PcF8(m-Me-p-mcPhS) 8

3,6-octafluoro-4,5-octaquis(o-fluoro-p-methoxycarbonylphenylthio)phthalocyanine, symbol: PcF8(o-F-p-mcPhS) 8

3,6-octafluoro-4,5-octaquis(o-methoxy-p-ethoxycarbonylphenylthio)phthalocyanine, symbol: PcF8(o-Me-p-ecPhS) 8

3,6-octafluoro-4,5-octaquis(p-methyl-o-ethoxycarbonylphenylthio)phthalocyanine, symbol: PcF8(p-Me-o-ecPhS) 8

3,6-octafluoro-4,5-octaquis(o-methoxy-p-ethoxycarbonylphenylthio)phthalocyanine, symbol: PcF8(o-Me-p-ecPhS) 8

3,6-octafluoro-4,5-octaquis(tetrafluoro-p-ethoxycarbonylphenylthio)phthalocyanine, symbol: PcF8(F4-p-ecPhS) 8

3,6-actafluoro-4,5-octaquis(p-carboxylphenylthio)phthalocyanine symbol: PcF8(p-caPhS)

pentadecafluoro-4-monomethoxycarbonylphenylthiophthalocyanine, symbol: PcF15(mcPhS)

pentadecafluoro-4-monoethoxycarbonylphenylthiophthalocyanine, symbol: PcF15(ecPhS)
pentadecafluoro-4-monobutoxycarbonylphenylthiophthalocyanine, symbol: PcF15(bcPhS)
pentadecafluoro-4-(tetrafluoro-p-ethoxycarbonylphenylthio)phthalocyanine, symbol: PcF8(F4-p-ecPhS) 8
pentadecafluoromonocarboxylphenylthiophthalocyanine symbol: PcF15(caPhS)

(B) type:
3,5,6-dodecafluoro-4-tetraquis(anilino)phthalocyanine, symbol: PcF12(PhNH) 4
3,5,6-dodecafluoro-4-tetraquis(o-toluidino)phthalocyanine, symbol: PcF12(o-MePhNH) 4
3,5,6-dodecafluoro-4-tetraquis(p-toluidino)phthalocyanine, symbol: PcF12(p-MePhNH) 4
3,5,6-dodecafluoro-4-tetraquis(m-toluidinio)phthalocyanine, symbol: PcF12(m-MePhNH) 4
3,5,6-dodecafluoro-4-tetraquis(2,4-xylidino)phthalocyanine, symbol: PcF12(2,4-MePhNH) 4
3,5,6-dodecafluoro-4-tetraquis(2,6-xylidino)phthalocyanine, symbol: PcF12(2,6-MePhNH) 4
3,5,6-dodecafluoro-4-tetraquis(o-methoxyanilino)phthalocyanine, symbol: PcF12(o-MeOPhNH) 4
3,5,6-dodecafluoro-4-tetraquis(p-methoxyanilino)phthalocyanine, symbol: PcF12(p-MeOPhNH) 4
3,5,6-dodecafluoro-4-tetraquis(p-methoxyanilino)phthalocyanine, symbol: PcF12(p-MeOPhNH) 4
3,5,6-dodecafluoro-4-tetraquis(m-methoxyanilino)phthalocyanine, symbol: PcF12(m-MeOPhNH) 4
3,5,6-dodecafluoro-4-tetraquis(o-fluoroanilino)phthalocyanine, symbol: PcF12(o-FPhNH) 4
3,5,6-dodecafluoro-4-tetraquis(p-fluoroanilino)phthalocyanine, symbol: PcF12(p-FPhNH) 4
3,5,6-dodecafluoro-4-tetraquis(tetrafluoroanilino)phthalocyanine, symbol: PcF12(F4PhNH) 4
3,5,6-dodecafluoro-4-tetraquis(o-methoxycarbonylanilinophenoxy)phthalocyanine, symbol: PcF12(o-mcPhNH) 4
3,5,6-dodecafluoro-4-tetraquis(p-methoxycarbonylanilino)phthalocyanine, symbol: PcF12(p-mcPhNH) 4
3,5,6-dodecafluoro-4-tetraquis(m-methoxycarbonylanilino)phthalocyanine, symbol: PcF12(m-mcPhNH) 4
3,5,6-dodecafluoro-4-tetraquis(o-ethoxycarbonylanilino)phthalocyanine, symbol: PcF12(o-ecPhNH) 4
3,5,6-dodecafluoro-4-tetraquis(p-ethoxycarbonylanilino)phthalocyanine, symbol: PcF12(p-ecPhNH) 4
3,5,6-dodecafluoro-4-tetraquis(m-ethoxycarbonylanilino)phthalocyanine, symbol: PcF12(m-ecPhNH) 4
3,5,6-dodecafluoro-4-tetraquis(m-ethoxycarbonylanilino)phthalocyanine, symbol: PcF12(m-ecPhNH) 4
3,5,6-dodecafluoro-4-tetraquis(methylamino)phthalocyanine, symbol: PcF12(MeNH) 4
3,5,6-dodecafluoro-4-tetraquis(ethylamino)phthalocyanine, symbol: PcF12(EtNH) 4
3,5,6-dodecafluoro-4-tetraquis(butylamino)phthalocyanine, symbol: PcF12(BuNH) 4
3,5,6-dodecafluoro-4-tetraquis(octylamino)phthalocyanine, symbol: PcF12(OxNH) 4
3,6-octafluoro-4,5-octaquis(anilino)phthalocyanine, symbol: PcF8(PhNH) 8
3,6-octafluoro-4,5-octaquis(o-toludino)phthalocyanine, symbol: PcF8(o-MePhNH) 8
3,6-octafluoro-4,5-octaquis(p-toludino)phthalocyanine, symbol: PcF8(p-MePhNH) 8
3,6-octafluoro-4,5-octaquis(m-toludino)phthalocyanine, symbol: PcF8(m-MePhNH) 8
3,6-octafluoro-4,5-octaquis(2,4-xylidino)phthalocyanine, symbol: PcF8(2,4-MePhNH) 8
3,6-octafluoro-4,5-octaquis(2,6-xylidino)phthalocyanine, symbol: PcF8(2,6-MePhNH) 8
3,6-octafluoro-4,5-octaquis(o-methoxyanilino)phthalocyanine, symbol: PcF8(o-MeOPhNH) 8
3,6-octafluoro-4,5-octaquis(p-methoxyanilino)phthalocyanine, symbol: PcF8(p-MeOPhNH) 8
3,6-octafluoro-4,5-octaquis(m-methoxyanilino)phthalocyanine, symbol: PcF8(m-MeOPhNH) 8
3,6-octafluoro-4,5-octaquis(o-fluoroanilino)phthalocyanine, symbol: PcF8(o-FPhNH) 8
3,6-octafluoro-4,5-octaquis(p-fluoroanilino)phthalocyanine, symbol: PcF8(p-FPhNH) 8
3,6-octafluoro-4,5-octaquis(tetrafluoroanilino)phthalocyanine, symbol: PcF8(F4PhNH) 8
3,6-octafluoro-4,5-octaquis(o-ethoxycarbonylanilino)phthalocyanine, symbol: PcF8(o-eCPhNH) 8
3,6-octafluoro-4,5-octaquis(p-ethoxycarbonylanilino)phthalocyanine, symbol: PcF8(p-eCPhNH) 8
3,6-octafluoro-4,5-octaquis(m-ethoxycarbonylanilino)phthalocyanine, symbol: PcF8(m-eCPhNH) 8
3,6-octafluoro-4,5-octaquis(methylamino)phthalocyanine, symbol: PcF8(MeNH) 8
3,6-octafluoro-4,5-octaquis(ethylamino)phthalocyanine, symbol: PcF8(EtNH) 8
3,6-octafluoro-4,5-octaquis(butylamino)phthalocyanine, symbol: PcF8(BuNH) 8
3,6-octafluoro-4,5-octaquis(octylamino)phthalocyanine, symbol: PcF8(OxNH) 8
pentadecafluoro-4-monoanilinophthalocyanine, symbol: PcF15(PhNH)
pentadecafluoro-4-mono(o-toludino)phthalocyanine, symbol: PcF15(o-MePhNH)
pentadecafluoro-4-mono(p-toludino)phthalocyanine, symbol: PcF15(p-MePhNH)
pentadecafluoro-4-mono(m-toludino)phthalocyanine, symbol: PcF158(m-MePhNH)
pentadecafluoro-4-mono(2,4-xylidino)phthalocyanine, symbol: PcF15(2,4-MePhNH)
pentadecafluoro-4-mono(2,6-xylidino)phthatocyanine, symbol: PcF15(2,6-MePhNH)
pentadecafluoro-4-mono(o-methoxyanilino)phthalocyanine, symbol: PcF15(o-MeOPhNH)
pentadecafluoro-4-mono(p-methoxyanilino)phthalocyanine, symbol: PcF15(p-MeOPhNH)
pentadecafluoro-4-mono(m-methoxyanilino)phthalocyanine, symbol: PcF15(m-MeOPhNH)
pentadecafluoro-4-mono(o-fluoroanilino)phthalocyanine, symbol: PcF15(o-FPhNH)
pentadecafluoro-4-mono(p-fluoroanilino)phthalocyanine, symbol: PcF15(p-FPhNH)
pentadecafluoro-4-mono(tetrafluoroanilino)phthalocyanine, symbol: PcF15(F4PhNH)
pentadecafluoro-4-mono(o-ethoxycarbonylanilino)phthalocyanine, symbol: PcF15(o-eCPhNH)

pentadecafluoro-4-mono(p-ethoxycarbonylanilino)phthalocyanine, symbol: PcF15(p-eCPhNH)

pentadecafluoro-4-mono(m-ethoxycarbonylanilino)phthalocyanine, symbol: PcF15(m-eCPhNH)

pentadecafluoro-4-mono(methylamino)phthalocyanine, symbol: PcF15(MeNH)

pentadecafluoro-4-mono(ethylamino)phthalocyanine, symbol: PcF15(EtNH)

pentadecafluoro-4-mono(butylamino)phthalocyanine, symbol: PcF15(BuNH)

pentadecafluoro-4-mono(octylamino)phthalocyanine, symbol: PcF15(OxNH)

(C) type:

3,5,6-dodecafluoro-4-tetraquis(methoxyethoxy)phthalocyanine, symbol: PcF12(CH3OC2H4O) 4

3,5,6-dodecafluoro-4-tetraquis(ethoxyethoxy)phthalocyanine, symbol: PcF12(C2H5OC2H4O) 4

3,5,6-dodecafluoro-4-tetraquis(3′,6′-oxaheptyloxy)phthalocyanine, symbol: PcF12(CH3OC2H4OC2H4O) 4

3,5,6-dodecafluoro-4-tetraquis(3′,6′,9′-oxadecyloxy)phthalocyanine, symbol: PcF12(CH3OC2H4OC2H4OC2H4O) 4

3,5,6-dodecafluoro-4-tetraquis(3′,6′,9′,12′-oxadodecaoxy)phthalocyanine symbol: PcF12(CH$_3$OC$_2$H$_4$OC$_2$H$_4$OC$_2$H$_4$OC$_2$H$_4$O)$_4$ 3,6-octafluoro-4,5-octaquis(methoxyethoxy)phthalocyanine, symbol: PcF8(CH3OC2H4O) 8

3,6-octafluoro-4,5-octaquis(ethoxyethoxy)phthalocyanine, symbol: PcF8(C2H5OC2H4O) 8

3,6-octafluoro-4,5-octaquis(3′,6′-oxaheptyloxy)phthalocyanine, symbol: PcF8(CH3OC2H4OC2H4O) 8

3,6-octafluoro-4,5-octaquis(3′,6′,9′-oxadecyloxy)phthalocyanine, symbol: PcF8(CH3OC2H4OC2H4O) 8

(D) type:

3,5,6-dodecafluoro-4-tetraquis(dimethylaminoethoxy)phthalocyanine, symbol: PcF12(maEtO) 4

3,5,6-dodecafluoro-4-tetraquis(diethylaminoethoxy)phthalocyanine, symbol: PcF12(eaEtO) 4

3,5,6-dodecafluoro-4-tetraquis(diethylaminobutoxy)phthalocyanine, symbol: PcF12(eaBuO) 4

3,6-octafluoro-4,5-octaquis(dimethylaminoethoxy)phthalocyanine, symbol: PcF8(maEtO) 8

3,6-octafluoro-4,5-octaquis(diethylaminoethoxy)phthalocyanine, symbol: PcF8(eaEtO) 8

3,6-octafluoro-4,5-octaquis(diethylaminobutoxy)phthalocyanine, symbol: PcF8(eaBuO) 8

3,6-octafluoro-4,5-octaquis(dimethylaminoethylthio)phthalocyanine, symbol: PcF8(maEtS) 8

3,6-octafluoro-4,5-octaquis(diethylaminoethylthio)phthalocyanine, symbol: PcF8(eaEtS) 8

3,6-octafluoro-4,5-octaquis(diethylaminobutylthio)phthalocyanine, symbol: PcF8(eaBuS) 8

(E) Type:

Sulfonated compounds of phthalocyanine compounds listed below 4,5-octaquis(phenylthio)-3,6-octofluorophthalocyanine, symbol: PcF8(PhS) 8

4,5-octaquis(o-methylphenylthio)-3,6-octafluorophthalocyanine, symbol: PcF8(o-MePhS) 8

4,5-octaquis(p-methylphenylthio)-3,6-octafluorophthalocyanine, symbol: PcF8(p-MePhS) 8

4,5-octaquis(o-methoxyphenylthio)-3,6-octafluorophthalocyanine, symbol: PcF8(o-MeOPhS) 8

4,5-octaquis(p-methoxyphenylthio)-3,6-octafluorophthalocyanine, symbol: PcF8(p-MeOPhS) 8

4,5-octaquis(o-fluorophenylthio)-3,6-octafluorophthalocyanine, symbol: PcF8(o-FPhS) 8

4,5-octaquis(p-fluorophenylthio)-3,6-octafluorophthalocyanine, symbol: PcF8(p-FPhS) 8

4,5-octaquis(m-fluorophenylthio)-3,6-octafluorophthalocyanine, symbol: PcF8(m-FPhS) 8

4-tetraquis(phenoxy)-3,5,6-dodecafluorophthalocyanine, symbol: PcF12(PhO) 4

4-tetraquis(o-methylphenoxy)-3,5,6-dodecafluorophthalocyanine, symbol: PcF12(o-MePhO) 4

4-tetraquis(p-methylphenoxy)-3,5,6-dodecafluorophthalocyanine, symbol: PcF12(p-MePhO) 4

4-tetraquis(o-methoxyphenoxy)-3,5,6-dodecafluorophthalocyanine, symbol: PcF12(o-MeOPhO) 4

4-tetraquis(p-methoxyphenoxy)-3,5,6-dodecafluorophthalocyanine, symbol: PcF12(p-MeOPhO) 4

4-tetraquis(o-fluorophenoxy)-3,5,6-dodecafluorophthalocyanine, symbol: PcF12(o-FPhO) 4

4-tetraquis(p-fluorophenoxy)-3,5,6-dodecafluorophthalocyanine, symbol: PcF12(p-FPhO) 4

4-tetraquis(m-fluorophenoxy)-3,5,6-dodecafluorophthalocyanine, symbol: PcF12(m-FPhO) 4

4,5-octaquis(phenoxy)-3,6-octafluorophthalocyanine, symbol: PcF8(PhO) 8

4,5-octaquis(o-methylphenoxy)-3,6-octafluorophthalocyanine, symbol: PcF8(o-MePhO)

4,5-octaquis(p-methylphenoxy)-3,6-octafluorophthalocyanine, symbol: PcF8(p-MePhO) 8

4,5-octaquis(o-methoxyphenoxy)-3,6-octafluorophthalocyanine, symbol: PcF8(o-MeOPhO) 8

4,5-octaquis(p-methoxyphenoxy)-3,6-octafluorophthalocyanine, symbol: PcF8(p-MeOPhO) 8

4,5-octaquis(o-fluorophenoxy)-3,6-octafluorophthalocyanine, symbol: PcF8(o-FPhO) 8

4,5-octaquis(p-fluorophenoxy)-3,6-octafluorophthalocyanine, symbol: PcF8(p-FPhO) 8

4,5-octaquis(m-fluorophenoxy)-3,6-octafluorophthalocyanine, symbol: PcF8(m-FPhO) 8

In the production method 1 of the novel phthalocyanines according to the present invention, fluorine-containing phthalonitrile as the starting material can be synthesized preferably in accordance with the following scheme (1) or (2). The solvents used for the synthesis in each of the following schemes are inert solvents such as nitrobenzene, acetonitrile, benzonitrile, etc., or aprotonic polar solvents such as pyridine, N,N-dimethylacetoamide, N-methyl-2-pyrolidinone, triethylamine, tri-n-butylamine, dimethyl-sulfone, sulforan, etc.

Preferred condensing agents are organic bases such as triethylamine, tri-n-butylamine, etc., and potassium fluoride. Nucleophilic substitution reagents such as aniline, toluidine, anisidine, n-butylamine, n-octylamine, etc., also can be used as the condensing agent. These synthesizing methods have been disclosed by the inventors of the present invention, in Japanese Patent Application Nos. 63-65806, 1-103554, 1-103555 and 1-209599.

scheme 1

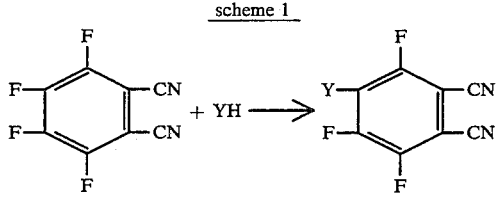

scheme 2

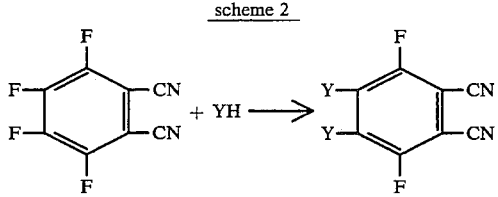

wherein Y has the same meaning as in the general formula (II).

Any solvents can be used as the organic solvent used in the method (1) of producing novel phthalocyanine according to the present invention as long as they are inert solvents not having a reactivity with the starting materials. Examples of such organic solvents are inert solvents such as benzene, toluene, xylene, nitrobenzene, monochlorobenzene, dichlorobenzene, trichlorobenzene, chloronaphthalene, methylnaphthalene, ethylene glycol, benzonitrile, etc., or aprotonic polar solvents such as pyridine, N,N-dimethylformamide, N,N-dimethylacetoamide, N-methyl-2-pyrolidinone, triethylamine, tri-n-butylamine, dimethylsulfone, dimethyl sulfoxyde, sulforan, etc., and preferred are chloronaphthalene, trichlorobenzene, benzonitrile, and N-methyl-2-pyrodinone.

In the production method (1) of the novel phthalocyanine of the present invention, phthalonitrile represented by the general formula (II) is preferably used in an amount of 2 to 30 parts by weight on the basis of 100 parts by weight of the organic solvent. The metal compound represented by the general formula (III) is preferably used in an amount of 0.20 to 0.35 mole, preferably 0.25 to 0.30 mole, on the basis of one mole of phthalonitrile represented by the general formula (II).

The reaction temperature is preferably within the range of 100° to 250° C., and particularly preferably within the range of 120° to 200° C.

The reaction solvents used in the method (2) of producing the novel phthalocyanine of the present invention are inert solvents such as nitrobenzene, monochlorobenzene, dichlorobenzene, trichlorobenzene, chloronaphthalene, benzonitrile, etc., or aprotonic polar solvents such as pyridine, N,N-dimethylacetoamide, N-methyl-2-pyrolidinone, triethylamine, tri-n-butylamine, dimethylsulfone, dimethyl sulfoxyde, sulforan, etc. Preferred are benzonitrile, N,N-dimethyl-acetoamide, N-methyl-2-pyrolidinone, triethylamine, and tri-n-butylamine.

In the production method (2) of the novel phthalocyanine of the present invention, phthalocyanine represented by the general formula (IV) is preferably used in an amount of 2 to 30 parts by weight on the basis of 100 parts by weight of the organic solvents. The nucleophilic substitution compound represented by the general formula (V) is preferably used in an amount of 1 to 1,000 mol parts on the basis of one mole part of phthalocyanine represented by the general formula (IV), particularly preferably within the range of 2 to 300 mole parts. When these nucleophilic substitution compounds are liquid under the condition of the use, the starting materials can be used, as such, as the solvent without effecting a dilution by using the organic solvents described above.

The reaction temperature is preferably within the range of 40° to 250° C., particularly preferably 80° to 200° C.

Among the phthalocyanine compounds represented by the general formula (I) of the present invention, phthalocyanines having the phenyl group which is substituted by the alkylcarbonyl group, can be converted to the carboxyl group by the hydrolysis for example by heating in an aqueous sulfuric acid solution.

The production process (3) of the present invention provides a fluorine-containing phthalocyanine of the present invention represented by the formula (VI). The phthalocyanine (VI) can be obtained by sulfonating a fluorine-containing phthalocyanine represented by the formula (VII). In this method, as sulfonating agents, sulfuric acid, fuming sulfuric acid, sulfur trioxide, chlorosulfuric acid, fluorosulfuric acid, amidesulfuric acid, and sulfur trioxide complex are mentioned. Preferably, sulfuric acid, fuming sulfuric acid, sulfur trioxide, sulfer trioxide complex, chlorosulfuric acid and fluorosulfuric acid are used, and especially chlorosulfuric acid is preferable.

The organic solvents used in the Production Process (3) may be any solvents as long as they can dissolve the starting materials or can form a slurry. Examples of such solvents include halogen type solvents such as dichloromethane, chloroform, carbon tetrachloride, 1,2-dichlorethane, 1,1,2-trichlorethane, 1,1,2,2-tetrachloroethane, etc., aromatic solvents such as nitrobenzene, benzonitrile, etc., and carbon disulfide. Particularly preferred are the halogen type solvents such as dichloromethane, 1,2,2-dichloromethane, chloroform, carbon tetrachloride, 1,1,2,2-tetrachloroethane, etc., because they have a high solubility for the starting materials and can smoothly carry out the sulfonation reaction.

The reaction temperature is selected appropriately in accordance with the kind of the starting materials, the solvent, and other conditions, but is generally selected within the range of room temperature to 200° C., preferably from 40° C. to 150° C.

The novel fluorine-containing phthalocyanine compound of the general formula (VI) produced by the Production Process (3) has high solubility in organic solvents, particularly in alcoholic solvents. Examples of the alcoholic solvents are C1 to C12 straight chain or branched chain alcohols such as methanol, ethanol, propanol, etc.; cellosolves such as ethyl cellosolve; glycols such as monoethylene glycol, diethylene glycol, etc.; diacetone alcohol; and halogenated alcohols such as tetrafluoropropanol.

In the phthalocyamine compound of the general formula (VI), the aryl group in the starting phthalocyanine is sulfonated to provide a suitable solubility in the alcoholic solvent. In the present invention, when the sulfonic acid group per se is introduced into phthalocyanine, solubility in the alocholic solvent becomes high, but the solubility can be improved further by reacting the sulfonic acid group with ammonia or with organic amines to convert it to an ammonium salt or a sulfone amide group.

These fluorine-containing phthalocyanine compounds also have a solubility in water. To further improve the solubility in water, it is effective to react the sulfonic acid group with a metal such as an alkali metal to convert it to a metal salt of the sulfonic acid group.

The fluorine-containing phthalocyanine (general formula (VII)) as a starting material of the production process (3) can be synthesized by any of the following synthesis methods (1) to (3). Among these synthesis methods, the first step of the methods (1) and (3), the second step of the method (1) and the second step of the method (3) have been disclosed in Japanese Patent Application Nos. 63-65806, 1-103554, 1-103555 and 1-209599, by the inventors of the present invention.

Synthesis method (1)

(First step)

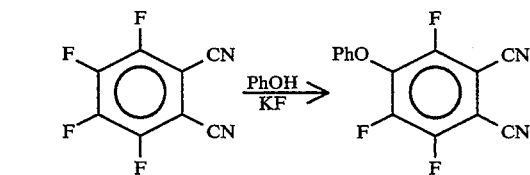

(second step)

-continued (second step)

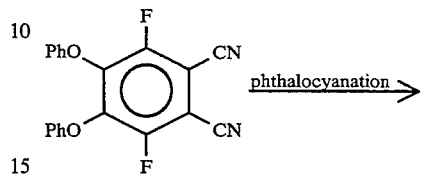

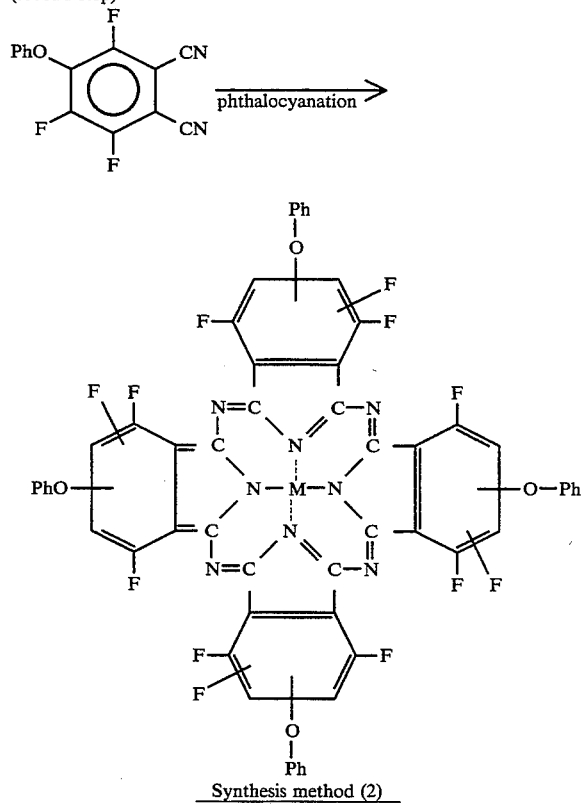

Synthesis method (3)

(first step)

(second step)

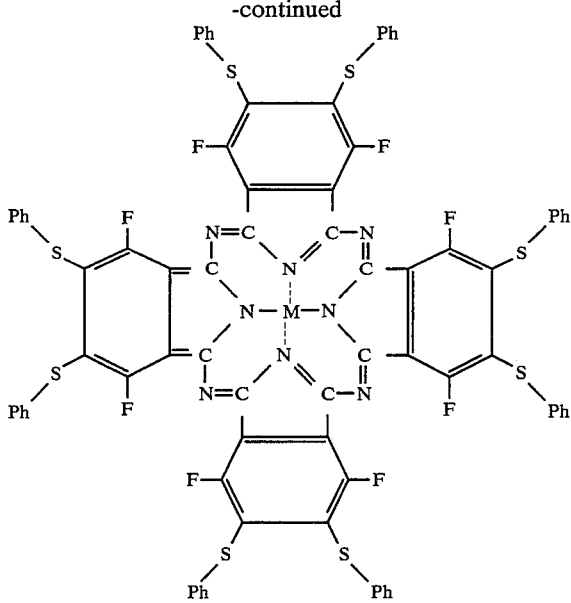

It is possible to use nitriles such as acetonitrile, and potassium fluoride, etc., as a condensing agent in the first step of each of the synthesis methods (1), (2) and (3). The reaction condition in the first step of the synthesis method (2) is the same as that of the first step in the synthesis method (1) except that the feed ratios of ROH, KF and tetrafluorophthalonitrile are different.

In the synthesis methods (2) and (3), it is also possible to mitigate the reaction condition of the first step in such a manner that the 4-position or the 5-position is not completely substituted by OR or SR but a fluorine atom partially remains, and to use this reaction product as the starting material of the second step. In these cases, the reaction product containing unsubstituted fluorine atoms at the 4- and 5-positions besides the fluorine atoms of the 3- and 6-positions, exists in phthalocyanines as the intended final reaction product, but such a product may be contained within the range which does not exert an adverse influence on properties such as the solubility.

Phthalocyanines of the types A), B) and C) of the definite examples given above among the phthalocyanine compounds of the general formula (I) are highly soluble in organic solvents, particularly in alcoholic type solvents and ketone type solvents such as straight-chain or branched chain alcohols as typified by methanol, ethanol, propanol, etc.; cellosolves such as ethyl cellosolve; glycols such as monoethylene glycol, diethylene glycol, etc.; diacetone alcohol; halogenated alcohols such as tetrafluoropropanol; acetone, and methyl ethyl ketone. This is due to the synergistic effect of the fluorine atoms substituted to the phthalocyanine nucleus and the functional group. Moreover, various absorption wavelengths can be controlled broadly by selecting the number of the fluorine atoms, the kind of the substitution groups and the center metal.

The phthalocyanine of the type D) of the definite example given above is highly soluble in organic solvents, particularly in hydrocarbon solvents such as benzene, toluene and xylene. This is due to the synergistic effect of the fluorine atoms and the functional group substituted on the phthalocyanine nucleus. Moreover, the absorption wavelength can be widely controlled by selecting the number of the fluorine atoms, the kind of substituent groups, and the center metal.

When compared with known phthalocyanine compounds soluble in the alcoholic solvent (e.g. the compounds disclosed in Japanese Unexamined Patent Publication (KOKAI) No. 63-295578, the above-mentioned type E) compound of the present invention has a higher solubility in the alcoholic solvent, even though the sulfonated product is not converted further to a sulfone amide. The compound of the present invention, of course, also can have a higher solubility in the alcoholic solvent when converted to a sulfone amide. The compound of the present invention has an absorption in the near IR band of 600 to 1000 nm.

It is believed that these unique functions are brought about by the cooperation between the two fluorine atoms at the 3,6-positions of the phthalocyanine ring, and the fluorine atom, the ether aryl group, the thioether aryl group at the 4-position or the 5-position and the sulfonic acid group bonded to them.

According to the production method of the present invention, a molecular design of compounds having different near IR absorption wavelength band or solubility in accordance with the intended applications becomes possible, and since a complicated production step is not necessary in this case, the present invention is industrially advantageous. Namely, the present invention can introduce desired substituents into the phthalocyanine ring in accordance with the intended object, and further, can produce efficiently phthalocyanine having a high purity. The novel compound of the present invention does not contain the chlorine atom and the bromine atom that lower the solubility, as described in Japanese Unexamined Patent Publication (KOKAI) No. 63-295578, and the fluorine atoms in the compound of the present invention have the effect of improving the solubility.

As described above, the novel compounds of the present invention can control the absorption wavelength within the absorption wavelength band of 600 to 1,000 nm in accordance with the object, and have a high solubility in solvents in accordance with the application, and in both hydrophilic solvents and lipophilic solvents; they also have the excellent light-fastness inherent to phthalocyanine. Therefore, the novel compounds of the present invention can be used as the near IR absorption pigment in fields in which this has not been accomplished by the prior art techniques.

EXAMPLES

Hereinafter, the present invention will be explained in further detail with reference to Examples thereof.

Example 1

ZnPcF8(PhS) 8 (SO$_3$H) 15 Synthesis example (1) of starting materials ZnPcF8(PhS) 8

19.6 g (98 mmol) of tetraphthalonitrile, 21.6 g (196 mmol) of thiophenol, 17.1 g (294 mmol) of potassium fluoride and 100 ml of acetonitrile were fed into a 200 ml four-necked flask and the mixture was stirred at 50° C. for 12 hours. The temperature was then returned to room temperature, and the resulting yellow solid was filtrated. The resulting cake was washed with methanol and then with hot water to give 34.55 g of 3,6-difluoro-4,5-bisphenylthiophthalonitrile.

10 g (26.2 mmol) of the resulting 3,6-difluoro-4,5-bisphenylthiophthalonitrile, 3.14 g (9.8 mmol) of zinc iodide and 50 ml of α-chloronaphthalene were fed into a 100 ml flask, and the mixture was stirred at 200° C. for 5 hours. Then, the reaction mixture was cooled and the reaction product was poured into 200 ml of ethanol, and the resulting green solid was filtrated, and was washed with methanol, benzene and water in that order, using a Soxhlet extractor, to give 9.44 g of ZnPcF8(PhS) 8. Production of ZnPcF8(PhS) 8 (SO$_3$H) 15

1.59 g (1 mmol) of octafluorooctaquis(phenylthio)-zinc phthalocyanine obtained in Synthesis Example 1 described above and 20 ml of 1,1,2,2-tetrachloroethane were fed into a 100 ml four-necked flask, and the mixture was stirred and kept at 80° C. 3.12 g (24 mmol) of chlorosulfonic acid dissolved in 10 ml of tetrachloroethane was added gradually and dropwise to this mixture. After this addition was completed, the reaction mixture was heated further to 140° C. and reacted for 2 hours. After the reaction was completed, the reaction mixture was cooled to room temperature and filtrated, and the resulting dark brown cake was washed twice with 100 ml of tetrachloroethane to give 2.09 g of the intended compound, i.e. sulfonated phthalocyanine. As a result of analysis, this phthalocyanine was found to contain 15 sulfonic acid groups in one molecule.

Visible absorption spectrum:
maximum absorption wavelength in ethanol:

| maximum absorption wavelength in ethanol: |
|---|
| 725.0 nm ($\epsilon$ = 1.84 × 10$^5$) |
| maximum absorption wavelength in water: |
| 700 nm ($\epsilon$ = 9.52 × 10$^4$) |

Solubility:
ethanol: 10 wt %
ethyl cellosolve: 19 wt %
water: 12 wt %

Elementary analysis (assuming that 15 sulfonic acid groups are contained):

|  | H | C | N | S | F |
|---|---|---|---|---|---|
| calculated: | 1.98 | 34.28 | 4.00 | 26.31 | 5.42 |
| found: | 2.01 | 35.67 | 4.11 | 25.05 | 5.62 |

The IR absorption spectrum of this compound is shown in FIG. 1.

Example 2

Production of ZnPcF8(PhS) 8 (SO$_3$H) 5

The procedures of Example 1 were carried out in the same way except that 0.52 g (4 mmol) of chlorosulfonic acid was used. There was thus obtained 1.81 g of the intended compound, i.e. sulfonated phthalocyanine. As a result of analysis, this sulfonated phthalocyanine was found to contain five sulfonic acid groups in one molecule.

Visible absorption spectrum:
maximum absorption wavelength:
in ethyl cellosolve: 698.5 nm ($\epsilon$=1.14×10$^5$)
Solubility:
in ethyl cellosolve: 10 wt %
Elementary analysis (assuming that five sulfonic acid groups were contained):

|  | H | C | N | S | F |
|---|---|---|---|---|---|
| calculated: | 2.03% | 48.35% | 5.64% | 20.9% | 7.65% |
| found: | 2.18% | 48.22% | 5.48% | 21.11% | 7.58% |

Figure 2:
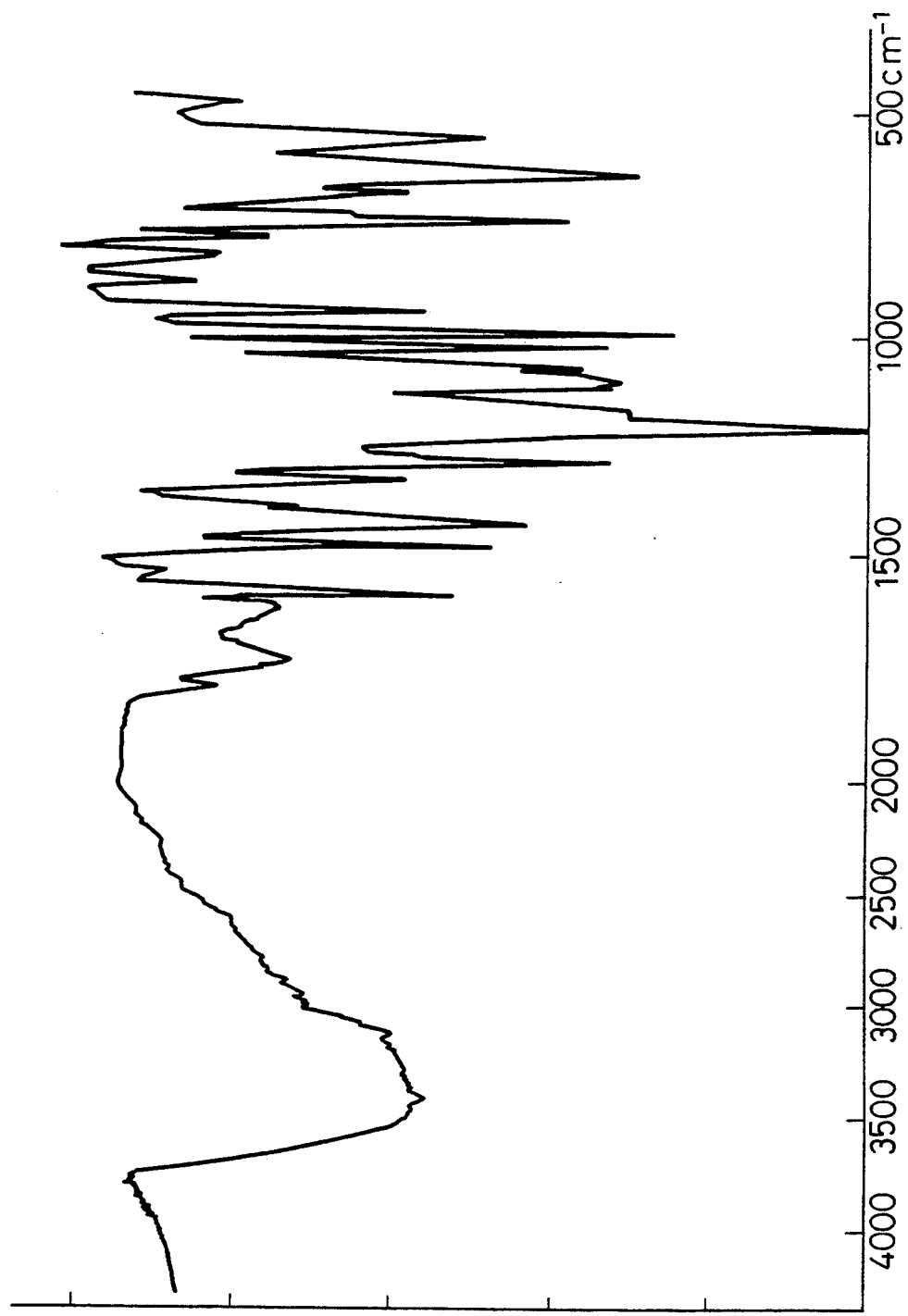
FIG. 2 shows an IR absorption spectrum of the compound obtained in Example 2.

The IR absorption spectrum of this compound is shown in FIG. 2.

Example 3

Production of VOPcF8(PhS) 8 (SO$_3$H) 1

The procedures of Example 1 were followed in the same way except that octafluorooctaquis(phenylthio)-vanadyl phthalocyanine was used in place of octafluorooctaquis(phenylthio)zinc phthalocyanine, and 0.13 g (1 mmol) of chlorosulfonic acid was used. There was thus obtained 1.39 g of the intended compound, i.e. sulfonated phthalocyanine. As a result of analysis, this sulfonated phthalocyanine was found to contain one sulfonic acid group in one molecule.

Visible absorption spectrum:
maximum absorption wavelength in ethyl cellosolve:

745.0 nm($\epsilon$=1.25×10$^5$)

Solubility in ethyl cellosolve: 8 wt %
Elementary analysis (assuming that one sulfonic acid group was contained):

|  | H | C | N | S | F |
|---|---|---|---|---|---|
| calculated: | 2.42% | 57.78% | 6.71% | 17.29% | 9.11% |
| found: | 2.59% | 57.55% | 6.75% | 17.31% | 8.94% |

Figure 3:
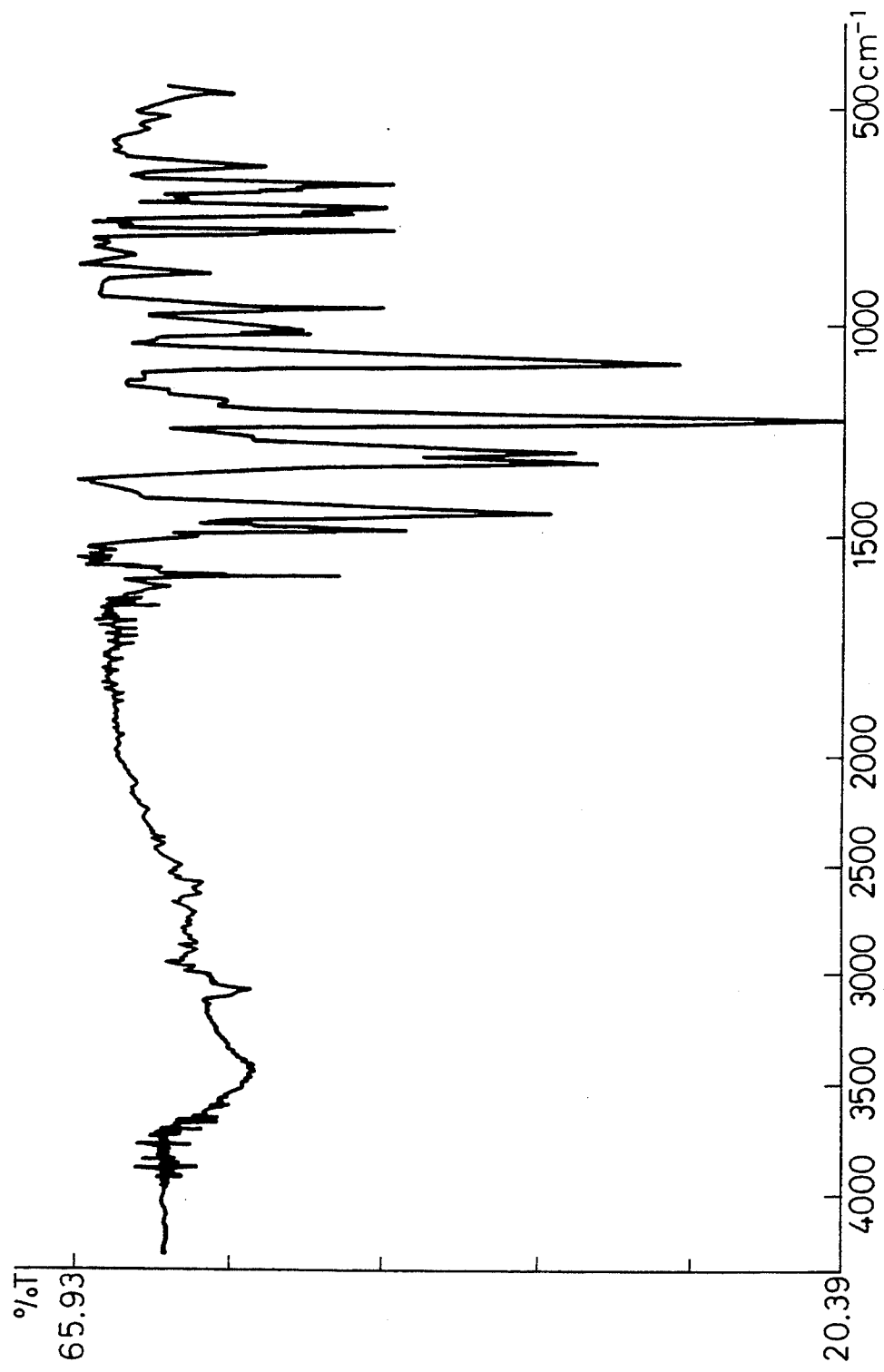
FIG. 3 shows an IR absorption spectrum of the compound obtained in FIG. 3.

The IR absorption spectrum of this compound is shown in FIG. 3.

Examples 4–10

The procedures of Example 1 were followed in the same way except that phthalocynanines tabulated in Table 1 were used in place of octafluorooctaquis(-phenylthio)zinc-phthalocyanine, respectively, and chlorosulfonic acid was used in the amounts tabulated in Table 1, respectively. There were thus obtained phthalocyanines having the sulfonation numbers tabulated in Table 1, respectively. The absorption wavelengths and solubility in solvents of these sulfonated phthalocyanines are shown in Table 1.

TABLE 1

| | Starting materials | | Sulfonated Phthalocyanine | | | | |
|---|---|---|---|---|---|---|---|
| | PC Symbol | | | Sulfonation | in methanol | | |
| | feed amount (g) | Chloro-sulfonic acid feed amount (g) | Yield (g) | number (SO$_3$H) n | λ max (nm) | $\epsilon$ (×10$^4$) | Solubility (%) |
| Examples | | | | | | | |
| 4 | VOPcF8(PhS) 8 | | 1.98 | n = 11 | 743 | 5.94 | 10 |
| | 1.59 | 2.08 | | | | | |
| 5 | SnCL2PcF8(PhS) 8 | | 1.95 | n = 8 | 796 | 8.53 | 8 |
| | 1.71 | 2.08 | | | | | |
| 6 | InCL2PcF8(PhS) 8 | | 2.08 | n = 8 | 736 | 4.30 | 11 |
| | 1.67 | 2.08 | | | | | |

TABLE 1-continued

| Examples | Starting materials PC Symbol feed amount (g) | Starting materials Chlorosulfonic acid feed amount (g) | Sulfonated Phthalocyanine Yield (g) | Sulfonation number (SO₃H) n | in methanol λ max (nm) | in methanol ε (×10⁴) | Solubility (%) |
|---|---|---|---|---|---|---|---|
| 7 | TiOPcF8(PhS) 8 4.80 | 5.82 | 5.10 | n = 9 | 748 | 9.29 | 15 |
| 8 | CoPcF8(PhS) 8 1.58 | 2.08 | 1.56 | n = 4 | 701 | 12.5 | 7 |
| 9 | ZnPcF8(MePhS) 8 1.70 | 2.08 | 2.15 | n = 8 | 722 | 16.5 | 8 |
| 10 | NiPcF8(O—FPhS) 8 1.80 | 1.04 | 1.51 | n = 1 | 685 | 14.5 | 9 |

Example 11

Fe(CO) 2PcF8(PhS) 8 (SO₃H) 12 Synthesis Example (2) of starting material Fe(CO)₂PcF8(PhS)8

Five g (13.2 mmol) of 3,6-difluoro-4,5-bisphenylthiophthalonitrile and 50 ml of methyl naphthalene were fed into a 100 ml four-necked flask, and the reaction mixture was stirred at 200° C. under a N₂ stream. 20 ml of methyl naphthalene dissolving therein 0.71 g (3.6 mmol) of pentacarbonyl iron was added dropwise in the course of about 30 minutes, and the reaction mixture was as such kept at 200° C. for 4 hours. After cooling, the reaction product was placed into 500 ml of ligroin, stirred, then filtrated, washed with benzene and acetone in that order, and dried to give 3.28 g of a deep green cake (yield=60.9% on the basis of 3,6-difluoro-4,5-bis-phenylthiophthalonitrile).

Production of Fe(CO) 2 PcF8(phS) 8 (SO₃H) 12

The procedures of Example 1 were followed in the same way except that 1.63 g (1 mmol) of octafluorooctaquis(phenylthio)iron carbonylphthalocyanine obtained in Synthesis Example 2 described above was used in place of octafluorooctaquis(phenylthio)zinc phthalocyanine, and 1.04 g (8 mmol) of chlorosulfonic acid was used. There was thus obtained 2.59 g of the intended compound, i.e. sulfonated phthalocyanine. As a result of analysis, these sulfonated phthalocyanines were found to contain 12 sulfonic groups in one molecule.

Visible absorption spectrum:
maximum absorption wavelength in ethyl cellosolve:

699.5 nm(ε=1.01×10⁵)

Solubility in ethyl cellosolve: 19 wt %
Elementary analysis (assuming that 12 sulfonic acid groups were contained):

|  | H | C | N | S | F |
|---|---|---|---|---|---|
| calculated: | 1.54% | 37.56% | 4.32% | 24.69% | 5.86% |
| found: | 1.45% | 38.20% | 4.13% | 24.17% | 5.71% |

Figure 4:
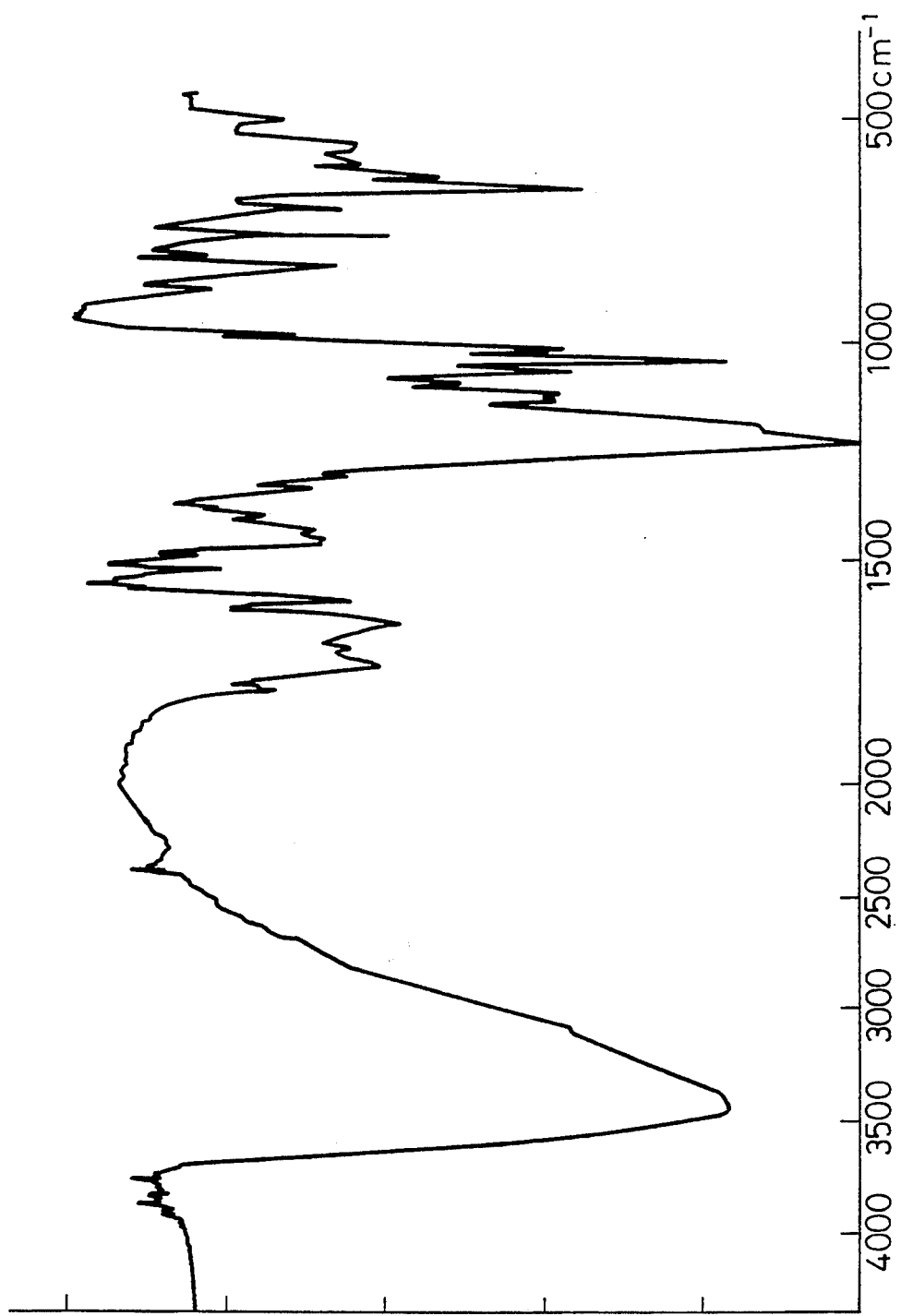
FIG. 4 shows an IR absorption spectrum of the compound obtained in Example 11.

The IR absorption spectrum of this compound is shown in FIG. 4.

Example 12

CuPcF12(PhO) 4 (SO₃H) 4 Synthesis Example (3) of starting material CuPcF12(PhO) 4

20.0 g (100 mmol) of tetrafluorophtharonitrile, 9.4 g (100 mmol) of phenol, 5.8 g of KF and 100 ml of acetonitrile were fed into a 200 ml four-necked flask, and the reaction mixture was stirred at 5° C. for 3 hours. Thereafter, the solid matter was filtrated and the filtrate was evaporated for driness to give 22.5 g of 3,4,6-trifluoro-5-phenoxyphthalonitrile.

Five gram (18.4 mmol) of 3,4,6-trifluoro-5-phenoxyphthalonitrile obtained previously, 0.95 g (9.1 mmol) of cuprous chloride and 50 ml of N-methyl-2-pyrolidone were fed into a 100 ml flask, and the reaction mixture was stirred at 175° C. for 5 hours. Thereafter, the reaction mixture was cooled, and the reaction product was poured into 500 ml of water. The resulting violet solid was filtrated and was then washed with methanol to give 2.6 g of CuPcF12(PhO) 4.

Production of CuPcF12 (PhO) 4 (SO₃H) 4

1.16 g (1 mmol) of dodecaquisfluorotetra(phenoxy)-copper phthalocyanine and 20 ml of 1,1,2,2-tetrachloroethane were fed into a 100 ml four-necked flask, and the reaction mixture was stirred at 80° C. 1.04 g (8 mmol) of chlorosulfonic acid dissolved in 10 ml of tetrachloroethane was added gradually and dropwise to the reaction mixture. After this addition was completed, the reaction mixture was heated to 140° C. and was reacted further for 2 hours. After the reaction was completed, the reaction product was cooled to room temperature, and the resulting dark brown cake was washed twice with tetrachloroethane to give 1.18 g of the intended compound, i.e. sulfonated phthalocyanine. As a result of analysis, this phthalocyanine was found to contain 5 to 6 sulfonic acid groups in one molecule.

Visible absorption spectrum:
maximum absorption wavelength:
in methyl cellosolve: 652.5 nm (ε=6.55×10⁴) in water: 636.5 nm (ε=4.75×10⁴)

Solubility: 25 wt % in ethyl cellosolve
Elementary analysis (assuming that 5 sulfonic acid groups were contained):

|  | H | C | N | S | F |
|---|---|---|---|---|---|
| calculated: | 1.36% | 45.43% | 7.57% | 8.66% | 15.40% |
| found: | 1.64% | 45.17% | 7.33% | 8.48% | 15.24% |

Figure 5:
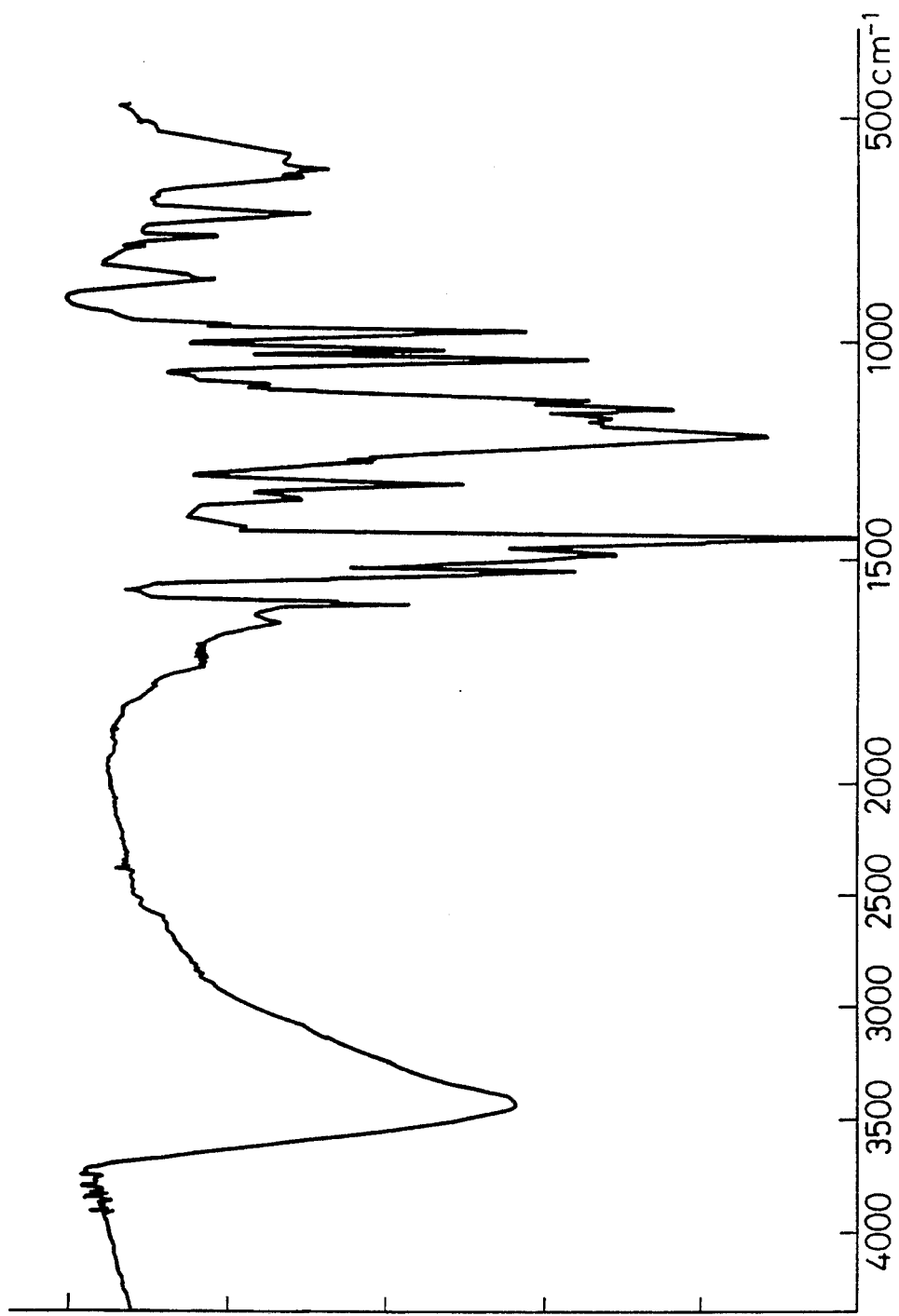
FIG. 5 shows an IR absorption spectrum of the compound obtained in Example 12.

The IR absorption spectrum of this compound is shown in FIG. 5.

Example 13

Production of VOPcF 12 (PhO) 4 (SO₃H) 5

1.16 g (1 mmol) of dodecaquisfluorotetra(phenoxy)oxyvanadium phthalocyanine and 20 ml of 1,1,2,2-tetrachloroethane were fed into a 100 ml four-necked flask, and the reaction mixture was stirred at 80° C. Then, 1.04 g (8 mmol) of chlorosulfonic acid dissolved in 10 ml of tetrachloroethane was added gradually and dropwise. After the addition was completed, the reaction mixture was heated to 140° C. and was further reacted for 2 hours. After the reaction was completed, the reaction product was cooled to room temperature and the resulting dark brown cake was washed twice with 100 ml of tetrachloroethane to give 1.32 g of the intended compound, i.e. sulfonated phthalocyanine. As a result of analysis, this phthalocyanine was found to contain 5 to 6 sulfonic acid groups in one molecule.

Visible absorption spectrum:
maximum absorption wavelength:
in methanol: 700.5 nm ($\epsilon = 5.38 \times 10^4$)
in water: 668.0 nm ($\epsilon = 2.75 \times 10^4$)
Solubility:
in methanol: 25 wt %
in ethyl cellosolve: 23 wt %

Figure 7:
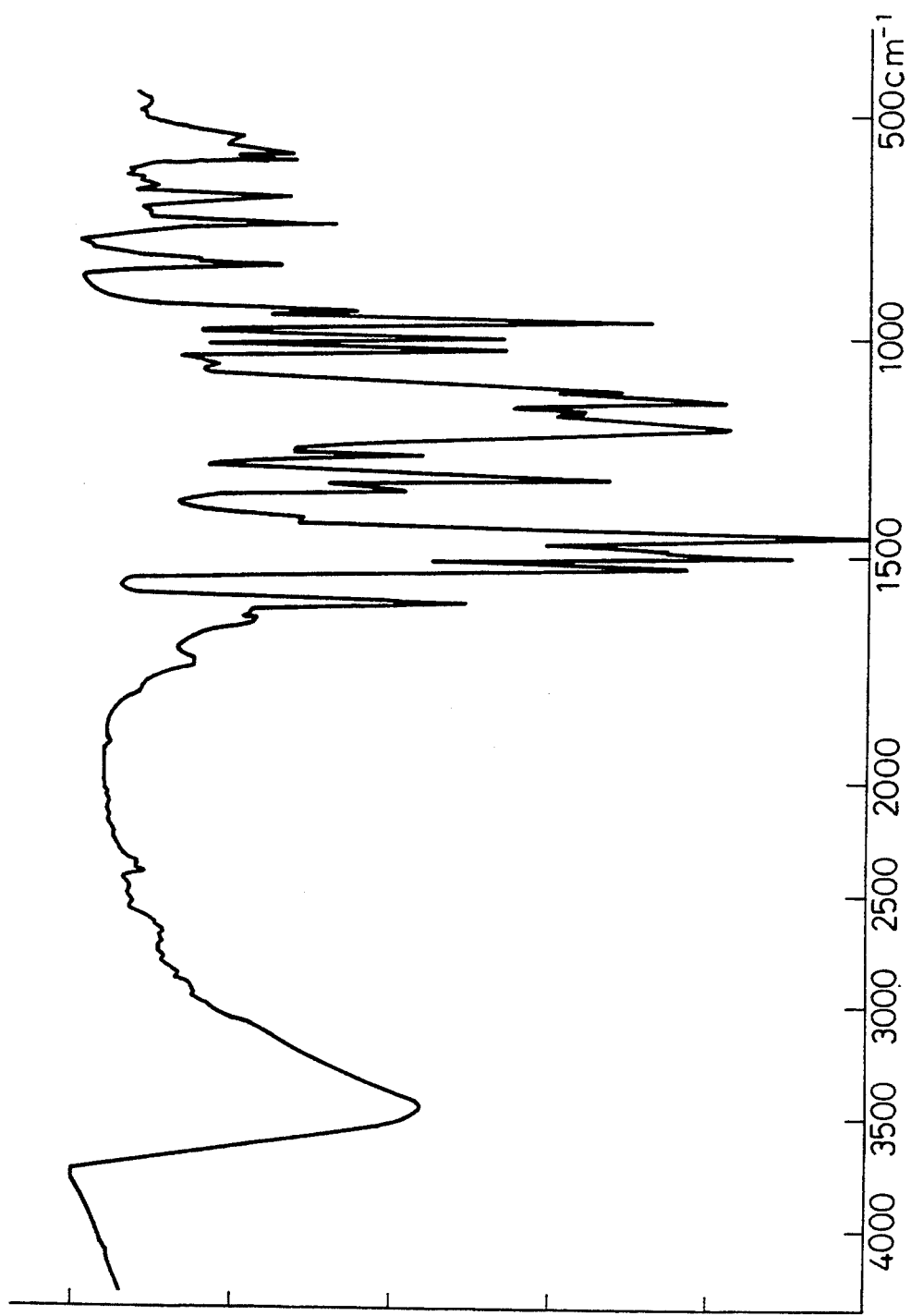
FIG. 7 shows an IR absorption spectrum of the compound obtained in Example 14.

The IR absorption spectrum of this compound is shown in FIG. 7.

Examples 15–19

The procedures of Example 13 were followed in the same way except that phthalocyanines tabulated in Table 2 were used in place of dodecaquisfluorotetra(phenoxy)oxyvanadium phthalocyanine, respectively, and chlorosulfonic acid was used in the amounts tabulated in Table 2, respectively. There were thus obtained phthalocyanines having the sulfonation numbers shown in Table 2. The absorption wavelengths and solubility in solvents of these sulfonated phthalocyanines are shown in Table 2.

TABLE 2

| | Starting materials | | Sulfonated Phthalocyanine | | | |
| | PC Symbol | | | | in methanol | |
| Examples | feed amount (g) | Chloro-sulfonic acid feed amount (g) | Yield (g) | Sulfonation number $(SO_3H)_n$ | $\lambda$ max (nm) | $\epsilon$ ($\times 10^4$) | Solubility (%) |
|---|---|---|---|---|---|---|---|
| 15 | ZnPcF12(PhO) 4 1.16 | 1.04 | 1.20 | n = 4 | 654 | 6.93 | 22 |
| 16 | CoPcF12(PhO) 4 1.45 | 0.52 | 1.26 | n = 5 | 690 | 12.2 | 12 |
| 17 | NiPcF12(PhS) 4 1.57 | 0.69 | 1.18 | n = 3 | 705 | 10.1 | 7 |
| 18 | TiOPcF12(P—FPhO) 8 1.15 | 0.22 | 1.04 | n = 1 | 673 | 8.21 | 10 |
| 19 | (CoPcF12(MeOPhO) 4 1.45 | 0.52 | 1.37 | n = 3 | 703 | 9.56 | 6 | in diacetone alcohol: 15 wt %
in water: 18 wt %
Elementary analysis (assuming that 5 sulfonic acid groups were contained):

| | H | C | N | S | F |
|---|---|---|---|---|---|
| calculated: | 1.36% | 45.33% | 7.55% | 8.64% | 15.36% |
| found: | 1.58% | 44.92% | 7.08% | 8.32% | 14.98% |

Figure 6:
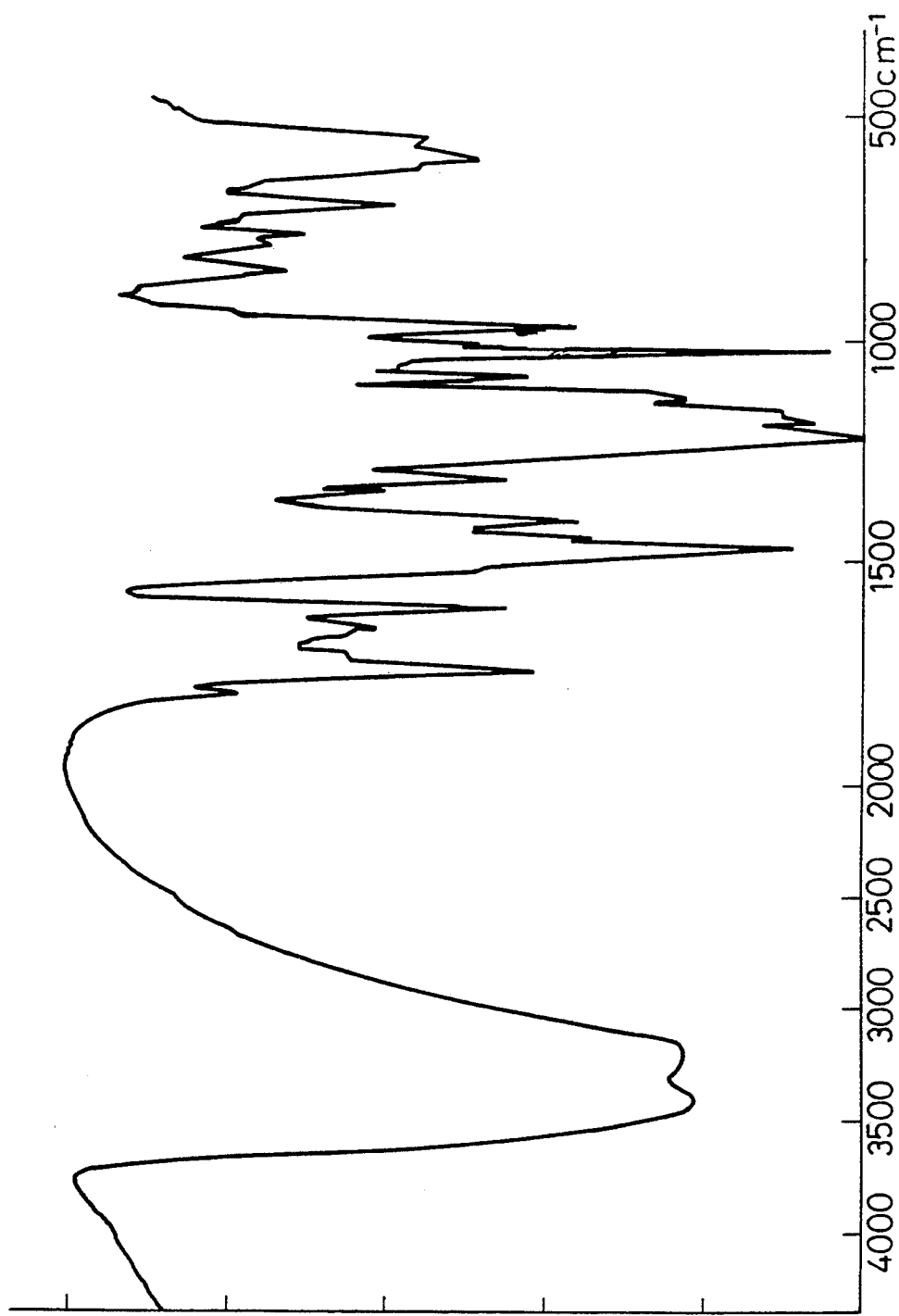
FIG. 6 shows an IR absorption spectrum of the compound obtained in Example 13.

The IR absorption spectrum of this compound is shown in FIG. 6.

Example 14

Production of CuPcF12(PhO) 4 (SO$_3$H) 2

The procedures of Example 13 were followed in the same way except that 1.16 g (1 mmol) of dodecaquisfluorotetra(phenoxy)copper phthalocyanine and 0.26 g (2 mmol) of chlorosulfonic acid were used. There was thus obtained 0.92 g of the intended compound, i.e. sulfonated phthalocyanine. As a result of analysis, this phthalocyanine was found to contain 2 sulfonic acid groups in one molecule.

Visible absorption spectrum:
maximum absorption spectrum in ethyl cellosolve:

648.5 nm($\epsilon = 7.21 \times 10^4$)

Solubility in ethyl cellosolve: 26 wt %
Elementary analysis (assuming that two sulfonic acid groups were contained):

| | H | C | N | S | F |
|---|---|---|---|---|---|
| calculated: | 1.53% | 50.94% | 8.49% | 4.86% | 17.27% |
| found: | 1.71% | 51.19% | 8.32% | 5.28% | 19.97% |

Example 20

CoPcF8 (PhO) 8 (SO$_3$H) 6 Synthesis example (4) of starting material CoPcF8 (Pho) 8

20.0 g (100 mmol) of tetrafluorophthalonitrile, 18.8 g (100 mmol) of phenol, 10.8 g of KF and 100 ml of acetonitrile were fed into a 200 ml of a four-necked flask, and the reaction mixture was stirred at 5° C. for 3 hours. Thereafter, the solid matter was filtrated and the filtrate was evaporated for dryness. There was thus obtained 27.4 g of 3,6-difluoro-4,5-bisphenoxyphthalonitrile.

6.7 g (19.3 mmol) of 3,6-difluoro-4,5-bisphenoxyphthalonitrile obtained above, 0.75 g (5.8 mmol) of cobalt chloride and 50 ml of benzonitrile were fed into a 100 ml flask, and the reaction mixture was stirred at 175° C. for 6 hours. Then, the reaction mixture was cooled and the reaction product was poured into 200 ml of acetone. The resulting violet solid matter was filtrated, and was then washed with acetone. There was thus obtained 3.0 g of CoPcF8 (PhO) 8.

Production of CoPcF8(PhO) 8 (SO$_3$H) 6

1.45 g (1 mmol) of octafluorooctaquis(phenoxy)cobalt phthalocyanine and 20 ml of 1,1,2,2-tetrachloroethane were fed into a 100 ml four-necked flask, and the reaction mixture was stirred at 80° C. Then, 0.52 g (4 mmol) of chlorosulfonic acid disscolved in 10 ml of tetrachloroethane was added gradually dropwise to the reaction mixture. After this addition was completed, the reaction mixture was heated to 140° C. and was reacted further for 2 hours. After the reaction was completed, the reaction product was cooled to room temperature and the resulting dark brown cake was washed twice with 100 ml of tetrachloroethane. There was thus obtained 1.26 g of the intended compound, i.e., sulfonated phthalocyanine. As a result of analysis, this phthalocyanine was found to contain 5 sulfonic acid groups in one molecule.

Visible absorption spectrum:

maximum absorption wavelength;
in ethyl cellosolve: 690.0 nm ($\epsilon = 1.22 \times 10^5$)
Solubility:
in ethyl cellosolve: 12 wt %
Elementary analysis (assuming that five sulfonic acid groups were contained):

|  | H | C | N | S | F |
|---|---|---|---|---|---|
| calculated: | 2.34% | 55.72% | 6.50% | 9.30% | 8.81% |
| found: | 2.51% | 55.89% | 6.31% | 9.58% | 8.64% |

Figure 8:
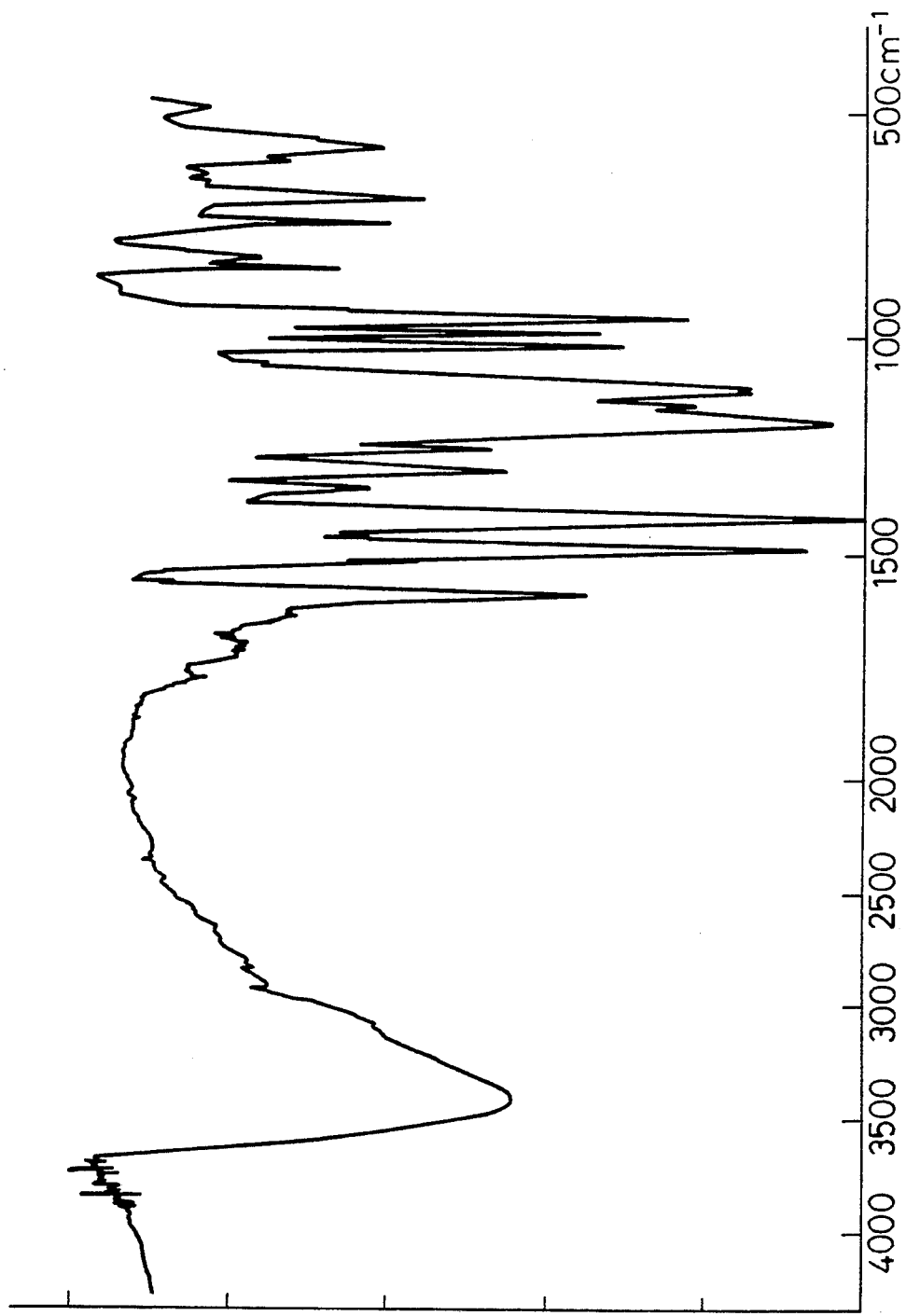
FIG. 8 shows an IR absorption spectrum of the compound obtained in Example 20.

The IR absorption spectrum of this compound is shown in FIG. 8.

Examples 21–23

The procedures of Example 20 were followed in the same way except that phthalocyanines tabulated in Table 3 were used in place of octafluorooctaquis(phenoxy)cobalt phthalocyanine and chlorosulfonic acid was used in the amounts tabulated in Table 3, respectively. The absorption wavelengths and solubility of the resulting phthalocyanines are shown in Table 3.

TABLE 3

| | Starting material | | | Sulfonated phthalocyanine | | | |
|---|---|---|---|---|---|---|---|
| | Symbol | | | | In ethyl cellosolve | | |
| Examples | feed amount (g) | chloro-sulfonic acid feed amount (g) | Yield (g) | Sulfonation number (SO$_3$H)n | $\lambda_{max}$ (nm) | $\epsilon$ ($\times 10^4$) | solubility (%) |
| 21 | VOPcF8(PhO)8 1.62 | 1.04 | 1.78 | n = 14 | 723 | 11.3 | 16 |
| 22 | ZnPcF8(MePhO)8 1.59 | 1.04 | 1.75 | n = 10 | 673 | 9.36 | 18 |
| 23 | VOPcF8(o-FPhO)8 1.87 | 1.04 | 1.82 | n = 8 | 710 | 7.33 | 20 |

Example 24

Production of octafluorooctaguisanilinooxyvanadium phthalocyanine 5.19 g (6 mmol) of hexadecafluorooxyvanadium phthalocyanine and 26.82 g (288 mmol) of aniline were fed into a 100 ml four-necked flask, and the reaction mixture was reacted for 4 hours at reflux temperature. After the reaction was completed, insoluble components were removed by filtration and aniline was distilled off. The resulting solid content was washed with 300 ml of n-hexane. There was thus obtained 6.72 g of a black cake of the intended compound (yield=77.1%). As a result of analysis, this compound was found to have eight substitution groups.
Visible absorption spectrum:
in methyl ethyl ketone: 844.0 nm ($\epsilon = 5.52 \times 10^4$)
in thin film: 867.0 nm
Solubility:
in methyl ethyl ketone: 27 wt %
Elementary analysis:

|  | H | C | N | F |
|---|---|---|---|---|
| calculated: | 3.33% | 66.16% | 15.43% | 10.47% |
| found: | 3.15% | 65.97% | 15.21% | 10.97% |

Figure 9:
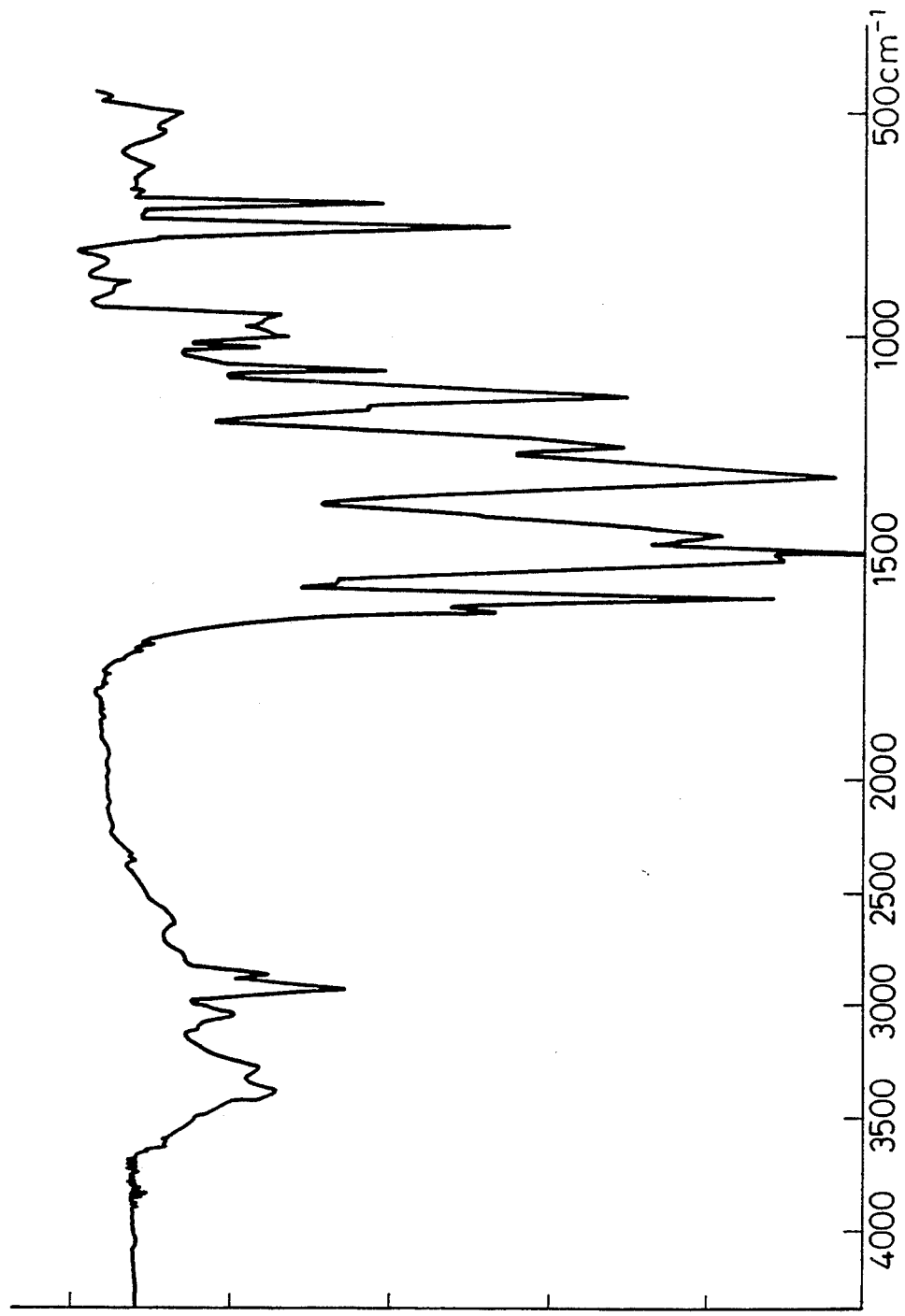
FIG. 9 shows an IR absorption spectrum of octafluoro-octaquisanilinooxyvanadium phthalocyanine produced in Example 24.

The IR absorption spectrum of this compound is shown in FIG. 9.

Example 25

Production of octafluorooctaguis(n-butylamino)oxyvanadium phthalocyanine

The procedures of Example 24 were followed in the same way except that 21.10 g (288 mmol) of n-butylamine was used in place of aniline. There was thus obtained 7.02 g of a black cake of the intended compound (yield=90.5%). As a result of analysis, this compound was found to have eight substitution groups in one molecule.
Visible absorption spectrum:
maximum absorption wavelength:
in methyl ethyl ketone: 822.0 nm ($\epsilon = 5.00 \times 10^4$)
in thin film: 850.5 nm
Solubility:
in methyl ethyl ketone: 12 wt %
Elementary analysis:

|  | H | C | N | F |
|---|---|---|---|---|
| calculated: | 6.24% | 59.48% | 17.34% | 11.76% |
| found: | 6.18% | 59.79% | 17.38% | 11.34% |

Figure 10:
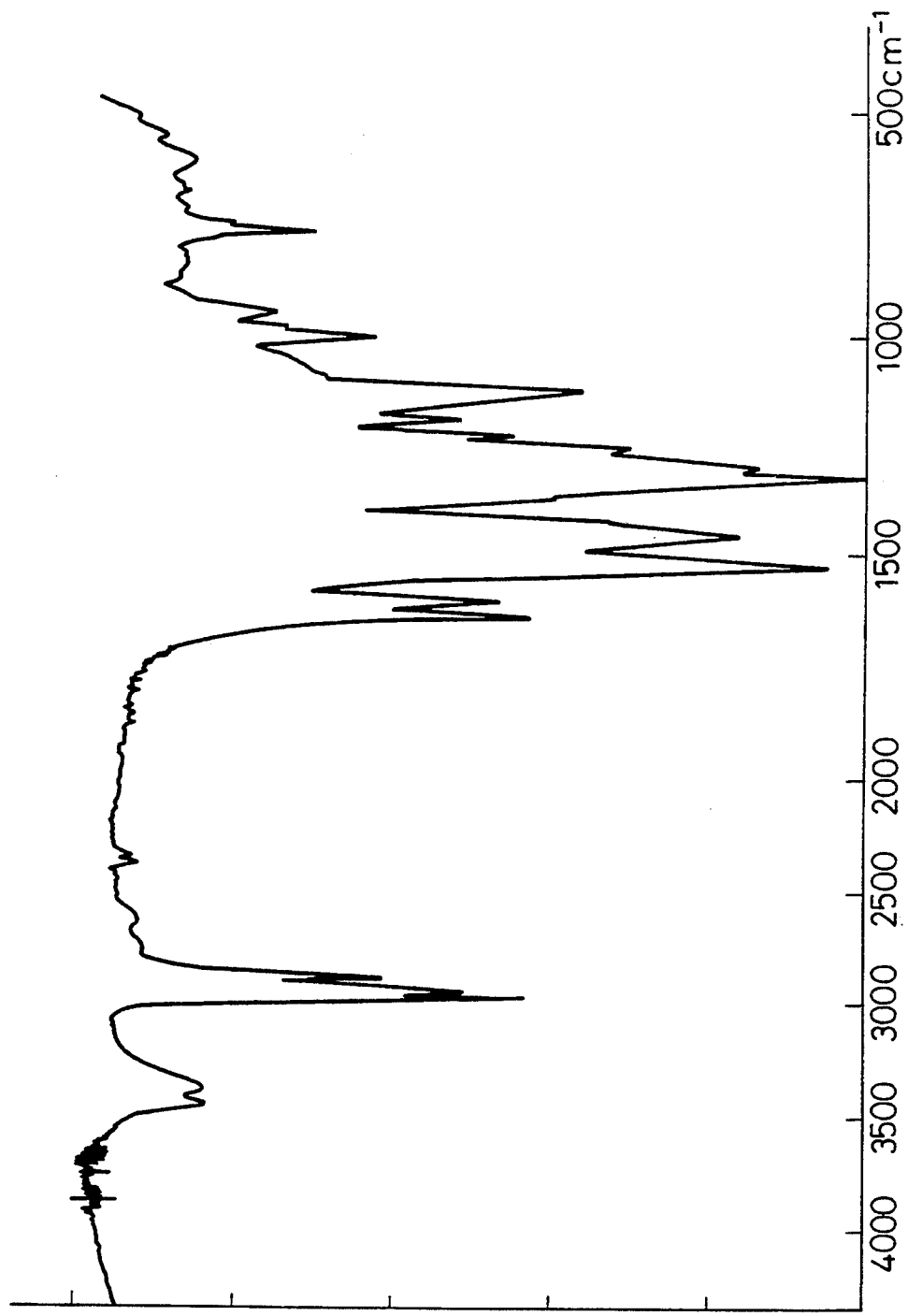
FIG. 10 shows an IR absorption spectrum of octafluoro-octaquis(n-butylamino)oxyvanadium phthalocyanine produced in Example 25.

The IR absorption spectrum of this compound is shown in FIG. 10.

Example 26

Production of hexadecafluoromonoanilinooxwanadium phthalocyanine 5.19 g (6 mmol) of hexadecafluorooxyvanadium phthalocyanine, 11.18 g (120 mmol) of aniline and 22.20 g (120 mmol) of tri-n-butylamine were fed into a 100 ml four-necked flask, and the reaction mixture was reacted at 150° C. for 4 hours. After the reaction was completed, the insoluble contents were removed by filtration, and then aniline and tri-n-butylamine were distilled off. The resulting solid content was washed with 300 ml of n-hexane. There was thus obtained 5.56 g of a dark blue cake of the intended compound (yield=92.7%). As a result of analysis, this compound was found to have one substitution group.
Visible absorption spectrum:
maximum absorption wavelength:
in methyl ethyl ketone: 682.5 nm ($\epsilon = 2.01 \times 10^4$)
in thin film: 693.0 nm
Solubility:
in methyl ethyl ketone: 16 wt %
in ethyl cellosolve: 9 wt %
Elementary analysis:

|  | H | C | N | F |
|---|---|---|---|---|
| calculated: | 0.64% | 48.53% | 13.40% | 30.30% |

-continued

| | H | C | N | F |
|---|---|---|---|---|
| found: | 0.78% | 48.34% | 13.21% | 29.97% |

Figure 11:
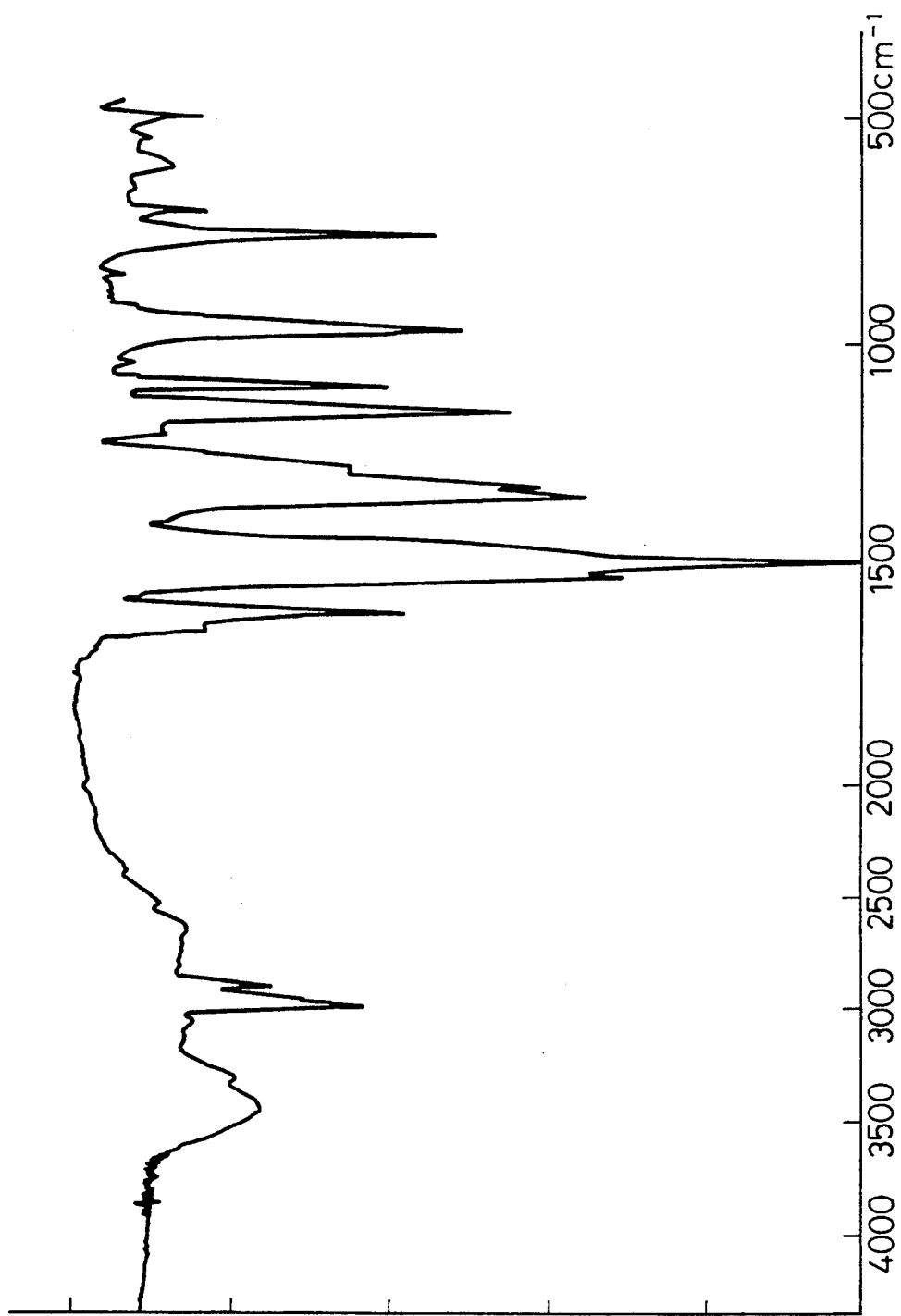
FIG. 11 shows an IR absorption spectrum of hexadecafluoro-monoanilinooxyvanadium phthalocyanine produced in Example 26.

The IR absorption spectrum of this compound is shown in FIG. 11.

Example 27

Production of hexadecafluoromonoanilinocobaltphthalocyanine

The procedures of Example 26 were followed in the same way except that 5.25 g (6 mmol) of hexadecafluorocobalt phthalocyanine was used in place of hexadecafluorooxyvanadium phthalocyanine. There was thus obtained 4.81 g of a dark blue cake of the intended compound (yield=86.0%). As a result of analysis, this compound was found to have one substitution group.

Visible absorption spectrum:
maximum absorption wavelength:
in methyl ethyl ketone: 663.5 nm ($\epsilon = 8.61 \times 10^4$)
in thin film: 629.0 nm
Solubility:
in methyl ethyl ketone: 3 wt %
Elementary analysis:

| | H | C | N | F |
|---|---|---|---|---|
| calculated: | 0.65% | 48.95% | 13.52% | 30.56% |
| found: | 0.81% | 49.20% | 13.45% | 30.74% |

Figure 12:
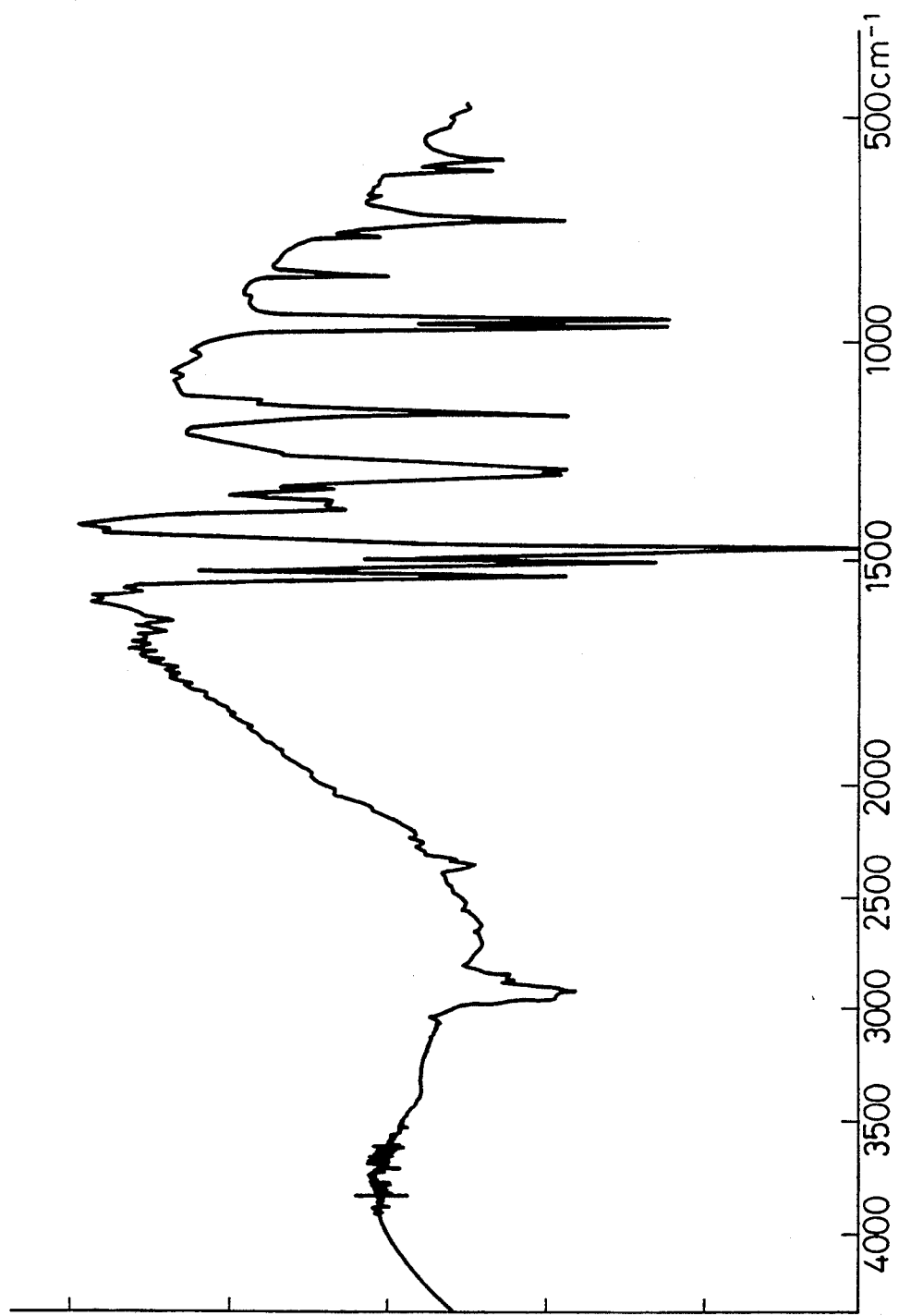
FIG. 12 shows an IR absorption spectrum of hexadecafluoro-monoanilinocobalt phthalocyanine produced in Example 27.

The IR absorption spectrum of this compound is shown in FIG. 12.

Example 28

Production of hexadecafluoromonoanilinozincphthalocyanine

The procedures of Example 26 were followed in the same way except that 5.63 g (6 mmol) of hexadecafluorozinc phthalocyanine was used in place of hexadecafluorooxyvanadium phthalocyanine. There was thus obtained 4.79 g of a dark blue cake of the intended compound (yield=88.2%). As a result of analysis, this compound was found to have one substitution group.

Visible absorption spectrum:
maximum absorption wavelength:
in methyl ethyl ketone: 663.5 nm ($\epsilon = 8.61 \times 10^4$)
in thin film: 665.0 nm
Solubility:
in methyl ethyl ketone: 4 wt %
Elementary analysis:

| | H | C | N | F |
|---|---|---|---|---|
| calculated: | 0.65% | 48.95% | 13.52% | 30.56% |
| found: | 0.81% | 49.20% | 13.45% | 30.74% |

Figure 13:
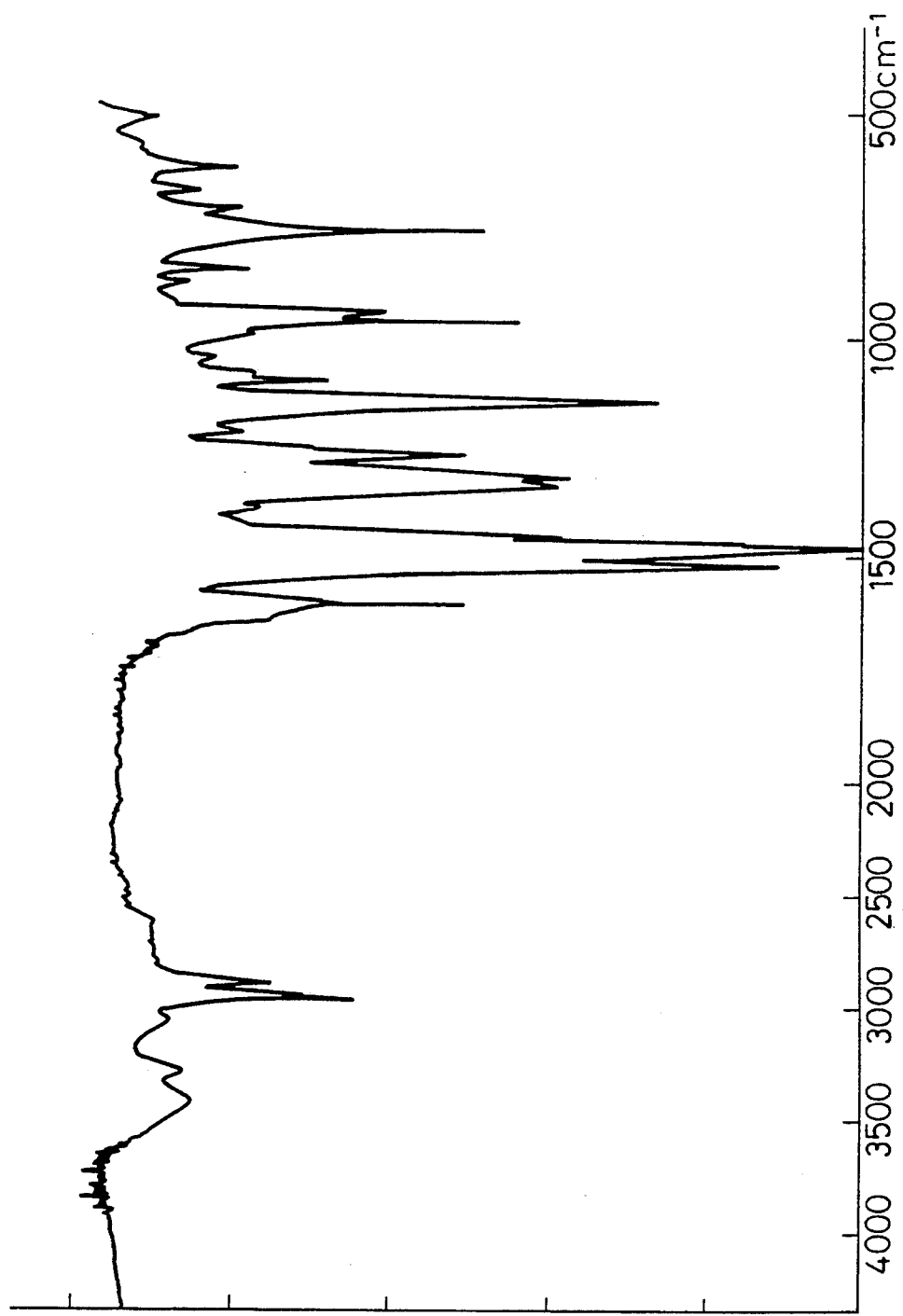
FIG. 13 shows an IR absorption spectrum of hexadecafluoro-monoanilinozinc phthalocyanine produced in Example 28.

The IR absorption spectrum of this compound is shown in FIG. 13.

Example 29

Production of 3,5,6-dodecafluoro-4-tetraguisanilinocobalt phthalocyanine 5.46 g (20 mmol) of 4-anilino-3,5,6-trifluorophthalonitrile, 0.78 g (6 mmol) of anhydrous cobalt (II) chloride and 25 ml of benzonitrile were fed into a 100 ml four-necked flask, and the reaction mixture was reacted at 175° C. for 6 hours. After the reaction was completed, the reaction mixture was poured into n-hexane, and the resulting solid content was washed first with n-hexane and then with water. There was thus obtained 5.25 g of a dark green cake of the intended compound (yield=91.2%).

Visible absorption spectrum:
maximum absorption wavelength:
in methyl ethyl ketone: 699.0 nm ($\epsilon = 3.14 \times 10^4$)
in thin film: 671.5 nm
Solubility:
in methyl ethyl ketone: 7 wt %
in ethyl cellosolve: 13 wt %
Elementary analysis:

| | H | C | N | F |
|---|---|---|---|---|
| calculated: | 2.10% | 58.40% | 14.59% | 19.79% |
| found: | 1.98% | 58.17% | 14.35% | 20.03% |

Figure 14:
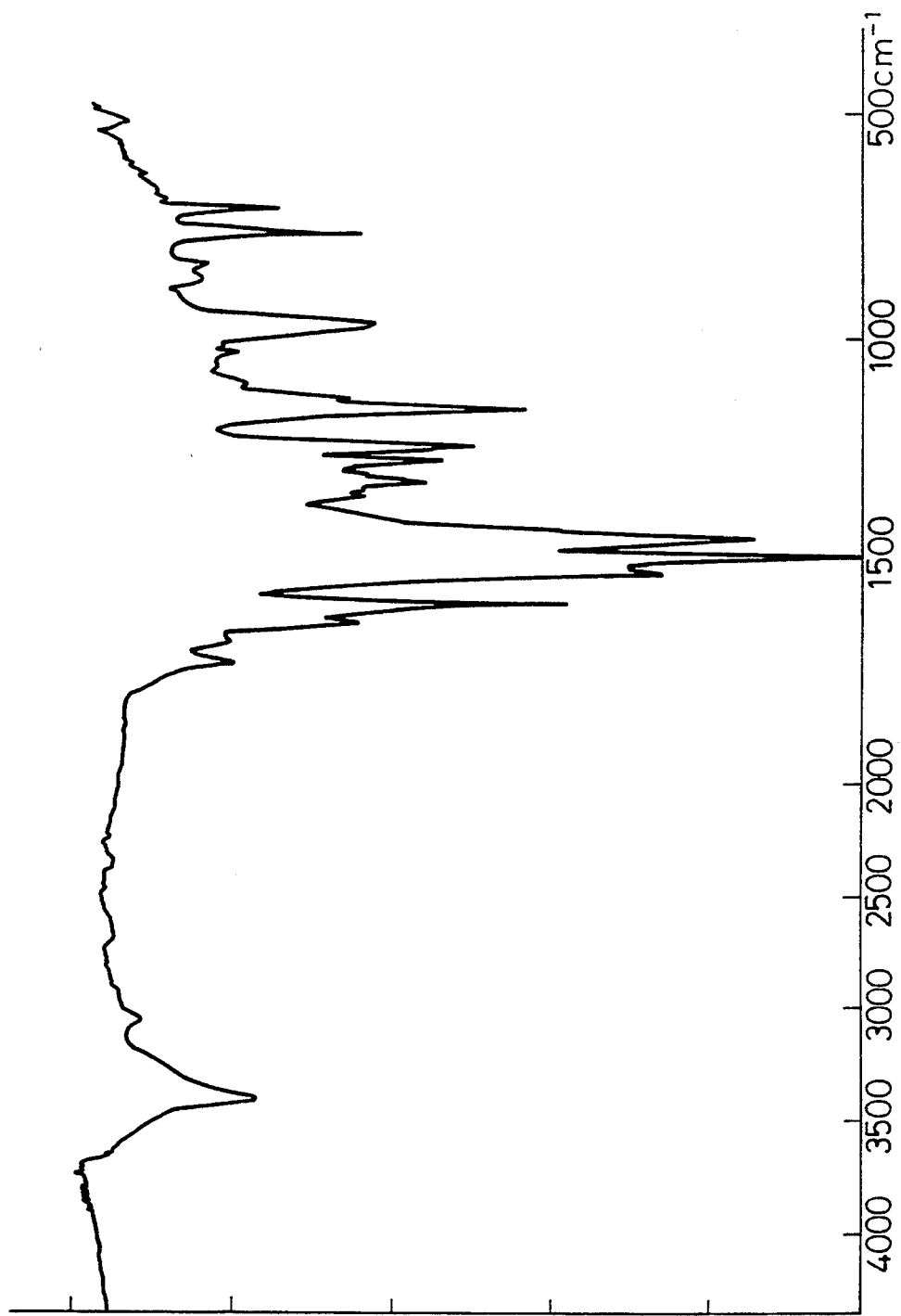
FIG. 14 shows an IR absorption spectrum of 3,5,6-dodecafluoro-4-tetraquisanilinocobalt phthalocyanine produced in Example 29.

The IR absorption spectrum of this compound is shown in FIG. 14.

Example 30

Production of 3,5,6-dodecafluoro-4-(tetraquisanilino)-zinc phthalocyanine

The procedures of Example 29 were followed in the same way except that 1.92 g (6 mmol) of zinc iodide was used in place of anhydrous cobalt chloride. There was thus obtained 5.01 g of a dark blue cake of the intended compound (yield=86.5%).

Visible absorption spectrum:
maximum absorption wavelength:
in methyl ethyl ketone: 711.5 nm ($\epsilon = 3.98 \times 10^4$)
in thin film: 689.5 nm
Solubility:
in methyl ethyl ketone: 15 wt %
Elementary analysis:

| | H | C | N | F |
|---|---|---|---|---|
| calculated: | 2.09% | 58.07% | 14.51% | 19.79% |
| found: | 1.97% | 57.89% | 14.33% | 19.87% |

Figure 15:
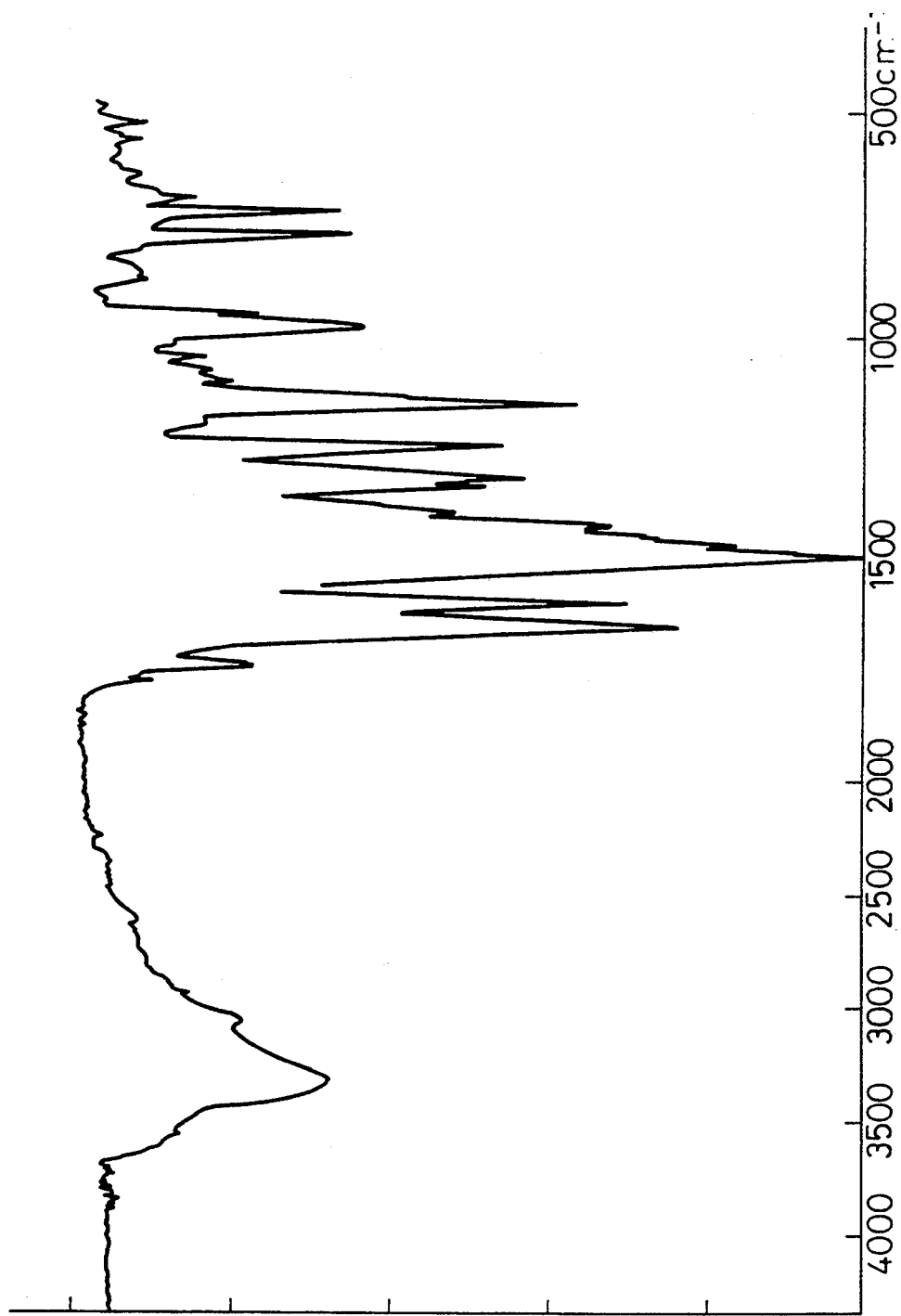
FIG. 15 shows an IR absorption spectrum of 3,5,6-dodecafluoro-4-(tetraquisanilino)zinc phthalocyanine produced in Example 30.

The IR absorption spectrum of this compound is shown in FIG. 15.

Example 31

Production of 3,5,6-dodecafluoro-4-(tetraquisanilino)oxyvanadium phthalocyanine

The procedures of Example 29 were followed in the same way except that 0.94 g (6 mmol) of vanadium trichloride was used in place of anhydrous cobalt chloride. There was thus obtained 4.91 g of a dark blue cake of the intended compound (yield=84.7%).

Visible absorption spectrum:
maximum absorption wavelength:
in methyl ethyl ketone: 759.0 nm ($\epsilon = 4.48 \times 10^4$)
in thin film: 765.0 nm
Solubility:
in ethyl cellosolve: 8 wt %
Elementary analysis:

| | H | C | N | F |
|---|---|---|---|---|
| calculated: | 2.09% | 58.07% | 14.49% | 19.66% |
| found: | 2.01% | 57.84% | 14.29% | 19.98% |

Figure 16:
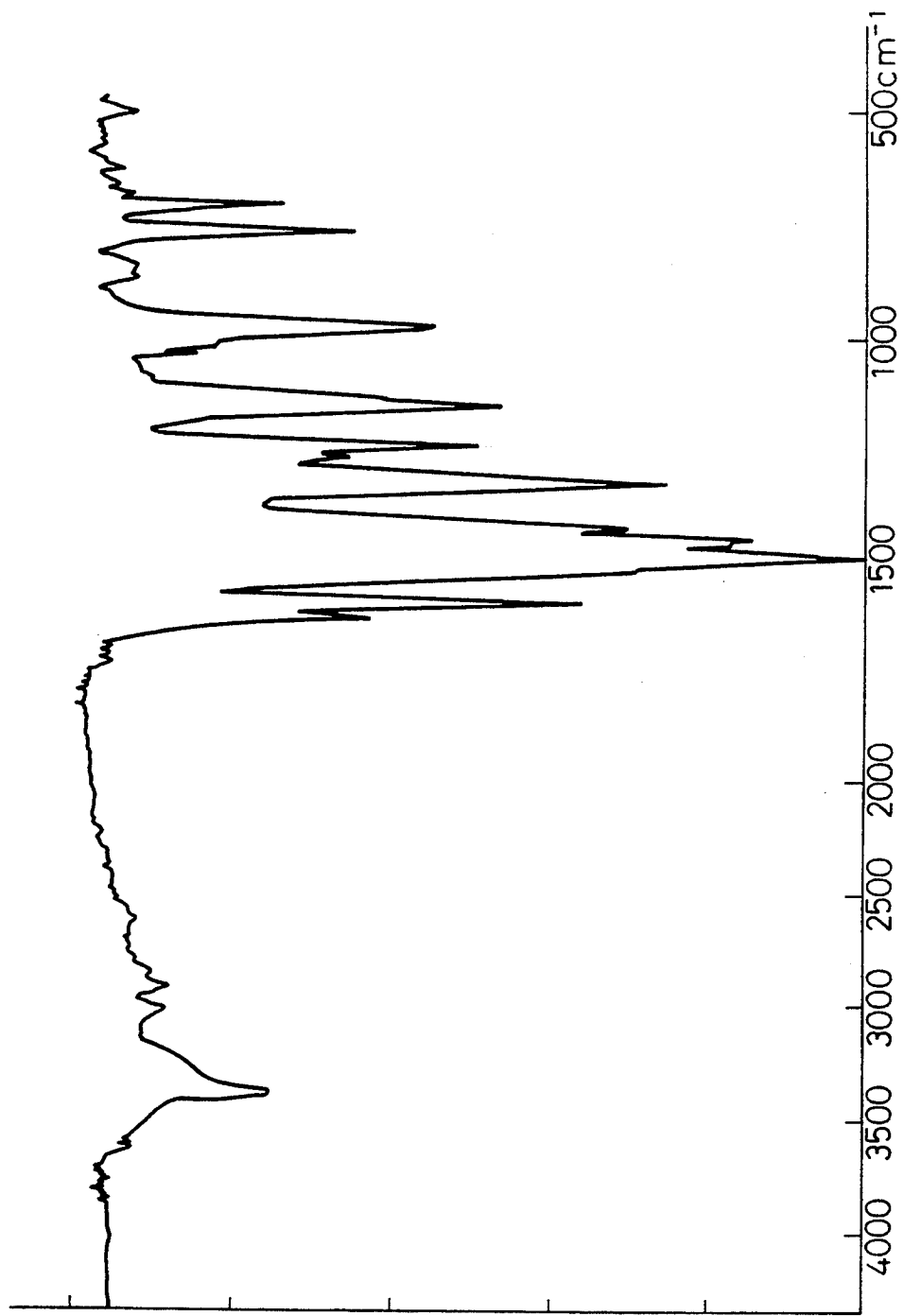
FIG. 16 shows an IR absorption spectrum of 3,5,6-dodecafluoro-4-(tetraquisanilino)oxyvanadium phthalocyanine produced in Example 31.

The IR absorption spectrum of this compound is shown in FIG. 16.

Example 32

Production of 3,5,6-dodecafluoro-4-tetraquis(anilino)-chloroindium phthalocyanine The procedures of Example 29 were repeated except that 1.33 g (6 mmol) of indium trichloride was used in place of anhydrous cobalt (II) chloride to obtain 2.82 g of a dark green cake of the intended compound (yield 93.6%).

Visible absorption spectrum:
maximum absorption wavelength:
in methyl cellosolve: 737.5 nm ($\epsilon = 3.33 \times 10^4$)
in thin film: 759.00 nm
Solubility:
in methyl cellosolve: 4.6 wt %
Elementary analysis:

|  | H | C | N | F |
| --- | --- | --- | --- | --- |
| calculated: | 1.95% | 54.11% | 13.52% | 19.34% |
| found: | 1.78% | 53.69% | 13.27% | 18.76% |

Figure 17:
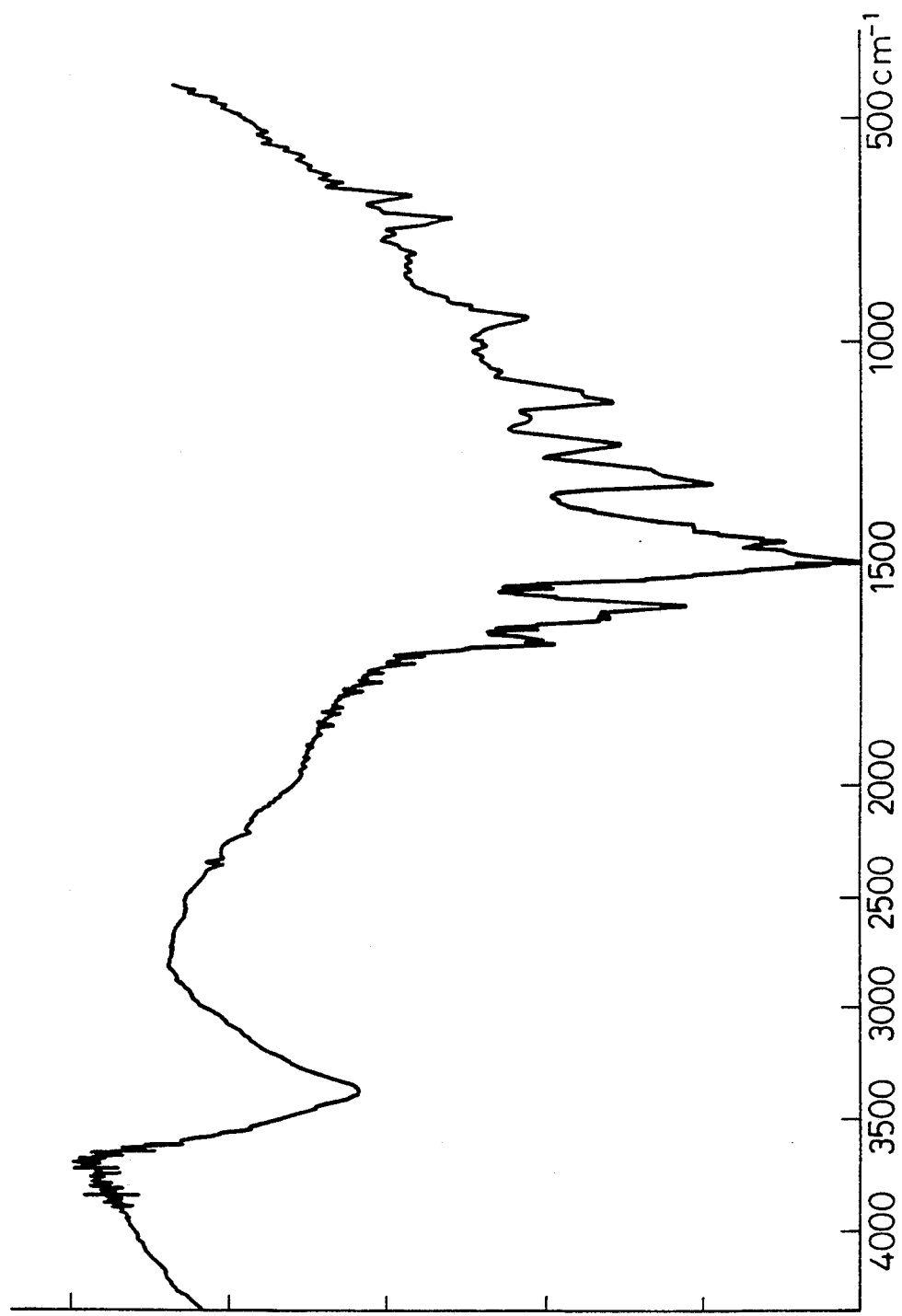
FIG. 17 shows an IR absorption spectrum of 3,5,6-dodecafluoro-4-tetraquis(anilino)chloroindium phthalocyanine produced in Example 32.

The IR absorption spectrum of this compound is shown in FIG. 17.

Example 33

Production of 3,5,6-dodecafluoro-4-(2-ethoxyethoxy)-copper phthalocyanine 8.65 g (32 mmol) of 4-(2-ethoxyethoxy)-3,5,6-trifluorophthalonitrile, 0.96 g (0.67 mmol) of anhydrous cuprous chloride and 40 ml of N-methyl-2-pyrolidinone were fed into a 100 ml four-necked flask, and the reaction mixture was reacted at 175° C. for 6 hours. After the reaction was completed, the reaction mixture was poured into methanol and the resulting solid content was washed first with methanol and then with water. There was thus obtained 7.84 g of a dark green cake of the intended compound (yield=85.6%).

Visible absorption spectrum:
maximum absorption wavelength:
in ethyl cellosolve: 626.5 nm ($\epsilon = 1.65 \times 10^4$)
in thin film: 630.5 nm
Solubility:
10 in methyl ethyl ketone: 2.5 wt %
Elementary analysis:

|  | H | C | N | F |
| --- | --- | --- | --- | --- |
| calculated: | 3.17% | 50.38% | 9.79% | 19.92% |
| found: | 3.45% | 50.97% | 9.57% | 20.10% |

Figure 18:
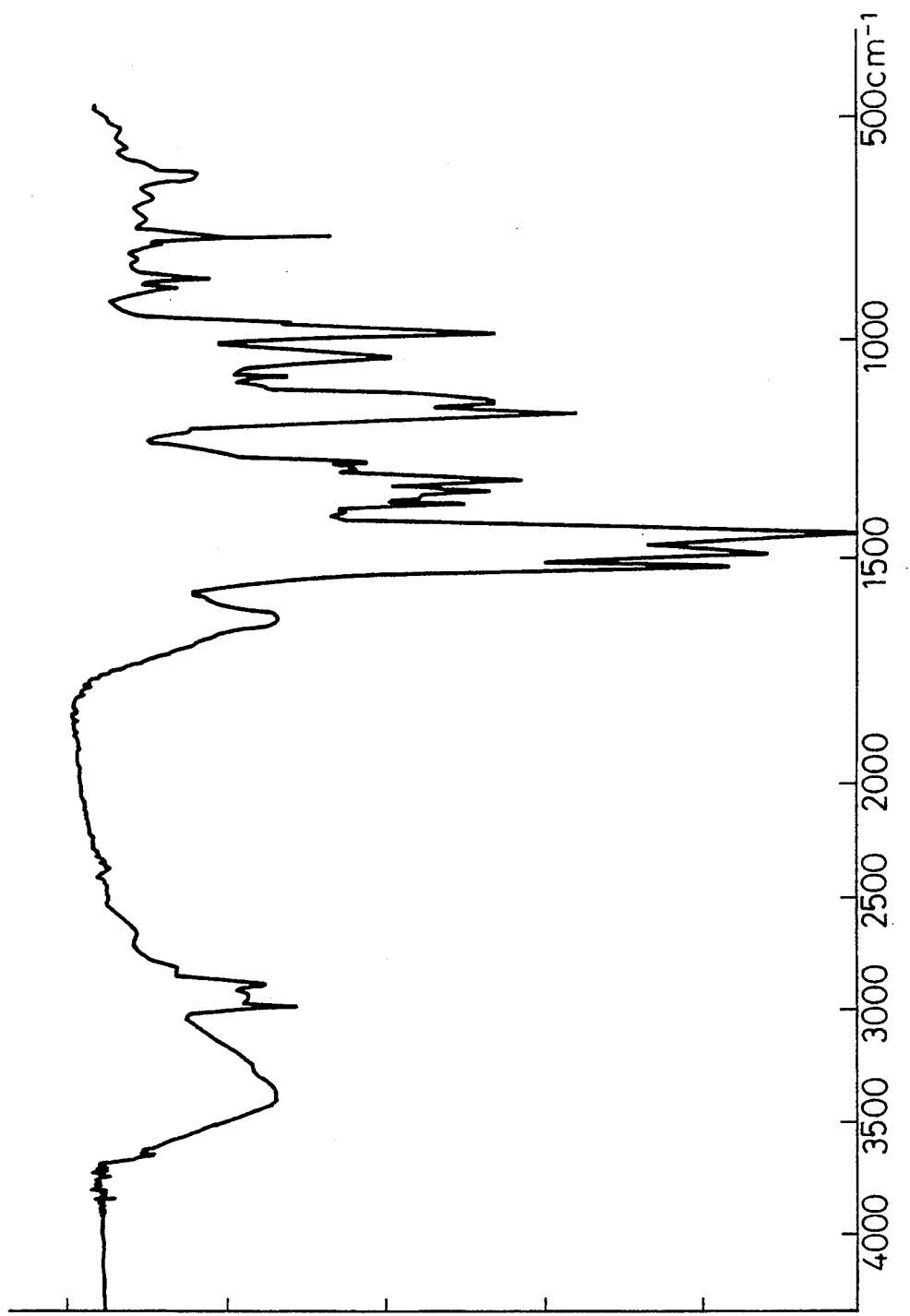
FIG. 18 shows an IR absorption spectrum of 3,5,6-dodecafluoro-4-(2-ethoxyethoxy)copper phthalocyanine produced in Example 33.

The IR absorption spectrum of this compound is shown in FIG. 18.

Example 34

Production of 3,5,6-dodecafluoro-4-tetraquis(3',6'-oxaheptyloxy)copper phthalocyanine The procedures of Example 32 were followed in the same way except that 9.61 g (32 mmol) of 4-(3',6'-oxaheptyloxy-3,5,6-triphthalonitrile was used in place of 4-(2-ethoxyethoxy)-3,5,6-trifluorophthalonitrile. There was thus obtained 8.5 g of a dark blue cake of the intended compound (yield=74.3%).

Visible absorption spectrum:
maximum absorption wavelength:
in ethyl cellosolve: 627.0 nm ($\epsilon = 3.39 \times 10^4$)
in thin film: 631.5 nm
Solubility:
in ethyl cellosolve: 2.5 wt %
Elementary analysis:

|  | H | C | N | F |
| --- | --- | --- | --- | --- |
| calculated: | 4.20% | 50.20% | 7.78% | 15.82% |
| found: | 4.28% | 50.14% | 8.01% | 15.97% |

Figure 19:
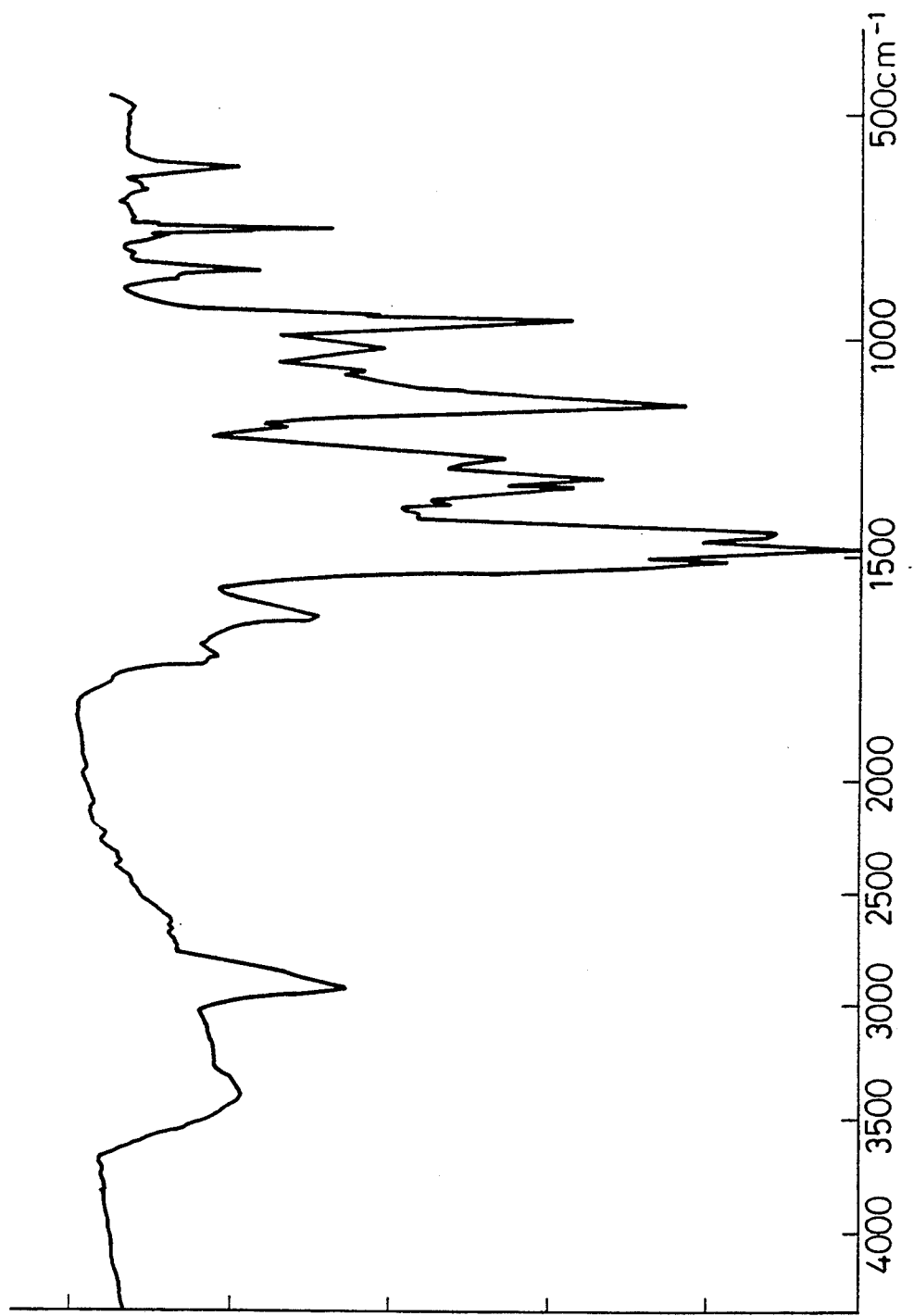
FIG. 19 shows an IR absorption spectrum of 3,5,6-dodecafluoro-4-tetraquis(3',6'-oxaheptyloxy)copper phthalocyanine produced in Example 34.

The IR absorption spectrum of this compound is shown in FIG. 19.

Example 35

Production of 3,5,6-dodecafluoro-4-tetraquis(3',6',9'-oxadecyloxy)copper phthalocyanine The procedures of Example 32 were followed in the same way except that 11.02 g (32 mmol) of 4-(3',6',9'-oxadecyloxy)-3,5,6-trifluorophthalonitrile was used in place of 4-(2-ethoxyethoxy)-3,5,6-trifluorophthalonitrile. There was thus obtained 9.92 g of a dark blue cake of the intended compound (yield=76.7%).

Visible absorption spectrum:
maximum absorption wavelength:
in ethyl cellosolve: 618.5 nm ($\epsilon = 3.57 \times 10^4$)
in thin film: 638.5 nm
Solubility:
in ethyl cellosolve: 6 wt %
Elementary analysis:

|  | H | C | N | F |
| --- | --- | --- | --- | --- |
| calculated: | 4.20% | 50.02% | 7.78% | 15.82% |
| found: | 4.28% | 50.14% | 8.01% | 15.97% |

Figure 20:
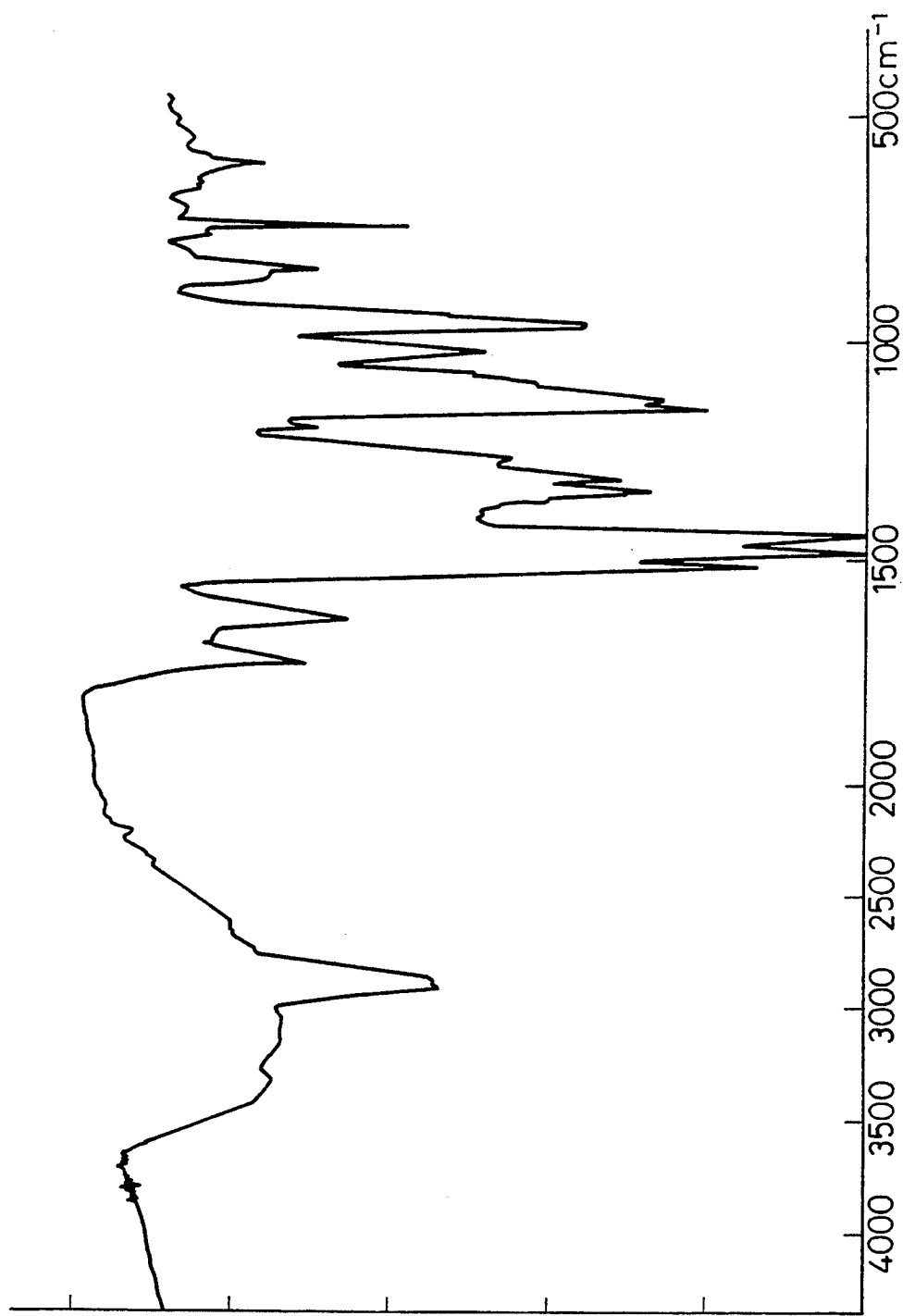
FIG. 20 shows an IR absorption spectrum of 3,5,6-dodecafluoro-4-tetraquis(3',6',9'-oxadecyloxy)copper phthalocyanine produced in Example 35.

The IR absorption spectrum of this compound is shown in FIG. 20.

Example 36

Production of 3,5,6-dodecafluoro-4-tetraquis(3',6',9',12'-oxatridecyloxy)copper phthalocyanine The procedures of Example 32 were followed in the same way except that 12.42 g (32 mmol) of 4-(3',6',9',12'-oxatridecyloxy)-3,5,6trifluorophthalonitrile was used in place of 4-(2-ethoxyethoxy)-3,5,6-trifluorophthalonitrile. There was thus obtained 9.92 g of a dark blue cake of the intended compound (yield=76.7%).

Visible absorption spectrum:
maximum absorption wavelength:
in ethyl cellosolve: 624.5 nm ($\epsilon = 2.88 \times 10^4$)
in thin film: 627.5 nm
Solubility:
in ethyl cellosolve: 17 wt %
Elementary analysis:

|  | H | C | N | F |
| --- | --- | --- | --- | --- |
| calculated: | 4.74% | 52.58% | 7.21% | 14.68% |
| found: | 4.65% | 52.30% | 7.02% | 14.96% |

Figure 21:
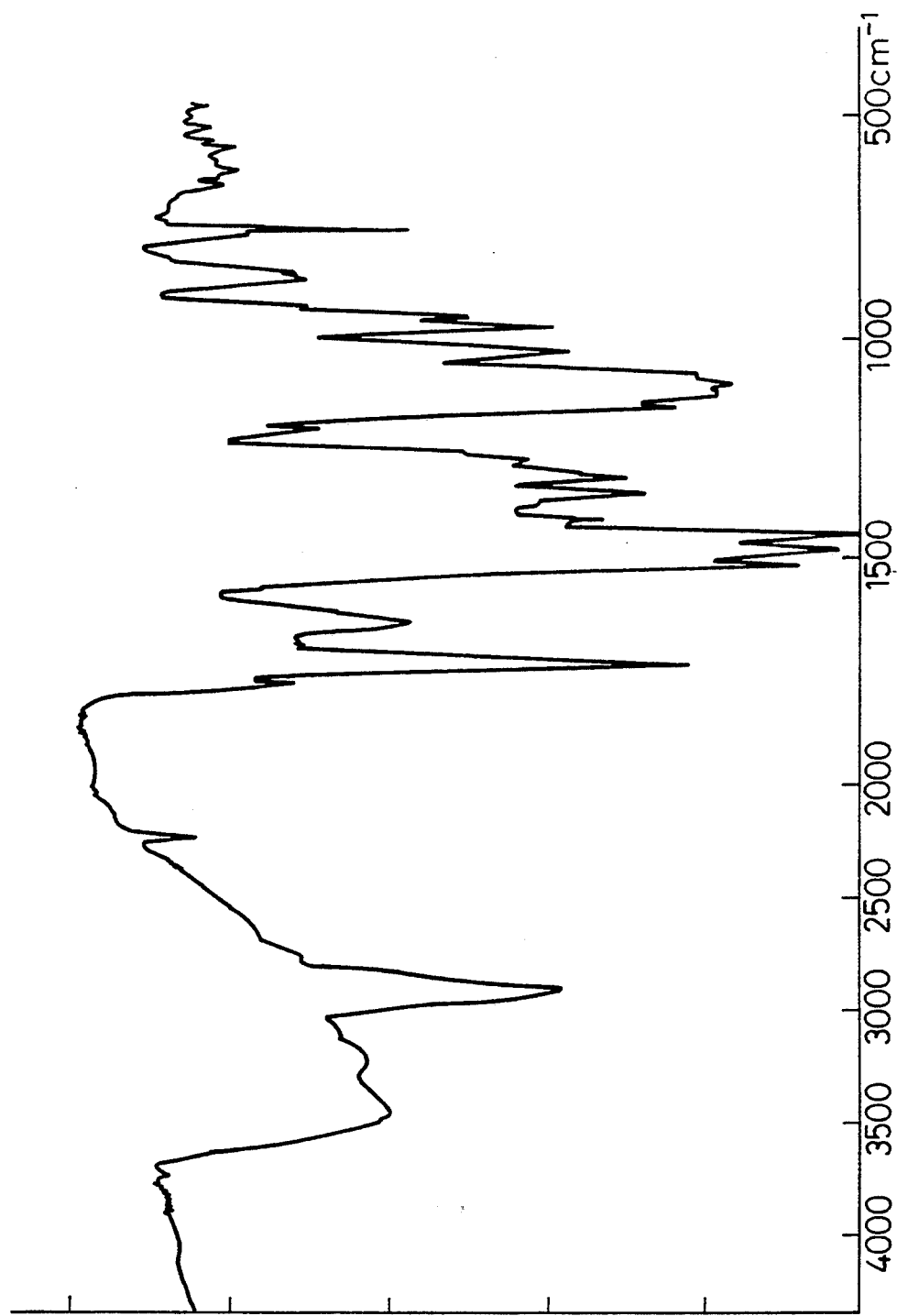
FIG. 21 shows an IR absorption spectrum of 3,5,6-dodecafluoro-4-tetraquis(3',6',9',12'-oxadodecyl)copper phthalocyanine produced in Example 36.

The IR absorption spectrum of this compound is shown in FIG. 21.

Example 37

Production of 3,5,6-dodecafluoro-4-tetraquis(3',6',9'-oxadecyloxy)oxyvanadium phthalocyanine The procedures of Example 32 were followed in the same way except that 4-(3',6',9'-oxadecyloxy)-3,5,6-trifluorophthalonitrile was used in place of 4-(2-ethoxyethoxy)-3,5,6-trifluorophthalonitrile and 1.52 g (9.67 mmol) of vanadium trichloride was used in place of anhydrous cuprous chloride. There was thus obtained 9.42 g of a dark blue cake of the intended compound (yield=81.5%).

Visible absorption spectrum:
maximum absorption wavelength:
in ethyl cellosolve: 648.5 nm ($\epsilon = 4.14 \times 10^4$)
in thin film: 659.5 nm
Solubility:
in ethyl cellosolve: 18 wt %
Elementary analysis:

|  | H | C | N | F |
|---|---|---|---|---|
| calculated: | 4.19% | 49.90% | 7.76% | 15.79% |
| found: | 4.07% | 50.11% | 7.58% | 15.64% |

Figure 22:
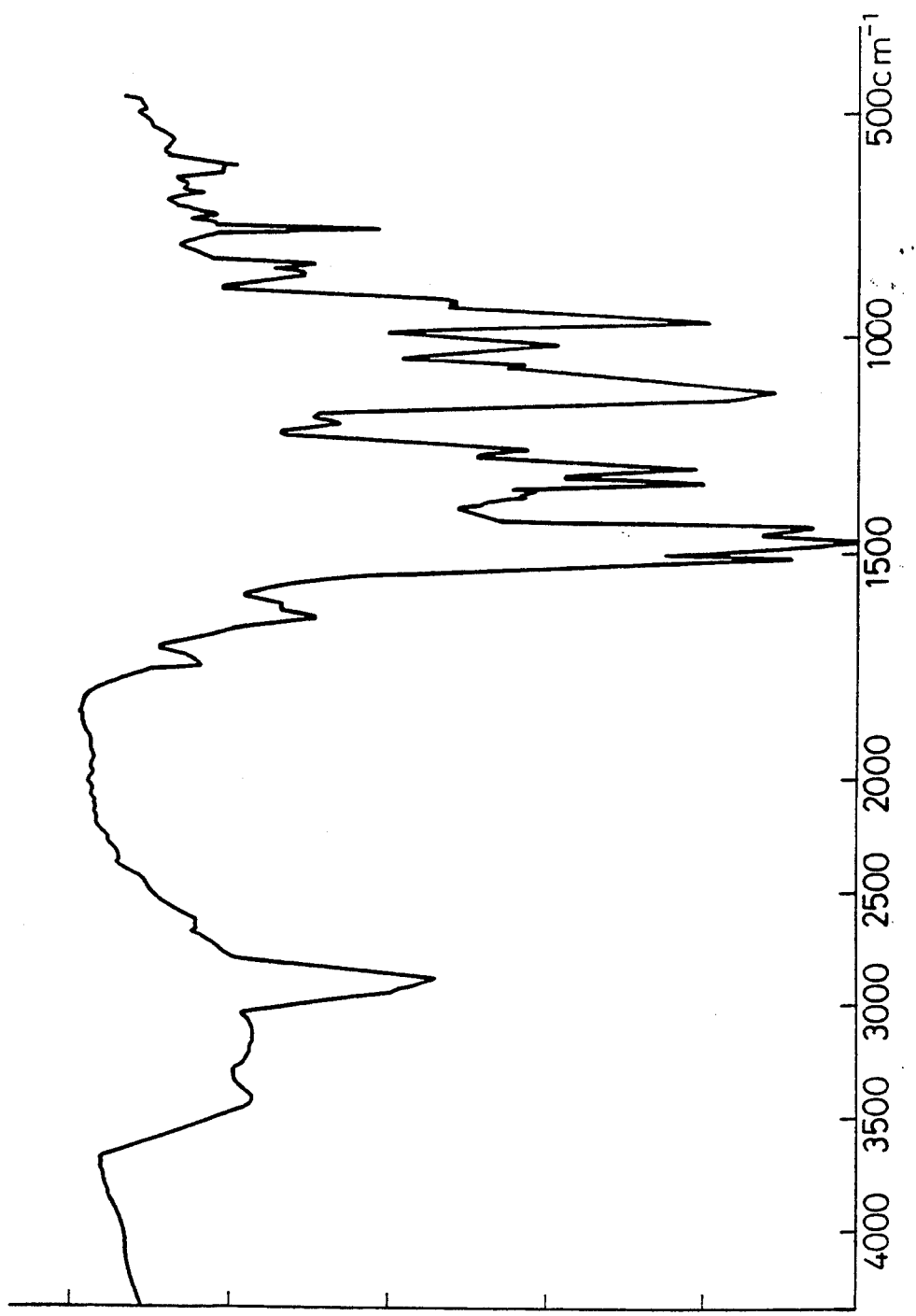
FIG. 22 shows an IR absorption spectrum of 3,5,6-dodecafluoro-4-tetraquis(3',6',9'-oxadecyloxy)oxyvanadium phthalocyanine produced in Example 37.

The IR absorption spectrum of this compound is shown in FIG. 22.

Example 38

Production of 3,5,6-dodecafluoro-4-tetraquis(3',6',9'-oxadecyloxy)chloroindium phthalocyanine The procedures of Example 33 were repeated except that 2.14 g (9.67 mmol) of indium trichloride was used in place of anhydrous cuprous chloride to obtain 10.94 g of a green cake of the intended compound (yield 89.5%)

Visible absorption spectrum:
maximum absorption wavelength:
in methyl cellosolve: 703.5 nm ($\epsilon = 2.57 \times 10^4$)
in thin film: 667.0 nm
Solubility:
in methyl cellosolve: 8.1 wt %
Elementary analysis:

|  | H | C | N | F |
|---|---|---|---|---|
| calculated: | 3.96% | 47.18% | 7.34% | 14.93% |
| found: | 3.85% | 47.21% | 7.52% | 14.69% |

Figure 23:
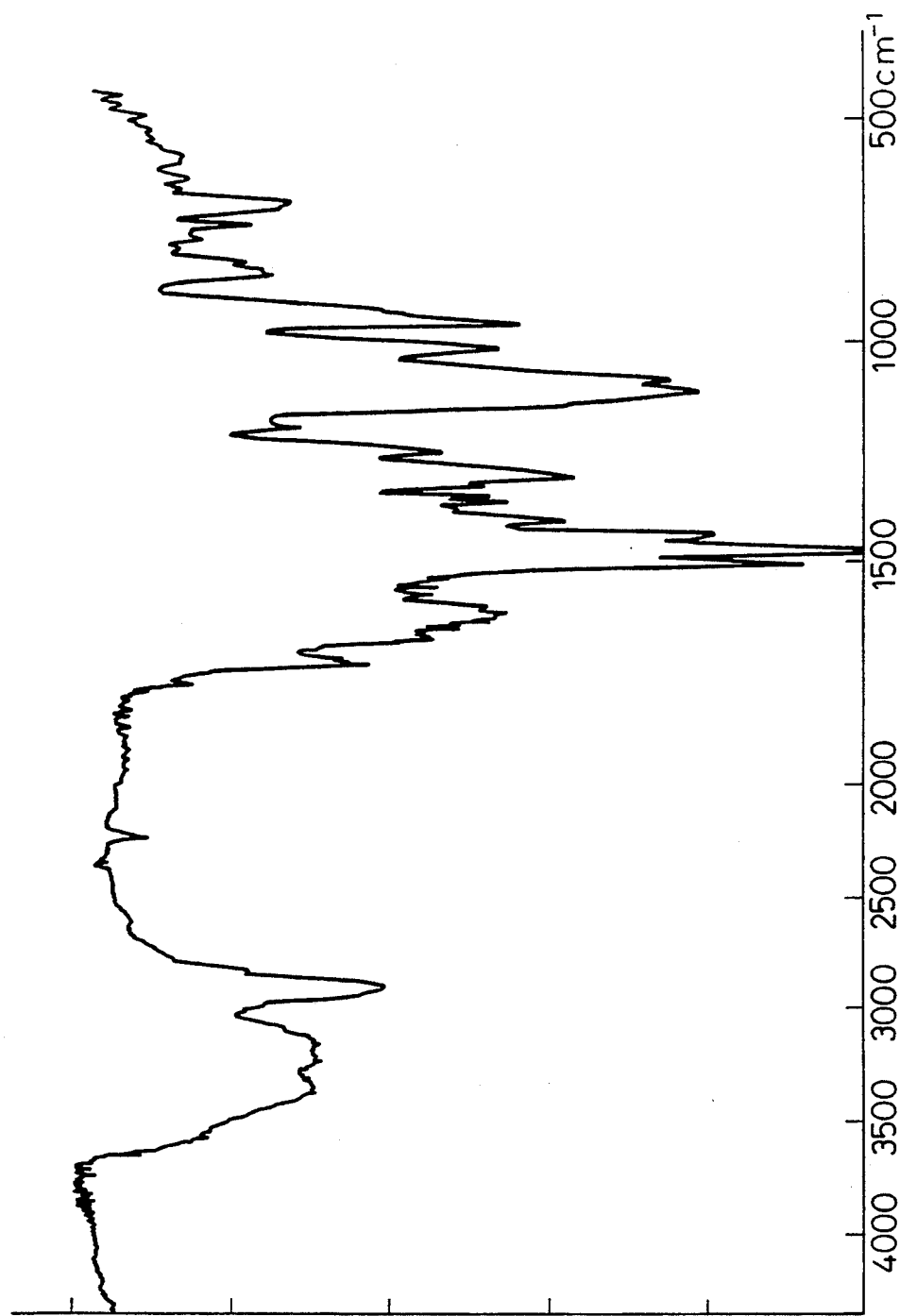
FIG. 23 shows an IR absorption spectrum of 3,5,6-dodecafluoro-4-tetraquis(3',6',9'-oxadecyloxy)chloroindium phthalocyanine produced in Example 38.

The IR absorption spectrum of this compound is shown in FIG. 23.

Example 39

Production of 3,5,9-dodecafluoro-4-tetraquis(3',6',9'-oxadecyloxy)dichlorotin phthalocyanine The procedures of Example 33 were repeated except that 1.82 g (9.67 mmol) of anhydrous stannous chloride was used in place of anhydrous cuprous chloride to obtain 10.25 g of a green cake of the intended compound (yield 81.8%)

Visible absorption spectrum:
maximum absorption wavelength:
in methyl cellosolve: 732.0 nm ($\epsilon = 3.57 \times 10^4$)
in thin film: 662.0 nm
Solubility:
in methyl cellosolve: 17.5 wt %
Elementary analysis:

|  | H | C | N | F |
|---|---|---|---|---|
| calculated: | 3.86% | 47.18% | 7.34% | 14.93% |
| found: | 3.96% | 47.33% | 7.25% | 14.78% |

Figure 24:
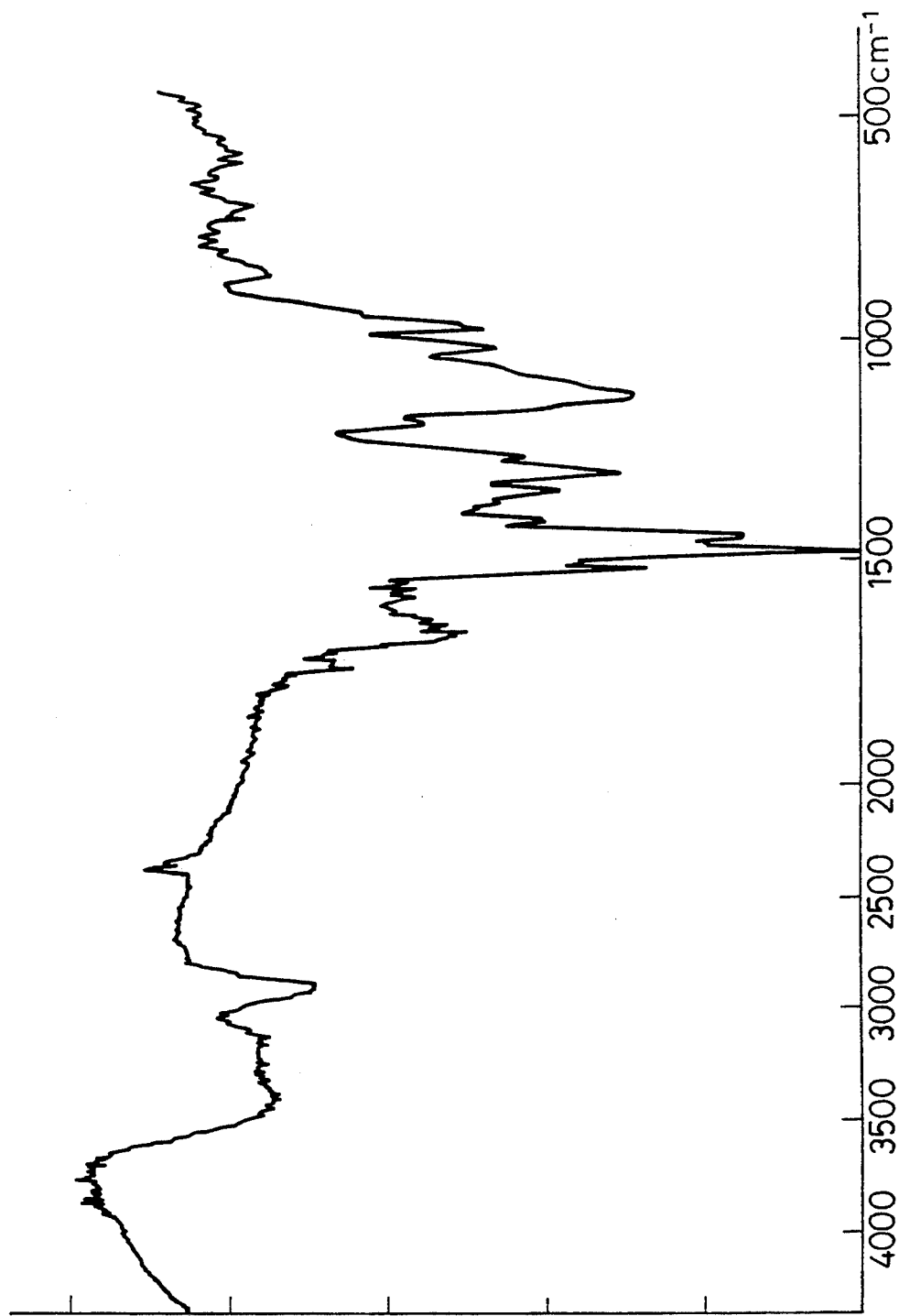
FIG. 24 shows an IR absorption spectrum of 3,5,6-dodecafluoro-4-tetraquis(3',6',9'-oxadecyloxy)dichlorotin phthalocyanine produced in Example 39.

The IR absorption spectrum of this compound is shown in FIG. 24.

Example 40

Production of 3,5,6-dodecafluoro-4-tetraquis(2-(N,N-diethylamino)ethoxy)chloroindium phthalocyanine The procedures of Example 36 were followed in the same way except that 9.51 g (32 mmol) of 3,5,6-trifluoro-4-tetraquis(2-(N,N-diethylamino)ethoxy)phthalonitrile was used in place of 4-(2-ethoxyethoxy)3,5,6-trifluorophthalonitrile and 2.14 g (9.67 mmol) of indium trichloride was used in place of anhydrous cuprous chloride. There was thus obtained 9.22 g of a dark blue cake of the intended compound (yield=87.3%).

Visible absorption spectrum:
maximum absorption wavelength:
in toluene: 639.5 nm ($\epsilon = 3.68 \times 10^4$)
in thin film: 651.0 nm
Solubility:
in toluene: 11 wt %
Elementary analysis:

|  | H | C | N | F |
|---|---|---|---|---|
| calculated: | 4.28% | 50.96% | 12.78% | 17.28% |
| found: | 4.11% | 51.07% | 12.54% | 16.92% |

Example 41

Production of 3,5,6-dodecafluoro-4-tetraquis(p-ethoxycarbonylphenoxy)oxyvanadium phthalocyanine 6.92 g (20 mmol) of 4-(p-ethoxycarbonylphenoxy)-3,5,6-trifluorophthalonitrile, 0.94 g (6 mmol) of vanadium trichloride and 20 ml of benzonitrile were fed into a 100 ml four-necked flask, and the reaction mixture was reacted at 175° C. for 12 hours. After the reaction was completed, the reaction mixture was poured into methanol, and the resulting solid content was washed first with methanol and then with water. There was thus obtained 6.0 g of a dark green cake of the intended compound (yield=83.8%).

Visible absorption spectrum:
maximum absorption wavelength:
in methyl ethyl ketone: 654.5 nm ($\epsilon = 3.38 \times 10^4$)
in thin film: 664.0 nm
Solubility:
in methyl ethyl ketone: 8 wt %
Elementary analysis:

|  | H | C | N | F |
|---|---|---|---|---|
| calculated: | 2.50% | 56.25% | 7.72% | 15.70% |
| found: | 2.74% | 56.48% | 7.61% | 15.52% |

Figure 25:
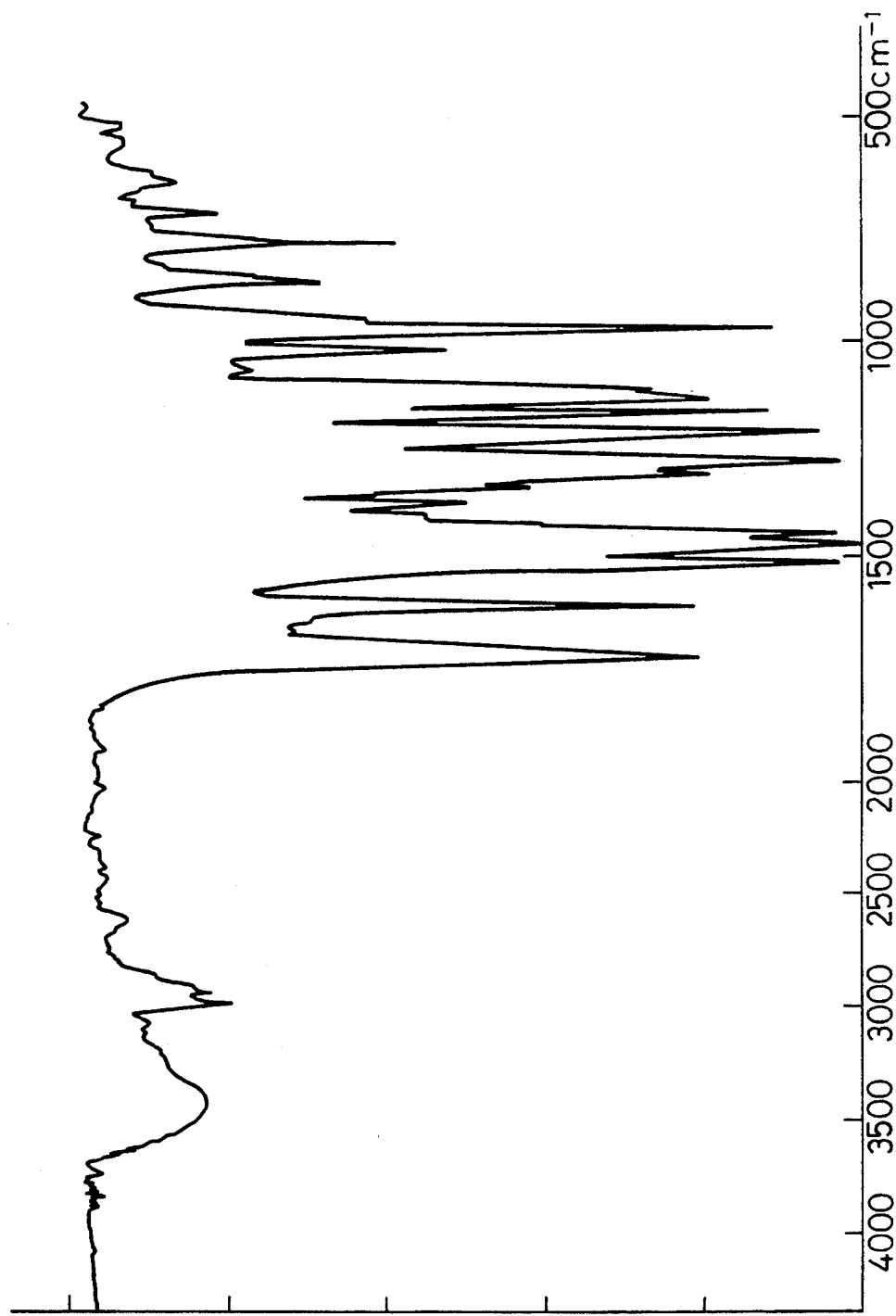
FIG. 25 shows an IR absorption spectrum of 3,5,6-dodecafluoro-4-tetraquis(p-ethoxycarbonylphenoxy)oxyvanadium phthalocyanine produced in Example 41.

The IR absorption spectrum of this compound is shown in FIG. 25.

Example 42

Production of 3,5,6-dodecafluoro-4-tetraquis(p-ethoxycarbonylphenoxy)zinc phthalocyanine The procedures of Example 41 were repeated except that 1.92 g (6 mmol) of zinc iodide was used in place of vanadium trichloride to obtain 6.93 g of a blue cake of the intended compound (yield 95.6%).

Visible absorption spectrum:
maximum absorption wavelength:
  in methyl cellosolve: 651.0 nm ($\epsilon = 1.13 \times 10^5$)
  in thin film: 663.5 nm
Solubility:
in methyl cellosolve: 15 wt %
Elementary analysis:

|  | H | C | N | F |
|---|---|---|---|---|
| calculated: | 2.50% | 56.31% | 7.73% | 15.72% |
| found: | 2.62% | 56.41% | 7.62% | 15.57% |

Figure 26:
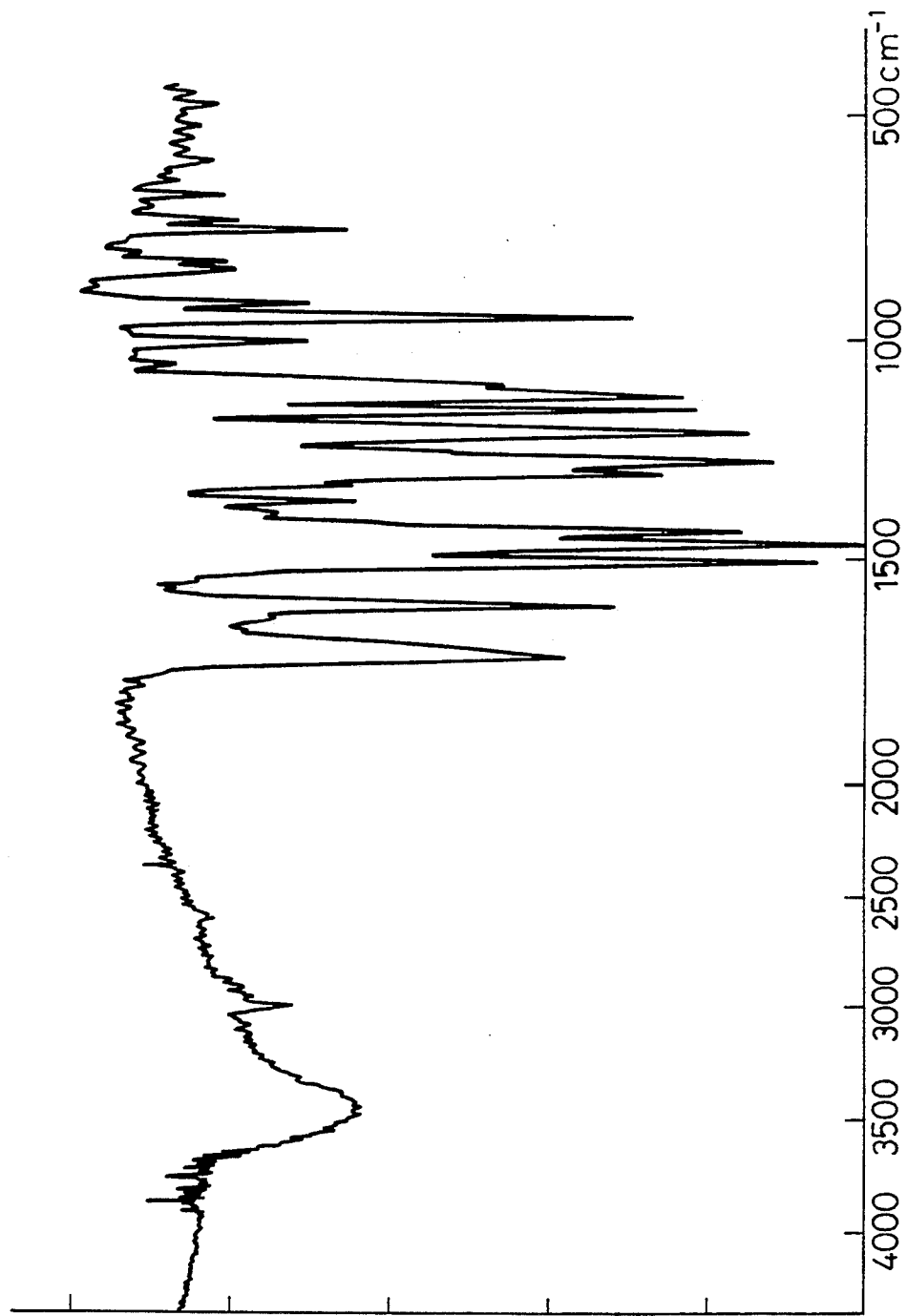
FIG. 26 shows an IR absorption spectrum of 3,5,6-dodecafluoro-4-tetraquis(p-ethoxycarbonylphenoxy)zinc phthalocyanine produced in Example 42.

The IR absorption spectrum of this compound is shown in FIG. 26.

Example 43

Production of 3,5,6-dodecafluoro-4-tetraquis(p-ethoxycarbonylphenoxy)copper phthanocyanine The procedures of Example 41 were repeated except that 0.59 g (6 mmol) of anhydrous cuprous chloride was used in place of vanadium trichloride to obtain 6.04 g of a blue cake of the intended compound (yield 83.4%).

Visible absorption spectrum:
maximum absorption wavelength:
  in methyl cellosolve: 632.0 nm ($\epsilon = 6.08 \times 10^4$)
  in thin film: 643.5 nm
Solubility:
in methyl cellosolve: 18 wt %
Elementary analysis:

|  | H | C | N | F |
|---|---|---|---|---|
| calculated: | 2.50% | 56.38% | 7.74% | 15.74% |
| found: | 2.59% | 56.44% | 7.82% | 15.93% |

Figure 27:
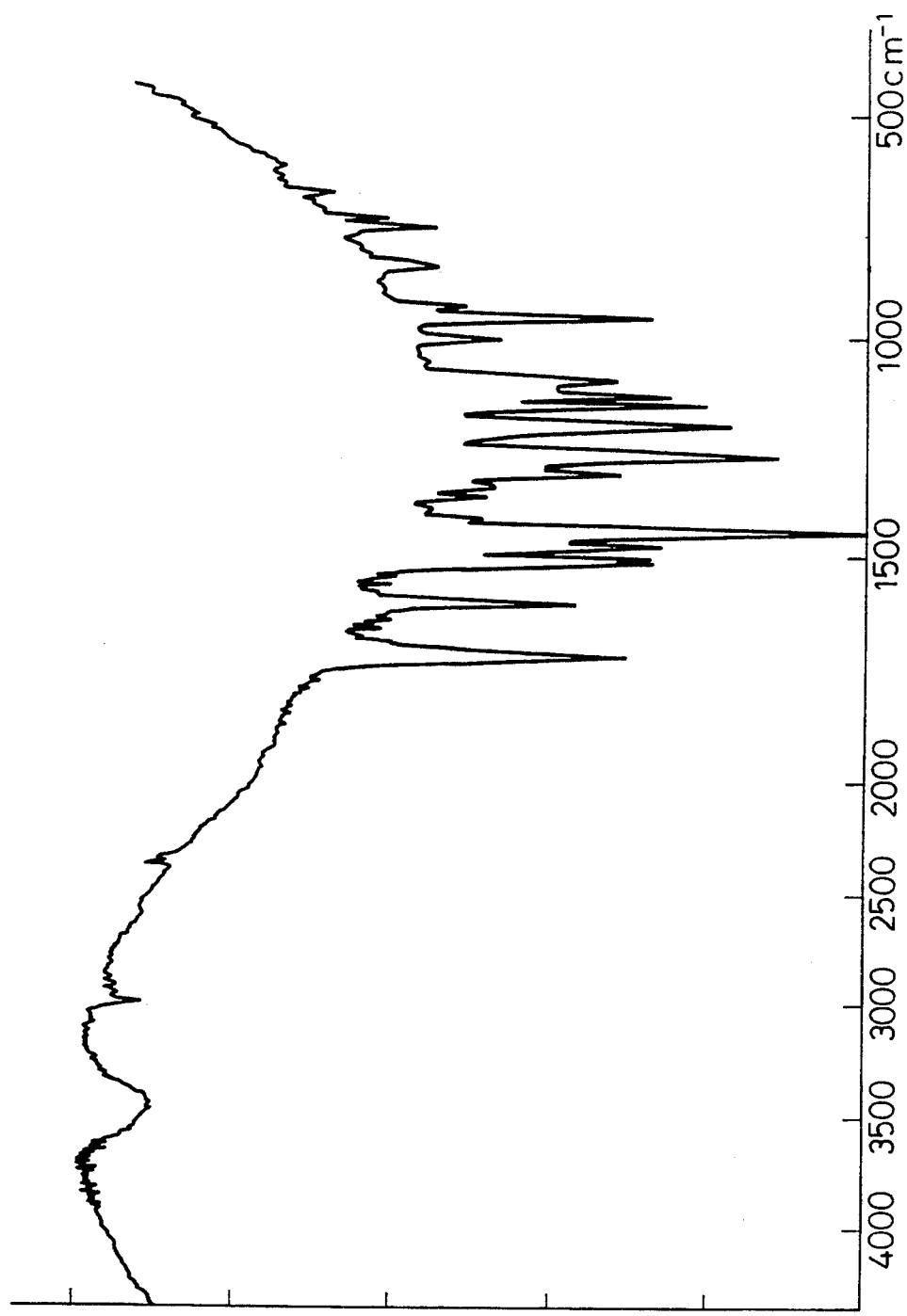
FIG. 27 shows an IR absorption spectrum of 3,5,6-dodecafluoro-4-tetraquis(p-ethoxycarbonylphenoxy)copper phthalocyanine produced in Example 43.

The IR absorption spectrum of this compound is shown in FIG. 27.

Example 44

Production Of 3,6-octafluoro-4-octaquis(p-ethoxycarbonylphenoxy)oxyvanadium phthalocyanine The procedures of Example 38 were followed in the same way except that 9.84 g (20 mmol) of 4,5-difluoro-3,6-bis(p-ethoxycarbonylphenoxy)phthalonitrile was used in place of 4-(p-ethoxycarbonylphenoxy)-3,5,6-trifluorophthalonitrile. There was thus obtained 8.89 g of dark blue cake of the intended compound (yield=87.3%).

Visible absorption spectrum:
maximum absorption wavelength:
  in ethyl cellosolve: 670.5 nm ($\epsilon = 4.98 \times 10^4$)
  in thin film: 674.5 nm
Solubility:
in ethyl cellosolve: 12 wt %
Elementary analysis:

|  | H | C | N | F |
|---|---|---|---|---|
| calculated: | 3.56% | 61.33% | 5.50% | 7.46% |
| found: | 3.70% | 61.42% | 5.38% | 7.37% |

Figure 28:
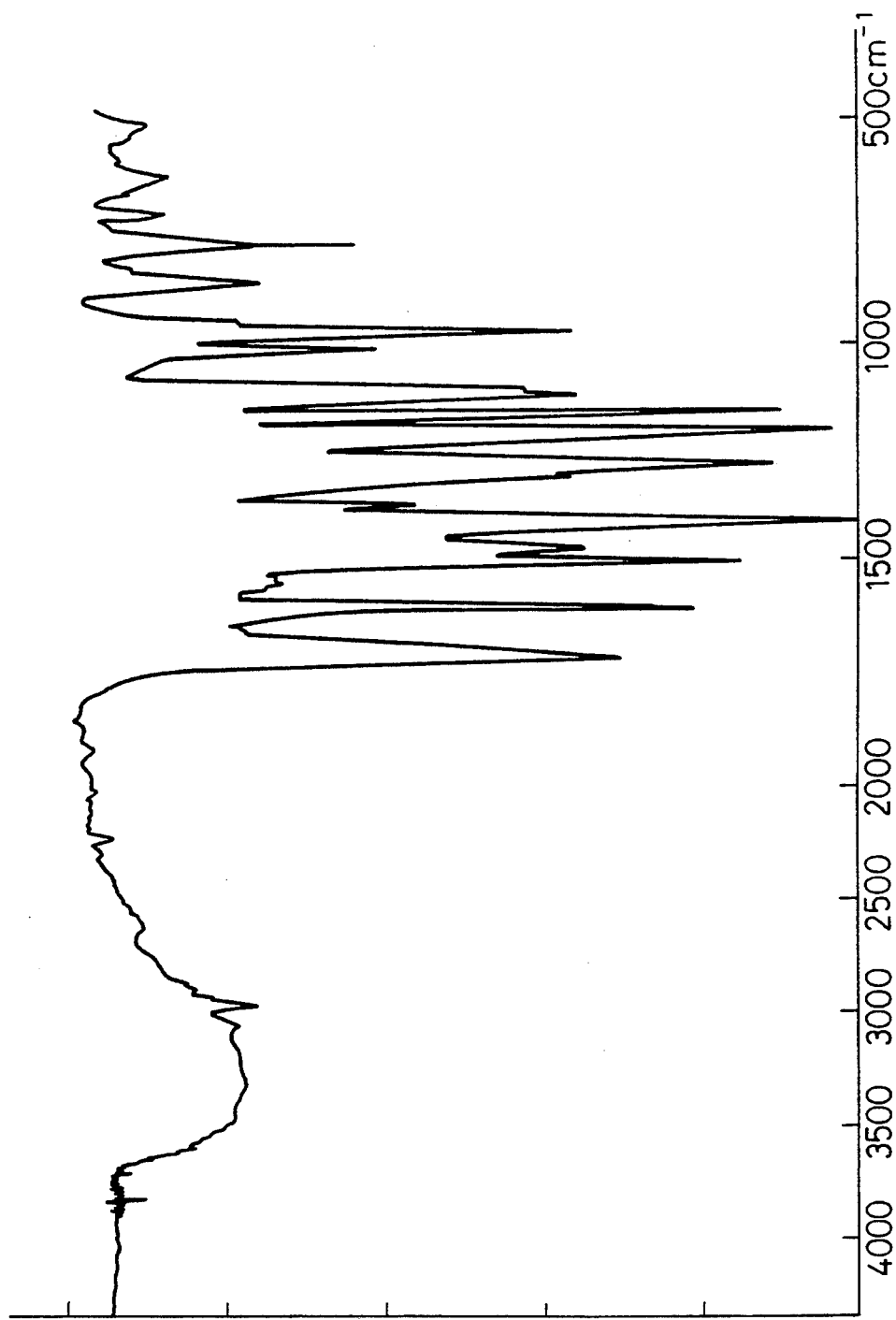
FIG. 28 shows an IR absorption spectrum of 3,6-octafluoro-4,5-octaquis(p-ethoxycarbonylphenoxy)vanadium phthalocyanine produced in Example 44.

The IR absorption spectrum of this compound is shown in FIG. 28.

Example 45

Production of 3,6-octafluoro-4,5-octaquis(p-ethoxycarbonylphenylthio)oxytitanium phthalocyanine The procedures of Example 28 were followed in the same way except that 10.49 g (20 mmol) of 4,5-difluoro-bis(p-ethoxycarbonylphenylthio)phthalonitrile was used in place of 4-(p-ethoxycarbonylphenoxy)-3,5,6-trifluorophthalonitrile and 1.14 g (6 mmol) of titanium tetrachloride was used in place of vanadium trichloride. There was thus obtained 9.89 g of a dark blue cake of the intended compound (yield=91.5%).

Visible absorption spectrum:
maximum absorption wavelength:
  in methyl ethyl ketone: 743.5 nm ($\epsilon = 8.16 \times 10^4$)
  in thin film: 754.0 nm
Solubility:
in ethyl cellosolve: 13 wt %
Elementary analysis:

|  | H | C | N | F |
|---|---|---|---|---|
| calculated: | 3.36% | 57.77% | 5.18% | 7.03% |
| found: | 3.50% | 57.92% | 5.44% | 6.88% |

Example 46

Production of 3,6-octafluoro-4,5-octaquis(p-ethoxycarbonylphenoxy)zinc phthalocyanine The procedures of Example 41 were repeated except that 9.84 g (20 mmol) of 3,6-difluoro-4,5-bis(p-ethoxycarbonylphenoxy)phthalonitrile was used in place of 3,5,6-trifluoro-4-(p-ethoxycarbonylphenoxy) phthalonitrile, and 1.92 g (6 mmol) of zinc iodide was used in place of vanadium trichloride, to obtain 8.62 g of a green cake of the intended compound (yield 84.7%).

Visible absorption spectrum:
maximum absorption wavelength:
  in ethyl cellosolve: 664.0 nm ($\epsilon = 1.18 \times 10^5$)
  in thin film: 671.5 nm
Solubility:
in ethyl cellosolve: 6 wt %
Elementary analysis:

|  | H | C | N | F |
|---|---|---|---|---|
| calculated: | 3.57% | 61.38% | 5.51% | 7.47% |
| found: | 3.41% | 61.12% | 5.34% | 7.36% |

Figure 29:
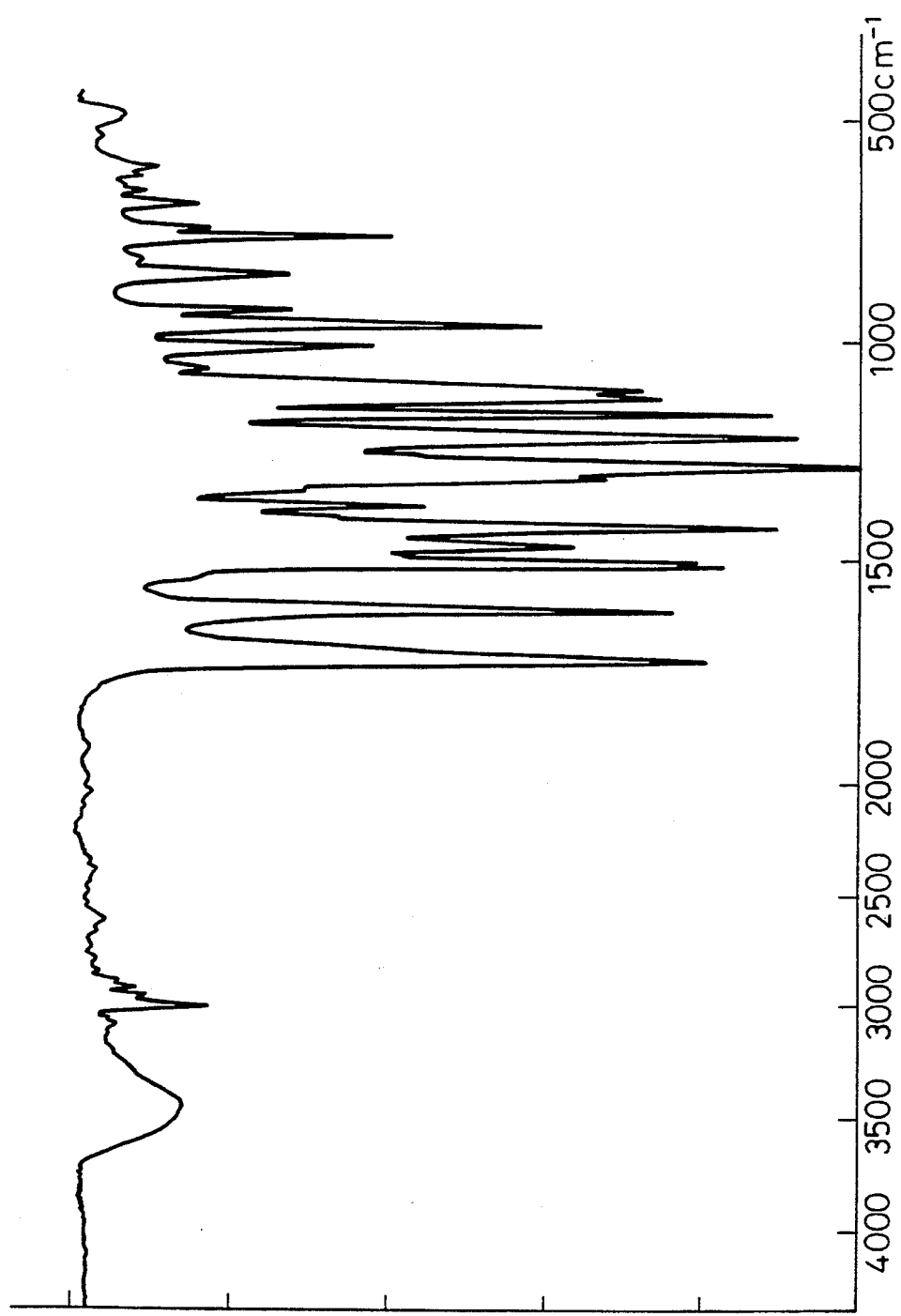
FIG. 29 shows an IR absorption spectrum of 3,6-octafluoro-4,5-octaquis(p-ethoxycarbonylphenoxy)zinc phtholocyanine produced in Example 46.

The IR absorption spectrum of this compound is shown in FIG. 29.

Example 47

Production of 3,6-octafluoro-4,5-actaquis(p-ethoxycarbonylphenoxy)copper phthalocyanine The procedures of Example 41 were repeated except that 9.84 g (20 mmol) of 3,6-difluoro-4,5-bis(p-ethoxycarbonylphenoxy)phthalonitrile was used in place of 3,5,6-trifluoro-4-(p-ethoxycarbonylphenoxy) phthalonitrile, and 0.59 g (6 mmol) of anhydrous cuprous chloride was used in place of vanadium trichloride, to obtain 7.99 g of a green cake of the intended compound (yield 78.6%)

Visible absorption spectrum:
maximum absorption wavelength:
  in ethyl cellosolve: 661.0 nm ($\epsilon = 1.72 \times 10^4$)
  in thin film: 646.5 nm
Solubility:

in ethyl cellosolve: 3 wt %
Elementary analysis:

|  | H | C | N | F |
|---|---|---|---|---|
| calculated: | 3.57% | 61.43% | 5.51% | 7.47% |
| found: | 3.38% | 60.97% | 5.44% | 7.28% |

Figure 30:
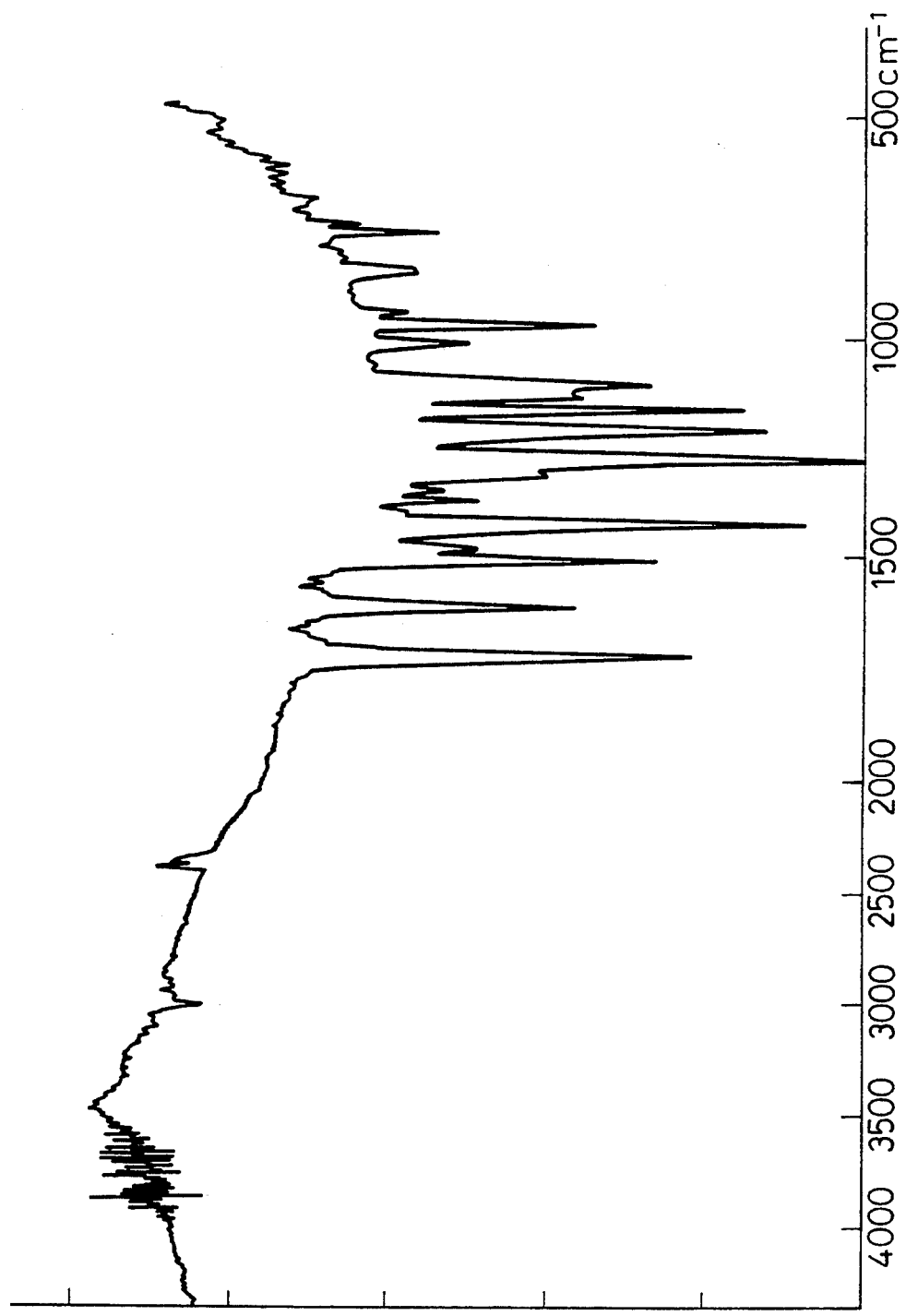
FIG. 30 shows an IR absorption spectrum of 3,6-octafluoro-4,5-octaquis(p-ethoxycarbonylphenoxy)copper phthalocyanine produced in Example 47.

The IR absorption spectrum of this compound is shown in FIG. 30.

Example 48

Production of hexadecafluoro-mono-(p-carboxylphenoxy)oxyvanadium phthalocyanine 5.19 g (6 mmol) of hexadecafluorooxyvanadium phthalocyanine, 8.28 g (60 mmol) of p-hydroxybenzoic acid and 11.10 g (60 mmol) of tri-n-butylamine were fed into a 100 ml four-necked flask, and the reaction mixture was reacted at 150° C. for 3 hours. After the reaction was completed, the insoluble contents was separated by filtration, and tri-n-butylamine was distilled off. The resulting solid content was washed with 200 ml of methanol. There was thus obtained 5.01 g of a dark blue cake of the intended compound (yield=84.7%). As a result of analysis, this compound was found to have one substitution group.

Visible absorption spectrum:
maximum absorption wavelength
in methyl ethyl ketone: 638.5 nm ($\epsilon=5.51\times10^4$)
in thin film: 643.5 nm
Solubility:
in ethyl cellosolve: 11 wt %
Elementary analysis:

|  | H | C | N | F |
|---|---|---|---|---|
| calculated: | 0.52% | 48.32% | 11.56% | 29.40% |
| found: | 0.65% | 48.63% | 11.48% | 29.12% |

Figure 31:
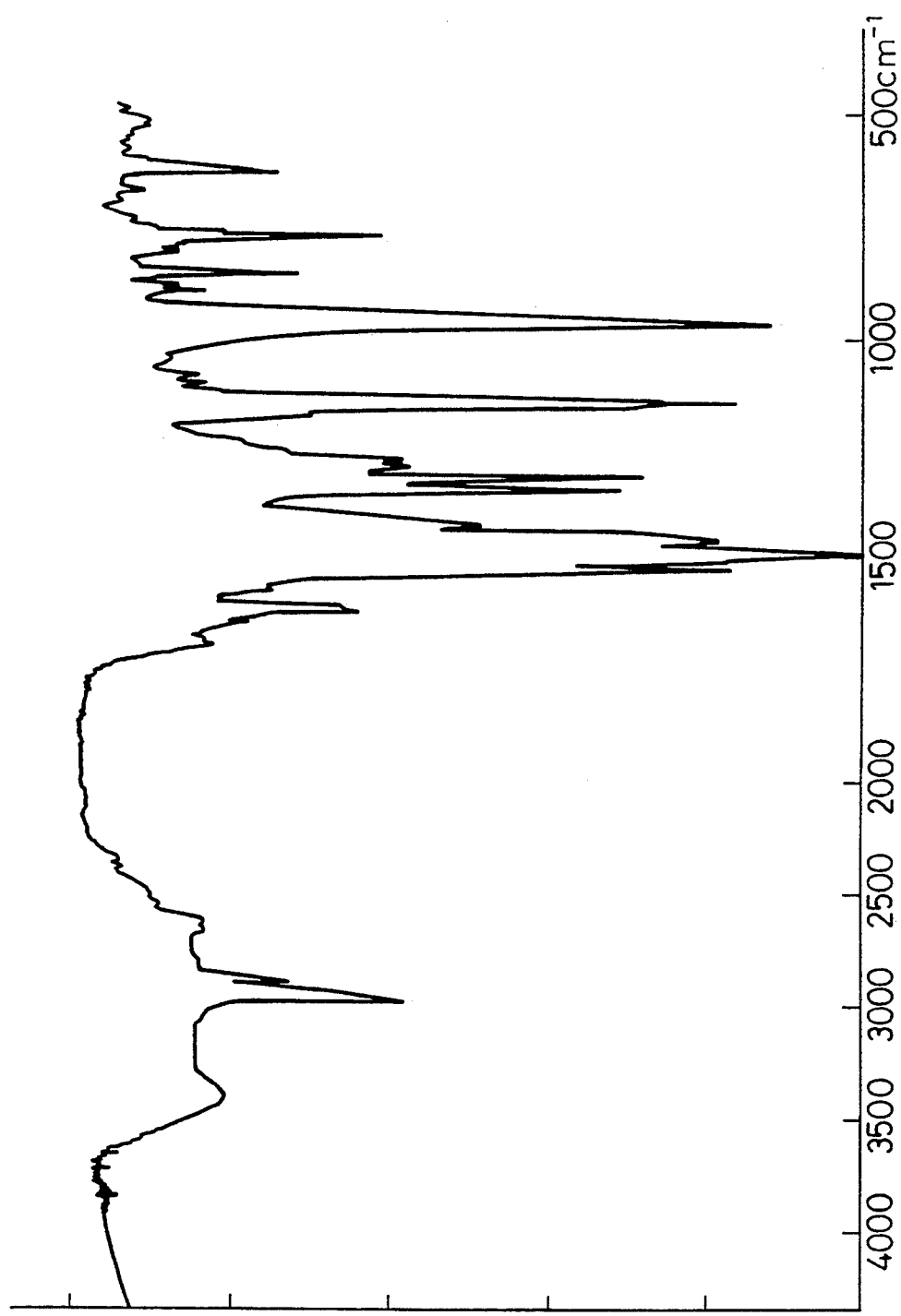
FIG. 31 shows an IR absorption spectrum of hexadecafluoro-mono-(p-carboxylphenoxy)oxyvanadium phthalocyanine produced in Example 48.

The IR absorption spectrum of this compound is shown in FIG. 31.

We claim:

1. A fluorine-containing phthalocyanine compound represented by the following formula (I):

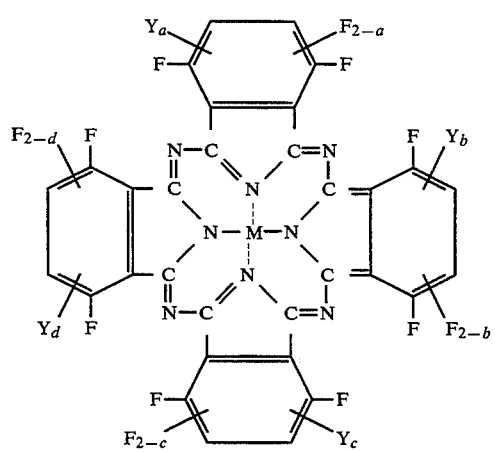

wherein Y is

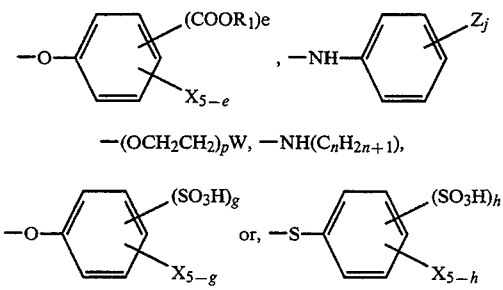

$-(OCH_2CH_2)_pW$, $-NH(C_nH_{2n+1})$,

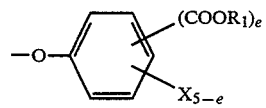 or, 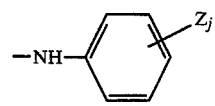

wherein $R_1$ is a hydrogen atom or a C1–C8 alkyl group; X is a hydrogen atom, a C1–C4 alkyl group, a C1–C4 alkoxyl group or a halogen atom; Z is a hydrogen atom, a C1–C4 alkyl group, a C1–C4 alkoxyl group, a C1–C4 alkoxycarbonyl group or a halogen atom; W is a C1–C4 alkoxyl group; e, g, h and j are independently an integer of 1 or 2; n is an integer of 1 to 8; and p is an integer of 1 to 6; a to d are integers of 0 to 2 with the proviso that the sum of a to d is 1 to 8; and M is a metal, a metal oxide, a metal carbonyl or a metal halide.

2. A fluorine-containing phthalocyanine compound according to claim 1, wherein Y is

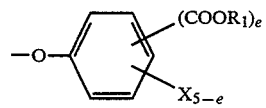

and the other symbols are as defined in claim 1.

3. A fluorine-containing phthalocyanine compound according to claim 1, wherein Y is

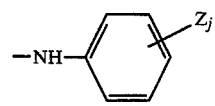

and the other symbols are as defined in claim 1.

4. A fluorine-containing phthalocyanine compound according to claim 1, wherein Y is $-NH(C_nH_{2n+1})$, and the other symbols are as defined in claim 1.

5. A fluorine-containing phthalocyanine compound according to claim 1, wherein Y is $-(OCH_2CH_2)_pW$, and the other symbols are as defined in claim 1.

6. A fluorine-containing phthalocyanine compound according to claim 1, wherein Y is

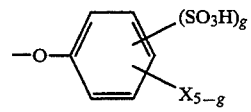

and the other symbols are as defined in claim 1.

7. A fluorine-containing phthalocyanine compound according to claim 1, wherein Y is

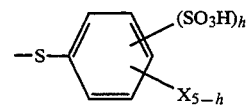

and the other symbols are as defined in claim 1.

* * * * *